US012163051B2

(12) United States Patent
Hyland et al.

(10) Patent No.: US 12,163,051 B2
(45) Date of Patent: Dec. 10, 2024

(54) METHODS OF MAKING POLYMERS AND METAL-POLYMER COMPOSITES

(71) Applicant: Cirrus Materials Science Limited, Auckland (NZ)

(72) Inventors: Margaret Mary Hyland, Auckland (NZ); Fengqian Zhang, Auckland (NZ); Chuong Luu Nguyen, Auckland (NZ)

(73) Assignee: Cirrus Materials Science Limited, Auckland (NZ)

( * ) Notice: Subject to any disclaimer, the term of this patent is extended or adjusted under 35 U.S.C. 154(b) by 853 days.

(21) Appl. No.: 17/268,594

(22) PCT Filed: Aug. 16, 2019

(86) PCT No.: PCT/IB2019/056941
§ 371 (c)(1),
(2) Date: Feb. 15, 2021

(87) PCT Pub. No.: WO2020/035823
PCT Pub. Date: Feb. 20, 2020

(65) Prior Publication Data
US 2021/0317320 A1    Oct. 14, 2021

(30) Foreign Application Priority Data

Aug. 16, 2018  (NZ) ...................................... 745071

(51) Int. Cl.
*C09D 4/00*      (2006.01)
*B29C 35/08*     (2006.01)
(Continued)

(52) U.S. Cl.
CPC ............ *C09D 4/00* (2013.01); *B29C 35/0805* (2013.01); *B29C 41/02* (2013.01); *B29C 41/38* (2013.01);
(Continued)

(58) Field of Classification Search
CPC ............ B29C 66/72321; B29C 65/348; B29C 63/486; B29C 41/38; B29C 41/02; B29C 2045/0075; B29C 35/0805
See application file for complete search history.

(56) References Cited

U.S. PATENT DOCUMENTS 5,456,767 A * 10/1995 Shah ....................... C23F 11/10
                                                    422/12
2003/0198765 A1* 10/2003 Levendusky ............ B05D 7/14
                                                    428/35.7

OTHER PUBLICATIONS

Jong-Bum Kim, Merlin L. Bruening, and Gregory L. Baker, Surface-Initiated Atom Transfer Radical Polymerization on Gold at Ambient Temperature, Journal of the American Chemical Society 2000 122 (31), 7616-7617 DOI: 10.1021/ja001652q.
(Continued)

*Primary Examiner* — Stella K Yi

(57) ABSTRACT

The present invention relates to a method for producing a polymer, polymers and metal-polymer composites produced by the method. The method comprises providing one or more polymerisable monomers and providing a substrate comprising an activated metal surface, the activated metal surface comprising one or more compounds capable of initiating polymerisation of the one or more polymerisable monomers. The method comprises contacting the activated metal surface and the one or more polymerisable monomers to polymerise the one or more polymerisable monomers, thereby producing the polymer.

20 Claims, 16 Drawing Sheets

(51) Int. Cl.
*B29C 41/02* (2006.01)
*B29C 41/38* (2006.01)
*B29K 33/00* (2006.01)
*B29K 105/00* (2006.01)
*C08F 20/14* (2006.01)
*C08F 22/22* (2006.01)
*C09D 5/08* (2006.01)
*C09D 133/12* (2006.01)
*C09D 135/02* (2006.01)

(52) U.S. Cl.
CPC .............. *C08F 20/14* (2013.01); *C08F 22/22* (2013.01); *C09D 5/08* (2013.01); *C09D 133/12* (2013.01); *C09D 135/02* (2013.01); *B29C 2035/0827* (2013.01); *B29K 2033/08* (2013.01); *B29K 2105/0002* (2013.01); *B29K 2995/0088* (2013.01)

(56) References Cited

OTHER PUBLICATIONS

Renxu Chen, Shiping Zhu, and Shane Maclaughlin, Grafting Acrylic Polymers from Flat Nickel and Copper Surfaces by Surface-Initiated Atom Transfer Radical Polymerization, Langmuir 2008 24 (13), 6889-6896 DOI: 10.1021/la800171h.

* cited by examiner

US 12,163,051 B2

METHODS OF MAKING POLYMERS AND METAL-POLYMER COMPOSITES

FIELD OF THE INVENTION

The present invention relates to a method of producing a polymer and metal-polymer composite. The present invention also relates to polymers and metal-polymer composites, including those produced by said method.

BACKGROUND TO THE INVENTION

Metal-polymer composites such as, for example, steel-polymer composites, have been extensively used in automotive, construction, thermal insulation, sound proofing, marine, and appliance industries due to their high strength-to-weight ratio, strong impact resistance, good corrosion resistance, and/or design flexibility.

The bonding of polymers to metals such as steel can be challenging due to the difference between the chemical and physical properties of the metal and the polymer. Conventional joining techniques (i.e., adhesive bonding, mechanical fastening, welding, and injection moulding) for metal-polymer composites such as steel-polymer composites have several drawbacks such as the requirement for surface treatment, the release of volatile organic compounds, the generation of stress concentration, high-energy consumption, the limitation of joining size, and/or the requirement of specific polymer types.

The preparation of polymers is traditionally carried out in the presence of catalysts that typically require an inert atmosphere. Such a system can be costly and time-consuming to implement. Additionally, traditional polymerisations typically require organic solvents, the toxicity and volatility of which has led to health and safety concerns.

There is an ongoing need for further polymerisation methods and methods for preparing metal-polymer composites, such as for example, steel-polymer composites.

It is an object of the present invention to go at least some way to meeting this need; and/or to at least provide the public and/or industry with a useful choice.

Other objects of the invention may become apparent from the following description which is given by way of example only.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

Any documents referred to herein including, but not limited to, patents, patent applications, journal articles, books, and the like, are incorporated herein by reference in their entirety. Any section headings used herein are for organizational purposes only and are not to be construed as limiting the subject matter described.

SUMMARY OF THE INVENTION

In a first aspect the present invention relates to a method for producing a polymer, the method comprising:
providing one or more polymerisable monomers;
providing a substrate comprising an activated metal surface, the activated metal surface comprising one or more compounds capable of initiating polymerisation of the one or more polymerisable monomers, and
contacting the activated metal surface and the one or more polymerisable monomers to polymerise the one or more polymerisable monomers, thereby producing the polymer.

In another aspect the present invention relates to a method for preparing a metal-polymer composite, the method comprising the steps set out in the first aspect.

In another aspect, the present invention relates to a polymer prepared by a method of invention.

In another aspect, the present invention relates to a metal-polymer composite prepared by a method of the invention.

In another aspect the present invention relates to a polymer formed by polymerising one or more polymerizable monomers.

In another aspect the the present invention relates to a metal-polymer composite comprising a polymer directly attached to a metallic surface of a substrate.

In another aspect the present invention relates to a metal-polymer composite having a pull off strength of about 1.5 to about 5 MPa, preferably about 2.5 to about 5 MPa.

The following embodiments may relate to any of the above aspects alone or in any combination of two or more thereof.

In some embodiments the activated metal surface when contacted with an aqueous solution of 30.096 µM terephthalic acid and 0.001 mol/L NaOH and irradiated at 365 nm with a light source at 15 W for 1 hour at room temperature is capable of producing 2-hydroxyterephthalic acid at a concentration of at least 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.0105, 0.011, 0.0115, 0.012, 0.0125, or 0.013 µM/mm$^2$ geometric area of activated surface, as determined by fluorescence spectroscopy at 425 nm, and useful ranges may be selected from any of these values, for example from 0.0001 to 0.013, preferably at least 0.0001, preferably at least 0.0005, preferably at least 0.001, preferably at least 0.005, preferably at least 0.01 µM/mm$^2$ (µmolL$^{-1}$ per mm$^2$) geometric area of activated surface.

In some embodiments the activated metal surface when tested according to the procedure set forth in section 1.7 of the Examples produces 2-hydroxyterephthalic acid at a concentration as defined in the preceding embodiment.

In some embodiments the activated surface may be produced by treating a metal surface of a substrate comprising the metal surface; or the method further comprises providing a substrate comprising a metal surface and treating the substrate comprising the metal surface to produce the activated metal surface.

In some embodiments the activated surface may be produced when the substrate is formed, for example by forming the substrate at an elevated temperature.

In some embodiments the method may be for producing a metal-polymer composite, and the one or more polymerisable monomers polymerise onto and/or at the activated metal surface, thereby producing the metal-polymer composite.

In some embodiments the polymer may be directly attached to the metal surface of the substrate.

In some embodiments the polymer may form a coating on the surface of the substrate.

In some embodiments the activated metal surface may comprise one or more metal oxides capable of generating hydroxyl radicals.

In some embodiments the metal oxide may be selected from the group consisting of magnesium oxide, lead oxide, zinc oxide, copper oxide, titanium dioxide, silver oxide, tin oxide, aluminium oxide, cadmium oxide, iron oxide and nickel oxide, or a combination of any two or more thereof.

In some embodiments the metal oxide may be selected from the group consisting of lead oxide, zinc oxide, copper oxide, titanium dioxide, silver oxide, tin oxide, aluminium oxide, cadmium oxide, iron oxide and nickel oxide, or a combination of any two or more thereof.

In some embodiments the metal oxide may be selected from the group consisting of zinc oxide, titanium oxide and aluminium oxide, or a combination of any two or more thereof.

In some embodiments the metal oxide may be zinc oxide or titanium oxide, or a combination thereof.

In some embodiments the metal oxide may be zinc oxide.

In some embodiments the metal oxide may be selected from magnesium oxide, copper oxide, zinc oxide, titanium oxide and aluminium oxide, or a combination of any two or more thereof.

In some embodiments the metal surface may comprise one or more metals, an oxide of which is capable of generating hydroxyl radicals.

In some embodiments the metal surface may comprise magnesium, zinc, titanium, aluminium, lead, copper, titanium, silver, tin, cadmium, iron or nickel, or a combination of any two or more thereof.

In some embodiments the metal surface may comprise zinc, titanium, aluminium, lead, copper, titanium, silver, tin, cadmium, iron or nickel, or a combination of any two or more thereof.

In some embodiments the metal surface may comprise zinc, titanium or aluminium, or a combination of any two or more thereof.

In some embodiments the metal surface may comprise zinc or titanium, or a combination thereof.

In some embodiments the metal surface may comprise zinc.

In some embodiments, the metal surface comprises magnesium, copper, zinc, titanium or aluminium, or a combination of any two or more thereof.

In some embodiments, the activated metal surface is or comprises an anodised surface, for example an anodised surface comprising titanium, aluminium, and magnesium.

In some embodiments, the substrate comprising the metal surface is a substrate comprising a galvanised surface.

In some embodiments the one or more metal oxide may be produced by treating said metal surface; or the method may comprise treating the metal surface to produce the one or more metal oxide.

In some embodiments the method may comprise contacting and irradiating the activated metal surface and one or more polymerisable monomers with light, preferably comprising UV light.

In some embodiments said polymerisation may be carried out in the absence of an external or extraneous initiator.

In some embodiments the substrate may be a unitary body having at least one dimension greater than 100 nm, preferably greater than 1 mm.

In some embodiments the metal surface and/or substrate may comprise, consist of, or consist essentially of galvanised steel, electrogalvanized steel, galfan steel, zinc metal, aluminium metal, titanium metal, zinc-aluminium alloy coated steel (referred to herein as Zincalume), zinc-magnesium coated steel or zinc-aluminium-magnesium coated steel, or a combination of any two or more thereof.

In some embodiments the metal surface and/or substrate may comprise, consists of, or consists essentially of galvanised steel.

In some embodiments the metal surface and/or substrate may comprise, consist of, or consist essentially of hot-dip galvanised steel.

In some embodiments the substrate may be selected from the group consisting of a particle, fibre, sheet, block, wire, mesh, panel, slab, plate, pole, pillar, bar, rod, beam, foil, joist, laminate, guard rail, pipe, chain, fabric, roofing, coating or any combination of two or more thereof.

In some embodiments, treating the metal surface to produce the activated surface may comprise one or more of heating the metal surface at an elevated temperature (for example, in an oven, with a laser, or other suitable method), applying a current to the metal surface (for example, an anodic oxidation treatment step), subjecting the metal surface a chemical treatment (for example, a treatment that creates hydroxyl groups on the metal surface, an alkali treatment, such as alkali hydroxide treatment, or an acid treatment), subjecting the metal surface to a plasma treatment (for example oxygen plasma treatment), or exposing the metal surface to UV light irradiation.

In some embodiments treating the metal surface may comprise heating the metal surface at an elevated temperature to produce the activated metal surface.

In some embodiments, the metal surface is heated with a laser or other source of heat capable of rapidly heating the metal surface, such as plasma.

In some embodiments, the one or more monomers may be contacted with the activated surface immediately after forming the activated surface, for example by spraying.

In some embodiments heating the metal surface may comprise heating at a temperature of at least about 100° C. to about 600° C., preferably at least about 300° C. to about 600° C., more preferably at least about 300° C. to about 400° C.

In some embodiments heating the metal surface may comprise heating for at least about 1, 2, 3, 4, 5, 6, 7, 8, 9, 10 or more hours, for example from about 1 to about 10 hours, preferably at least about 1 hour, more preferably at least about 2 hours.

In some embodiments the activated metal surface may be contacted with the one or more polymerisable monomers within less than about 72, 48, 24, 12, 6, 5, 4, 3, 2, or 1 hour, preferably within less than about 72 hours, preferably within less than about 24 hours, more preferably within about 2 hours after being produced.

In some embodiments the activated metal surface may be cooled prior to contacting with the one or more polymerisable monomers, preferably to a temperature less than the boiling point of the one or more polymerisable monomers at atmospheric pressure.

In some embodiments the activated surface may be formed when the substrate is formed.

In some embodiments the one or more polymerisable monomers may be photoactive monomers.

In some embodiments the one or more polymerisable monomers may be monoolefinically unsaturated monomers, preferably a monoethylenically unsaturated monomers; or a polyolefinically, preferably diolefinically, unsaturated monomers, preferably a polyethylenically unsaturated monomers; preferably diethyleneically unsaturated monomers.

In some embodiments the one or more polymerisable monomers may be unsaturated, preferably olefinically unsaturated, preferably ethylenically unsaturated.

In some embodiments the one or more polymerisable monomers may be selected from the group consisting of vinyl monomers, preferably acrylates or methacrylates.

In some embodiments the one or more polymerisable monomers may be monomers of formula I:

I wherein $R^1$ is $C(O)OR^3$, $CO(O)R^4$, aryl or $NR^{20}$; $R^2$ is H or C1-4alkyl, preferably H or $CH_3$; $R^3$ is C1-10alkyl or $(CH_2CH_2O)_nCH_3$, preferably C1-4alkyl; $R^4$ is C1-10alkyl, preferably C1-4alkyl; n is an integer selected from 1 to 20; $R^{20}$ is H or an alkyl group, preferably H or C1-10alkyl, preferably H.

In some embodiments the one or more polymerisable monomers are monomers of formula II:

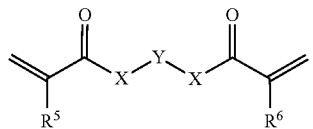
II wherein
X at each instance is independently O or $NR^{20}$;
$R^{20}$ is H or an alkyl group, preferably H or C1-10alkyl, preferably H; and
$R^5$ and $R^6$ are each independently H or C1-5alkyl, preferably H or $CH_3$;
and
Y is a linking group may comprise a linear chain of at least 2, 5, 10, 15, 20, 25, 30, 35, 40, 45, 50, 55, 60, 65, 70, 75, 80, 85, 90, 95, 100 or more atoms, preferably selected from C, N, O and S.

In some embodiments the linking group may be a group of formula $(CR^{30}R^{40})_q$ or formula $(CR^{50}R^{60}O)_r(CR^{70}R^{80})$, wherein $R^{30}$, $R^{40}$, $R^{50}$, $R^{60}$ $R^{70}$ and $R^{80}$ are at each instance independently H or alkyl, preferably C1-10alkyl, and q and r is each independently an integer from 1 to 40.

In some embodiments Y may be selected from the group consisting of $(CH_2)_m$, $CH_2CH_2CH(CH_3)$, $(CH_2CH_2O)_p(CH_2CH_2)$, and a linking group of formula IIA:

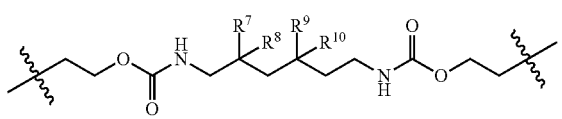
IIA wherein m and p is each independently an integer from 1 to 40, preferably from about 1 to about 10; and $R^7$, $R^8$, $R^9$ and $R^{10}$ are each independently selected from H and C1-5alkyl.

In some embodiments the one or more polymerisable monomers may be monomers of formula III:

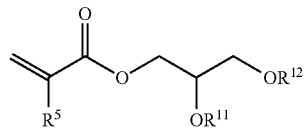
III wherein $R^{11}$ and $R^{12}$ are each independently H or

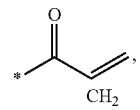

and $R^5$ is as defined herein.

In some embodiments X at each instance may be O.

In some embodiments the one or more polymerisable monomers may be monomers of formula II having a linking group of formula IIA.

In some embodiments $R^5$ and $R^6$ may be both methyl.

In some embodiments $R^7$ and $R^9$ may be both methyl, $R^8$ and $R^{10}$ are each independently selected from the group consisting of H and $CH_3$, preferably one of $R^8$ and $R^{10}$ is H and the other of $R^8$ and $R^{10}$ is $CH_3$, preferably $R^7$ and $R^9$ are both methyl and $R^8$ and $R^{10}$ are present as a 1:1 mixture of H and $CH_3$.

In some embodiments the one or more polymerisable monomers may be selected from the group consisting of methyl acrylate, methyl methacrylate, butyl methacrylate, diurethane dimethacrylate, poly(ethyleneglycol) methyl ether methacrylate, butyl acrylate, styrene and vinyl acetate.

In some embodiments the one or more polymerisable monomers may be diurethane dimethacrylate having a CAS number of 72869-86-4.

In some embodiments the activated metal surface may be contacted with one or more different types of polymerisable monomers.

In some embodiments the activated metal surface may be contacted with one or more polymerisable monomers for a first period of time followed by contacting for a second period of time.

In some embodiments the method may comprise contacting and irradiating the activated metal surface and one or more polymerisable monomers with light of a wavelength of from about 10, 50, 100, 150, 200, 250, 300, 350, 400, 450, 500, 550, 600, 650, 700, 750, 800, 850, 900, 950, 1000, 1050, 1100, 1150, 1200, 1250 nm or more, and useful ranges may be selected from any of these values, for example about 10-400, 50-400, 100-400, 150-400, 200-400, 10-700, 50-700, 100-700, 150-700, 200-700, 300-700, 400-700, 10-1000, 50-1000, 100-1000, 150-1000, 200-1000, 300-1000, 400-1000, 500-1000, 600-1000, or 700-1000 nm.

In some embodiments, the light comprises, consists essentially of, or consists of light of a wavelength that optimises the generation of hydroxyl radicals and/or electrons by the one or more compounds capable of initiating polymerisation in the activated surface.

In some embodiments the light may have a power of at least about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95, 100, 105, 110, 115, 120, 125, 130 W.

In some embodiments, the intensity of the light is at least 1, 2, 3, 4, 5, 6, 7, 8, 9, or 10 W per m² of the activated surface that is irradiated.

In some embodiments the activated metal surface may be contacted with the one or more polymerisable monomers for a first period of time followed by a second period of time, characterised by a difference in temperature and/or irradiation.

In some embodiments the activated metal surface may be contacted with the one or more polymerisable monomers for a first period of time at a first temperature and a second period of time at a second temperature, wherein the first temperature is different to the second temperature, preferably the first temperature is greater than the second temperature, preferably the second temperature is greater than the first temperature.

In some embodiments the activated metal surface may be contacted with the one or more polymerisable monomers under irradiation with light for a first period of time only.

In some embodiments the activated metal surface may be contacted with the one or more polymerisable monomers for a first period of time at a temperature of at least about 10, 15, 20, 25, 30, 35, 40, 45, 50, 55, 60, 65, 70, 75, 80, or 85° C., and suitable ranges may be selected from any of these values, for example about 10° C. to about 85° C., more preferably 50 to 85° C., more preferably 20 to 50° C.

In some embodiments the activated metal surface may be contacted with the one or more polymerisable monomers for a second period of time at a temperature of at least about 10, 15, 20, 25, 30, 35, 40, 45, 50, 55, 60, 65, 70, 75, 80, or 85° C., and suitable ranges may be selected from any of these values, for example from about 10° C. to about 85° C., from about 50 to about 85° C., preferably at least about 20° C., preferably at least about 50° C., preferably at least about 85° C.

In some embodiments the first period of time may be at least about 30 seconds, 1, 5, 10, 15, 30 or 60, 70, 80, 90, 100, 110 or 120 minutes, preferably about 30 seconds to about 120 minutes, more preferably about 30 seconds to about 60 minutes.

In some embodiments the second period of time may be less than about 72, 48, 36, 24, 12, 11, 10, 9, 8, 7, 6, 5, 4, 3, 2, or 1 hour, preferably less than about 5 hours, more preferably less than about 1 hour.

In some embodiments, the polymer has a number average molecular weight of at least about 500,000, 550,000, 600,000, 650,000, 700,000, 750,000, 800,000, 850,000, 900,000, 950,000, 1,000,000, 1,050,000, 1,100,000, 1,150,000, 1,200,000, 1,250,00, 1,500,000, 2,000,000, 3,000,000, 4,000,000 or 5,000,000 g/mol, and useful ranges may be selected from any of these values, for example from about 500,000 to about 5,000,000 g/mol.

In some embodiments the polymer may have a number average molecular weight of at least about 2,000, 10,000, 50,000, 100,000, 150,000, 200,000, 250,000, 300,000, 350,000, 400,000, 450,000, 500,000, 550,000, 600,000, 650,000, 700,000, 750,000, 800,000, 850,000, 900,000, 950,000, 1,000,000, 1,050,000, 1,100,000, 1,150,000, or 1,200,000 g/mol, and useful ranges may be selected from any of these values, for example from about 2,000 to about 1,200,000 g/mol.

In some embodiments the polymer may have a polydispersity index of at least about 1, 1.05, 1.1, 1.15, 1.2, 1.25, 1.3, 1.35, 1.4, 1.45, 1.5, 1.55, 1.6, 1.65, 17, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.95, 2.9, 2.95, 3, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.5, 4.55, 4.6, 4.65, 4.7, 4.75, 4.8, 4.85, 4.9, 4.95, or 5, and useful ranges may be selected from any of these values, for example from about preferably at least about 1.05 to about 2.5, preferably at least about 1.05 to about 1.5, more preferably at least about 1.05 to about 1.2.

In various embodiments, the metal polymer composite has a tape test classification of at least 2B, preferably 3B, preferably 4B, as determined by AST D3359.

In some embodiments, the metal-polymer composite has a pull off strength as determined by ASTM D4541-09 of greater than about 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.5, 6, 6.5, 7, 7.5, 8, 8.5, 9, 9.5, or 10 MPa, and useful ranges may be selected from any of these values for example from about 1.5 to 10, 2.5 to 10, 1.5 to 7.5, 2.5 to 7.5, 1.5 to 5, or 1.5 to 4 MPa, preferably from about 2.5 to about 5 MPa.

In some embodiments the direct attachment may comprise, consist of or consist essentially of non-covalent bonding between the polymer and the metal surface. In some embodiments the non-covalent bonding may comprise, consist of or consist essentially of hydrogen bonding.

In some embodiments the one or more polymerisable monomers may be polymerised photochemically.

In some embodiments the one or more polymerisable monomers may be polymerised in the absence of an electric current, applied voltage, or externally applied potential difference.

In some embodiments the one or more polymerisable monomers may be polymerised in a liquid medium comprising less than 90, 85, 80, 75, 70, 65, 60, 55, 50, 45, 40, 35, 30, 25, 20, 15, 10, 5, 4, 3, 2 or 1% solvent by volume, preferably less than 90%, preferably less than 50%, preferably less than 10% solvent by volume, preferably the one or more polymerisable monomers are polymerised in the absence of solvent.

In some embodiments the one or more polymerisable monomers may be polymerised under an atmosphere of and/or in the presence of air or another oxygen-containing atmosphere.

In some embodiments the metal surface may be subjected to one or more pre-treatment steps, for example one or more physical, mechanical and/or chemical treatments, for example plasma treatment or surface roughening, for example surface roughening by etching and/or patterning, prior to said treatment to produce said activated metal surface.

In some embodiments, the metal surface is subjected to a pre-treatment step that increases the surface area of the metal surface, for example a surface roughening step.

In some embodiments, the metal surface is subjected to a pre-treatment step, for example a plasma, laser, chemical, or other pre-treatment step, that increases the wettability and/or free energy of the surface and/or modifies the morphology of the surface to increase bonding (e.g. mechanical bonding) between the polymer and the surface.

Other aspects of the invention may become apparent from the following description which is given by way of example only and with reference to the accompanying drawings.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which:

FIGS. 11(a) to 11(a1) are SEI of a UTGS surface of a pore (FIG. 11(a)) and the pore on a higher magnification (FIG. 11(a1)). The scale bar in FIG. 11(a) corresponds to 2 μm and the scale bar in FIG. 11(a1) corresponds to 500 nm.

FIGS. 11(b) to 11(b1) are SEI of a UTGS surface of a pore (FIG. 11B) and the pore on a higher magnification (FIG. 11B1).

FIGS. 12(a) to 12(a1) are SEI of a TTGS (400) surface of a pore (FIG. 12(a)) and the pore on a higher magnification (FIG. 12(a1)).

FIGS. 12(b) to 12(b1) are SEI of a TTGS (400) surface of a substrate (FIG. 12(b)) and the substrate on a higher magnification (FIG. 12(b1)). The scale bar in FIG. 12(b) corresponds to 2 μm and the scale bar in FIG. 12(b1) corresponds to 500 nm.

FIGS. 13(a) to 13(a1) are SEI of a TTGS (600) surface of a pore (FIG. 13(a)) and the pore on a higher magnification (FIG. 13(a1)). The scale bar in FIG. 13(a) corresponds to 2 μm and the scale bar in FIG. 13(a1) corresponds to 500 nm.

FIGS. 13(b) to 13(b1) are SEI of a TTGS (600) surface of a pore (FIG. 13(b)) and the pore on a higher magnification (FIG. 13(b1)).

FIGS. 13(c) to 13(c1) are SEI of a TTGS (600) surface of a pore (FIG. 13(c)) and the pore on a higher magnification (FIG. 13(c1)).

FIG. 15 shows the signal at each wavelength (nm) plotted against the fluorescence intensity in absorbance units (a.u.). The spectrum obtained for the terephthalic acid (TA) control sample (TA in the absence of UTGS TTGS(400) and TTGS(600)) is represented by the dotted line ............ (bottom trace), the spectrum obtained for TA in the presence of ultraviolet (UV) light only is represented by the solid line _____, , TA in the presence of UV and UTGS is represented by the dash dot line _ . _ . , , TA in the presence of UV and TTGS (400) is represented by the dashed line _ _ _, , and TA in the presence of UV and TTGS (600) is represented by the dash dot dot line _ . . _ . . .

FIG. 19A shows a layer of poly (methyl methacrylate) (PMMA) (first layer) formed on the surface of TTGS(600), on top of which a second PMMA layer is visible.

DETAILED DESCRIPTION

Figure 1:
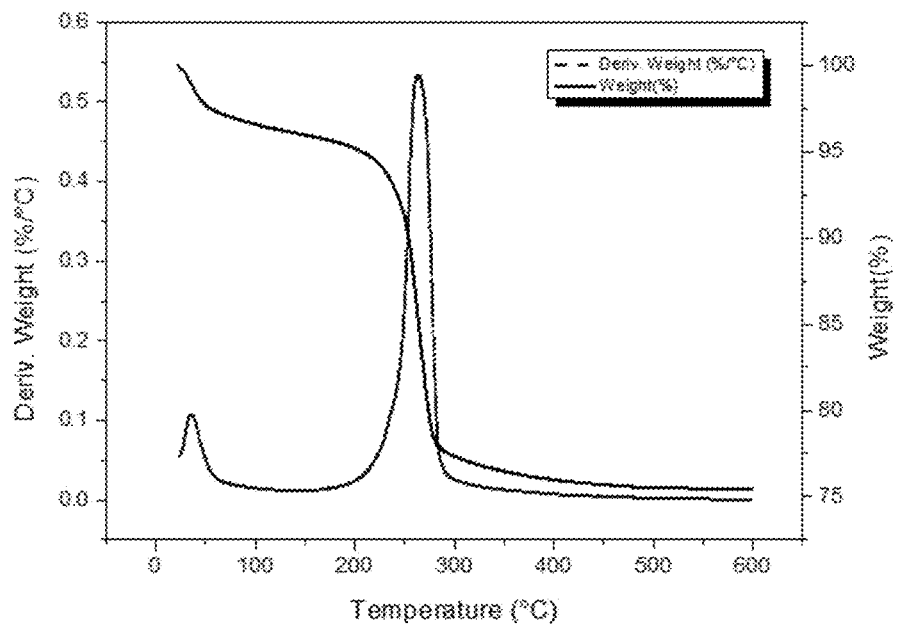
FIG. 1 shows the thermogravimetric analysis/derivative thermogravimetric (TGA/DTG) curves of zinc carbonate hydroxide powders subjected to an increase in temperature at a rate of 10° C. per minute in air. Weight is plotted on the y axis on the right and is expressed as the percentage weight lost at a particular temperature. Deriv. weight is plotted on the y-axis on the left and stands for derivative weight loss. Derivative weight loss corresponds to percentage weight lost as a function of temperature. Temperature is shown on the x axis in degrees Celsius (° C.).

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

Unless otherwise stated, the singular forms "a," "an," and "the" include the plural reference.

As used herein the term "and/or" means "and" or "or", or both.

As used herein "(s)" following a noun means the plural and/or singular forms of the noun.

The general chemical terms used in the formulae herein have their usual meanings.

Unless indicated otherwise, nomenclature used to describe chemical groups or moieties as used herein follow the convention where, reading the name from left to right, the point of attachment to the rest of the molecule is at the right-hand side of the name. For example, the group "arylalkyl" is attached to the rest of the molecule at the alkyl end.

The term "alkyl" employed alone or in combination with other terms, unless indicated otherwise, refers to a straight chain or branched chain hydrocarbon group. In some embodiments alkyl groups has from 1 to 40 carbon atoms. In some embodiments, alkyl groups have from 1 to 12, from 1 to 10, from 1 to 8, from 1 to 6, or from 1 to 4 carbon atoms. Examples of straight chain alkyl groups include, but are not limited to, methyl, ethyl, n-propyl, n-butyl, n-pentyl, n-hexyl, n-heptyl, and n-octyl. Examples of branched alkyl groups include, but are not limited to, isopropyl, iso-butyl, sec-butyl, tert-butyl, neopentyl, isopentyl, and 2,2-dimethylpropyl.

The term "aryl" as used herein alone or in combination with other terms, unless indicated otherwise, refers to a radical of a cyclic aromatic hydrocarbon group. Aryl groups include monocyclic and bicyclic ring systems and also include heteroaryl ring systems. Aryl groups also include aromatic-cycloalkyl and aromatic-cycloalkenyl fused ring systems. Examples of aryl groups include, but are not limited to, phenyl, naphthyl, azulenyl, pentalenyl, indenyl, indanyl, dihydronaphthyl, tetrahydronaphthyl, and the like. In some embodiments, aryl groups have from 6 to 10 ring carbon atoms. Such groups may be referred to herein as 6 to 10-membered aryl groups. In some embodiments, aryl groups are phenyl groups.

The term "polymerisable monomer" as used herein alone or in combination with other terms, unless indicated otherwise, refers to monomers that are able to combine or can be combined to form a polymer.

The term "direct attachment" and associated terms such as "directly attached" as used herein alone or in combination with other terms, with reference to a metal polymer composite means that the polymer of the metal polymer composite is attached or bonded to the metal surface directly, without any intervening layer(s) (for example adhesive layers), material, compounds or linking moieties between the polymer and metal surface. Direct bonding may be mechanical and/or chemical (for example non-covalent and/or covalent) in nature.

As used herein, the term "co-polymer" refers to a polymer comprising two or more, for example three or more, different monomer units—that is, two or more monomer units having different structures. Copolymers of two different monomers may be referred to as bipolymers and copolymers of three different monomers may be referred to as terpolymers. The different monomer units may be randomly distributed throughout the polymer or in an ordered arrangement, for example in the form of blocks, depending on how the copolymer is formed.

As used herein, the term "unsaturated" as used herein refers to a monomer comprising at least one non-aromatic carbon-carbon double bond(s) or carbon-carbon triple bond(s).

Traditional methods of polymerising monomers and preparing metal-polymer composites typically require external initiators, catalysts, organic solvents and inert polymerisation conditions. These requirements can make traditional methods of polymerisation costly to implement and have resulted in safety concerns arising from, for example, the exposure of workers and the environment to toxic solvents and by-products of polymerisation as described herein.

The inventors have surprisingly found that the polymerisation of monomers and the manufacture of metal-polymer composites can be carried out in the absence of external initiators, catalysts and/or solvents, using an activated metal surface as described herein.

In various embodiments the one or more polymerisable monomers are polymerised in the absence of an electric current, applied voltage, or externally applied potential difference.

In various embodiments the one or more polymerisable monomers are polymerised in the absence of an external or extraneous initiator, for example one or more conventional initiators, such as for example azobisisobutyronitrile (AIBN).

In various embodiments the one or more polymerisable monomers may be polymerised under an atmosphere of and/or in the presence of air or another oxygen-containing atmosphere.

In various embodiments the one or more polymerisable monomers are polymerised in a liquid medium comprising less than 90, 85, 80, 75, 70, 65, 60, 55, 50, 45, 40, 35, 30, 25, 20, 15, 10, 5, 4, 3, 2 or 1% solvent by volume, and useful ranges may be selected from any of these values, for example less than 90%, less than 50%, or less than 10% solvent by volume, most preferably the one or more polymerisable monomers are polymerised in the absence of solvent.

In various embodiments the metal-polymer composites prepared by the method described herein may have advantages such as light weight, durability, increased bonding strength compared to traditional metal-polymer composites prepared by adhesive bonding, good thermal and sound insulation properties, and/or good weathering resistance.

Accordingly, the present invention relates to polymers, metal-polymer composites and methods of producing polymers and metal-polymer composites. In particular, the present invention relates to a method for producing a polymer, the method comprising:

providing one or more polymerisable monomers;
providing a substrate comprising an activated metal surface,
the activated metal surface comprising one or more compounds capable of initiating polymerisation of the one or more polymerisable monomers, and
contacting the activated metal surface and the one or more polymerisable monomers to polymerise the one or more polymerisable monomers, thereby producing the polymer.

Any substrate known in the art may be used in the method of the invention provided that the substrate comprises an activated metal surface. Additionally any sized substrate may be used in the method described herein.

In various embodiments, the substrate may be a unitary body having at least one dimension (for example, two or 3 or more dimensions) greater than about 100 nanometers, for example greater than about 0.1, 1, 10, 50, 100, 500, 600, 700, 800, 900 or 1,000, 5,000, 10,000, 100,000 µm, and useful ranges may be selected from any of these values, for example from about 0.1 µm to about 1,000 µm.

In some embodiments the substrate may be in particulate form, for example the substrate may be a powder. In various embodiments the substrate may be non-particulate, for example a fibre.

In various embodiments the substrate, for example the unitary body, comprises an activated surface. The activated surface may be formed by treatment of a metal surface of the substrate as described herein.

In various embodiments the substrate may be a monolithic substrate. In various embodiments the substrate may be a unitary body, for example, having a monolithic surface, having at least one dimension greater than about 1, 5, 10, 20, 50, 100, 200, 300, 400, 500, 600, 700, 800, 900, 1000 mm or more, and useful ranges may be selected from any of these values, for example from about 1 to about 5, 1 to about 10, 1 to about 20, 1 to about 50, 1 to about 100, 1 to about 1000, 5 to about 1000, 10 to about 1000, 100 to about 1000, or 500 to about 1000 mm.

It will be understood by a person skilled in the art that the substrate may be selected based on the application intended for that substrate. Based on this understanding, it will be apparent to a person skilled in the art that substrates of a wide range of lengths, diameters, dimensions and aspect ratios may be selected and that these parameters will all be dependent on the application intended for the substrate. For example, in some embodiments a substrate may have at least one dimension greater than 0.5, 1, 2, 3, 4, 5, or 10 metres.

The substrate may comprise a metal surface and/or an activated surface comprising a metal selected from the group consisting of magnesium, zinc, titanium, aluminium, lead, copper, titanium, silver, tin, cadmium, iron or nickel, or a combination of any two or more thereof, preferably selected from the group consisting of zinc, titanium and aluminium, or a combination of any two or more thereof, more preferably the substrate comprises a metal surface comprising, consisting of or consisting essentially of zinc.

In some embodiments the substrate may be a metallic substrate or the substrate may comprise non-metallic material, for example, to which a metal surface is attached.

In some embodiments the metal surface may be a coating or a layer, for example the metal surface may be powder coated or applied by dipping.

In various embodiments the metal surface and/or substrate comprises, consists of, or consists essentially of galvanised steel, electrogalvanized steel, galfan steel, zinc metal, aluminium metal, titanium metal, zinc-aluminium alloy coated steel (referred to herein as Zincalume), zinc-magnesium coated steel or zinc-aluminium-magnesium coated steel, or a combination of any two or more thereof. Steel is an alloy comprising iron and carbon and small amount of other ingredients. Galvanised steel comprises steel, a surface of which has been coated with zinc.

The form of the substrate will be determined by the future application of the polymer or metal-polymer composite produced by the method described herein. For example, the substrate may be selected from the group consisting of a particle, fibre, sheet, block, wire, mesh, panel, slab, plate, pole, pillar, bar, rod, beam, foil, joist, laminate, guard rail, pipe, chain, fabric, roofing, coating or any combination of two or more thereof, preferably the substrate is in the form of a laminate, sheet or fibre.

The substrate may be a sheet, the metal surface of the sheet and/or the sheet itself comprising, consisting of, or consisting essentially of galvanised steel, electrogalvanized steel, galfan steel, Zincalume, zinc metal, aluminium metal, titanium metal, zinc-magnesium coated steel or zinc-aluminium-magnesium coated steel, or a combination of any two or more thereof, preferably the metal surface of the sheet and/or the sheet itself comprises, consists of, or consists essentially of galvanised steel, more preferably hot-dip galvanised steel. In various embodiments the metal surface and/or substrate comprises, consists of, or consists essentially of galvanised steel, preferably hot-dip galvanised steel.

It will be understood by a person skilled in the art that metals surfaces and/or substrates may comprise a number of elements and/or compounds. In some embodiments the metal surface, activated metal surface and/or substrate may comprise, consist of, or consist essentially of a pure metal or a metal alloy. A substrate may comprise a surface comprising two or more different metals.

In some embodiments the total surface of a substrate may comprise one or more areas corresponding to a metal surface or an activated surface. For example in some embodiments the total surface of a substrate may comprise 1, 2, 3, 4, 5, 6, 7, 8, 9, 10, 25, 50, 75, 100% or more areas of metal surface, and useful ranges may be selected from any of these values for example from about 1 to about 2, 1 to about 3, 1 to about 4, 1 to about 5, 1 to about 6, 1 to about 7, 1 to about 8, 1 to about 9, 1 to about 10, 1 to about 25, 1 to about 50, 1 to about 75, 1 to about 100, 10 to about 25, 10 to about 50, 10 to about 75, 10 to about 100, 25 to about 50, 25 to about 75, 25 to about 100, 50 to about 75, 50 to about 100, or 75 to about 100 areas of metal surface. In some embodiments the total surface of a substrate may be a metal surface or an activated metal surface.

All or part of a surface of a substrate may be treated. In some embodiments only part of a surface of a substrate may be treated such that only some of the metal surface(s) of the substrate may be converted to their corresponding activated metal surfaces. For example, part of a beam may undergo treatment to convert a metal surface of the beam to an activated metal surface. The activated metal surface may then be used in the method of forming a polymer described herein.

The activated metal surface is a metal surface that is "activated" such that the surface is capable of initiating polymerisation of the one or more monomers provided to the surface. The activation of a metal surface may comprise treatment of a metal surface to produce on the surface one or more compounds capable of initiating polymerisation of one or more monomers provided to the surface as described below. The metal surface and/or the activated metal surface may comprise any metal known in the art and it will be understood by a person skilled in the art that the metal surface may comprise more than one type of metal, as such surfaces comprising a mixture of two or more metals are therefore contemplated.

In some embodiments the metal surface may comprise magnesium, zinc, titanium, aluminium, lead, copper, titanium, silver, tin, cadmium, iron or nickel, or a combination of any two or more thereof. Preferably the metal surface comprises zinc, titanium or aluminium, or a combination of any two or more thereof. In various embodiments the metal surface comprises zinc or titanium, or a combination thereof, preferably the metal surface comprises zinc.

As described above, the metal surface may comprise all or part of a surface of the substrate. For example, the metal surface may be present as a part of a larger surface, the larger surface comprising one or more metals, one or more non-metal materials, for example one or more polymers, or a mixture of one or more metals and one or more non-metal materials.

In various embodiments, treatment of a metal surface may produce on the surface one or more compounds capable of initiating polymerisation. It will be understood by a person skilled in the art that in some embodiments the metal surface before being subjected to a treatment may comprise compounds capable of initiating polymerisation, albeit in a relatively low amount or concentration. In such embodiments, treatment of the metal surface may lead to an increase in the amount of compounds capable of initiating polymerisation on the activated metal surface as compared to on the metal surface before treatment.

In various embodiments an activated metal surface may be capable of initiating the polymerisation of one or more polymerisable monomers at a rate such that the polymerisation proceeds to a satisfactory degree of completion (for example at least 20, 30, 40, 50, 60, 70, 80 or 90% of the starting material is reacted) within a desired timeframe, for example less than 0.5, 1, 2, 3, 4, 5, 6, 7, 8, 9, 10, 11, or 12 days. For example, an activated metal surface may enable polymerisation to occur at a rate of at least about 0.002, 0.003, 0.004, 0.005, 0.006, 0.007, 0.008, 0.009, 0.01, 0.15, 0.02, 0.025, 0.03, 0.035, 0.04, 0.045, 0.05, 0.055, 0.06, 0.065, 0.07, 0.075, 0.08, 0.085, 0.09, 0.095, 0.1, mol/(L×min) at 60° C., using a UV intensity of 15 W and an irradiation time of 1 hour, and useful ranges may be selected from any of these values, for example from about 0.002 to about 0.1 mol/(L×min).

It will be understood by a person skilled in the art that the various parameters, for example temperature, initiator concentration (for example, the concentration of hydroxyl radicals), may affect polymerisation. For example, a higher temperature and a higher concentration of hydroxyl radicals may result in a higher polymerisation rate. The rate of polymerisation is also dependent on the amount or concentration of the one or more compounds capable of initiating polymerisation on the activated surface.

It has been found that a metal surface that has not undergone treatment may also be able to initiate polymerisation. However, polymerisation by such a metal surface may proceed at a slower rate.

Without wishing to be bound by theory, it is believed that the initiation of polymerisation may involve, for example the generation of radicals. In various embodiments a metal surface may comprise one or more metals, an oxide of which is capable of generating hydroxyl radicals.

A metal surface may comprise more than one type of metal and it will be understood by a person skilled in the art that in some embodiments the metal surface comprises, the activated surface comprises and/or the one or more compounds capable of initiating polymerisation comprises more than one metal oxide capable of initiating polymerisation, for example, two or more oxides of the same metal and/or oxides of two or more different metals.

The oxide or one of the oxides present on the metal surface and/or activated metal surface may be selected from the group consisting of magnesium oxide, lead oxide, zinc oxide, copper oxide, titanium dioxide, silver oxide, tin oxide, aluminium oxide, cadmium oxide, iron oxide and nickel oxide, or a combination of any two or more thereof, preferably the oxide or one of the oxides is selected from the group consisting of zinc oxide, titanium oxide, and aluminium oxide, or a combination of any two or more thereof, preferably zinc oxide and/or titanium oxide, more preferably the oxide is zinc oxide.

In various embodiments the activated metal surface may be capable of generating hydroxyl radicals. In some embodiments the activated metal surface is capable of generating hydroxyl radicals as measured by UV-illuminated formation of fluorescent 2-hydroxyl terephthalic acid relative to non-fluorescent terephthalic acid at 425 nm.

In some embodiments the activated metal surface may be produced by treating a metal surface of a substrate comprising the metal surface. As such, in some embodiments, the method may comprise providing a substrate comprising a metal surface and treating the substrate comprising the metal surface to produce the activated surface.

In various embodiments the activated surface may be formed when the substrate is formed.

In various embodiments the one or more metal oxide may be produced by treating a metal surface; or the method may comprise treating the metal surface to produce the one or more metal oxide(s). Treating a metal surface to produce an activated surface may comprise producing one or more metal oxides capable of generating hydroxyl radicals. Without wishing to be bound by theory, it is believed that the hydroxyl radicals generated may be involved in the polymerisation process. The amount of hydroxyl radicals generated per unit surface area of the activated surface in turn depends on the concentration of the one or more compounds capable of initiating polymerisation on the activated surface, with increased concentrations of the one or more compounds providing increased amounts of hydroxyl radicals.

The amount of hydroxyl radicals generated by a surface may be determined by various methods known in the art. The results of such methods may be used to estimate the capacity of a surface to facilitate polymerisation. In this specification, the 2-hydroxyterephthalic acid (TAOH) amount or concentration (as determined based on the fluorescence intensity of a sample at 425 nm in the presence of terephthalic acid (TA), for example as described in section 1.7 under the heading "General procedure for testing TAOH generation by an activated metal surface") may be used to indicate the presence of hydroxyl radicals. In some embodiments the activated metal surface when contacted with an aqueous solution of 30.096 µM terephthalic acid and 0.001 mol/L NaOH and irradiated at 365 nm with a light source at 15 W for 1 hour at room temperature is capable of producing 2-hydroxyterephthalic acid at a concentration of at least 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.0105, 0.011, 0.0115, 0.012, 0.0125, or 0.013 µM/mm$^2$ geometric area of activated surface, as determined by fluorescence spectroscopy at 425 nm, and useful ranges may be selected from any of these values, for example from 0.0001 to 0.013, preferably at least 0.0001, preferably at least 0.0005, preferably at least 0.001, preferably at least 0.005, preferably at least 0.01 µM/mm$^2$ geometric area of activated surface. In some embodiments the activated metal surface when tested according to the procedure set forth in section 1.7 of the Examples produces 2-hydroxyterephthalic acid at such a concentration. Unless indicated otherwise, reference to a concentration of 2-hydroxyterephthalic acid produced by or capable of being produced by an activated surface when contacted with an aqueous solution of 30.096 µM terephthalic acid and 0.001 mol/L NaOH and irradiated at 365 nm with a light source at 15 W for 1 hour at room temperature, means the concentration of 2-hydroxterephthalic acid produced by the activated surface less (i.e. after subtracting) the concentration of 2-hydroxyterephthalic acid produced in a control sample of said aqueous solution in the absence of the activated surface and kept in the dark for 1 hour at room temperature (for example as described in section 1.7 below).

In some embodiments the method of producing a polymer comprises treating a substrate comprising a metal surface to produce the activated metal surface. The activated metal surface may then be contacted with one or more polymerisable monomers to polymerise the one or more polymerisable monomers.

Treatment of the metal surface to provide the activated metal surface may be carried out be any suitable method that generates and/or increases the concentration of the one or more compounds capable of initiating polymerisation on the surface. The concentration of the one or more initiator compounds on the activated surface may depend on the treatment method used to produce the activated surface and on the morphology of the surface. For example, surfaces having morphologies with increased surface areas may provide activated surfaces having increased concentrations of initiator compounds.

Treating the metal surface to produce the activated surface may comprise one or more of heating the metal surface at an elevated temperature (for example, in an oven, with a laser, or other suitable method), applying a current to the metal surface (for example, an anodic oxidation treatment step), subjecting the metal surface a chemical treatment (for example, a treatment that creates hydroxyl groups on the metal surface, an alkali treatment, such as alkali hydroxide treatment, or an acid treatment), subjecting the metal surface to a plasma treatment (for example oxygen plasma treatment), or exposing the metal surface to UV light irradiation. In some embodiments, treating the metal surface may comprise heating the metal surface at an elevated temperature, applying a current to the metal surface or exposing the metal surface to ultraviolet (UV) irradiation to produce an activated surface.

The metal surface may be heated at elevated temperature for a suitable period of time. It will be understood by a person skilled in the art that the temperature and time for heating the metal surface may be linked. The temperature will depend on the nature of the metal surface, for example the melting point of the metal. The heating temperature and time will also depend on the method by which the surface is heated. The metal surface metal surface may be heated at a temperature of at least about 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500° C., and useful ranges may be selected from any of these values, for example at least about 200° C. to about 600° C., preferably at least about 300° C. to about 600° C., more preferably at least about 300° C. to about 400° C.

In some embodiments the metal surface may undergo more than one treatment step to produce the activated metal surface. For example, in some embodiments the metal surface may undergo a first treatment step and a second treatment step either sequentially or concurrently. For example, in some embodiments the first treatment step may comprise a treatment selected from the group consisting of plasma treatment, for example oxygen plasma treatment, anodic oxidation, alkali treatment, for example alkali hydroxide treatment, or acid treatment, preferably alkali treatment, and the second treatment step may comprise heating the metal surface at an elevated temperature (thermal treatment).

In some embodiments heating the metal surface comprises heating for at least about 1, 2, 3, 4, 5, 6, 7, 8, 9, 10 or more hours and useful ranges may be selected from any of these values, for example at least about 1 to about 10 hours, 2 to about 10, 3 to about 10, 4 to about 10, 5 to about 10, 6 to about 10, 7 to about 10, 8 to about 10, 9 to about 10, 2 to about 9, 3 to about 9, 4 to about 9, 5 to about 9, 6 to about 9, 7 to about 9, 8 to about 9, 2 to about 8, 3 to about 8, 4 to about 8, 5 to about 8, 6 to about 8, 7 to about 8, 1 to about 9, 1 to about 8, 1 to about 7, 1 to about 8, 1 to about 6, 1 to about 5, 1 to about 4, 1 to about 3, or at least about 1 to about 2 hours, preferably at least about 1 hour, more preferably at least about 2 hours. Such heating times may be useful in embodiments may be useful where, for example, the whole of the substrate is subjected to the heating, for example in an oven or furnace.

In other embodiments, heating may be carried out for a period of time of less than 1 hour, for example less than 30, 20, 10, 5, 4, 3, 2, or 1 minute.

In some embodiments, the heating is carried out for less than 60, 30, 20, 10, 5, 4, 3, 2, 1, 0.5, 0.1, 0.05, or 0.01 second. To deliver sufficient heat to the surface to provide activation in such short heating times, a laser or other source of heat capable of rapidly heating the metal surface, such as plasma, may be used. The power of the laser and the beam/surface interaction time can be selected and/or varied to achieve a desired level of activation. The laser provides rapid local surface heating, in which a thin layer of the metal surface is heated, but the bulk of substrate remains relatively cool. Such local surface heating may provide useful levels of activation, but reduce or prevent distortion or softening of the metal surface and/or substrate that can occur with heating at high temperatures for extended periods of time, for example, in an oven. Using a laser significantly reduces the time required to produce the activated surface, compared to for example using an oven. The surface may be treated with laser in various ways. In one example, a continuous wave (CW) laser may be raster scanned across the surface, the dwell time being be dependent on the laser power. In another example, a pulsed laser may be used to create an array of points of activated surface, the laser being fired once or multiple times at each point.

In some embodiments the metal surface may be heated at one temperature for the entire treatment step. In some embodiments the temperature may be varied during the treatment step. For example, the temperature may be varied within the range of least about 100° C. to about 600° C. during heating. The temperature during the treatment step may be monitored manually or automatically and any changes in temperature may be used to adjust the treatment time manually or automatically as required. The treatment step may comprise more than one phase, for example 2, 3, 4, or 5 or more phases, each phase having a different treatment temperature for example a temperature independently selected form at least about 100° C. to about 600° C., preferably at least about 200° C. to about 600° C., preferably at least about 300° C. to about 600° C., more preferably at least about 300° C. to about 400° C. In some embodiments each phase comprises heating the metal surface at an increasing temperature to the temperature of the previous phase.

The activity of the activated surface may decrease over time. However, an activated surface produced by treating is described herein, will typically maintain a suitable level of activity for a reasonable period of time, for example for about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47 or 48 hours, and suitable ranges may be selected from any of these values, for example for about 1 to about 48 hours, for about 1 to about 25 hours or for about 1 to about 12 hours. In some embodiments, a useful level of activity is maintained for at least 12, 24, 48, or 72 hours or more. Reduction in the activity of the activated surface may depend on a variety of factors such as for example, the metal or metals present in the activated surface, the temperature to which the metal surface was heated to activate the metal surface, the external temperature and the rate of cooling, for example to room temperature. The rate of cooling, for example to room temperature, will in turn be affected by factors such as for example, the surface area of the activated surface and whether the activated surface is subjected to one or more steps designed to accelerate cooling, for example immersion in a quench tank.

It will be understood by a person skilled in the art that a metal surface may have various levels of activation, for example corresponding to the presence of different amounts or concentrations of the one or more compounds capable of initiating polymerisation on the surface. For example, an activated surface may have a high level of activation just after treatment. The level of activation may then decline at a rate that is dependent on factors such as the ones listed above.

In some embodiments a metal surface that has not undergone treatment may also have activity in the sense that such a surface may contain compounds capable of initiating polymerisation. However, as described herein, the amount or concentration of such compounds on the untreated metal surface may be lower than the amount of concentration on a corresponding treated surface.

To polymerise one or more polymerisable monomers, the one or more polymerisable monomers may be contacted with a surface while the surface is in an activated state.

In some embodiments the activated surface is contacted with the one or more polymerisable monomers within less than about 72, 48, 24, 12, 6, 5, 4, 3, 2, or 1 hour after being produced, and useful ranges may be selected from any of these values, for example from 72 to about 1, 48 to about 1, 24 to about 1, 12 to about 1, 6 to about 1, 4 to about 1, 3 to about 1, or 2 to about 1 hour, preferably within less than about 48 hours, more preferably within less than about 24 hours. In some embodiments, the activated surface and monomers are contacted within less than about 30, 15, 10, 5, 1, or 0.5 minutes or less than about 10, 5, or 1 second after the activated surface is formed.

An activated surface may, in some embodiments, be contacted with one or more polymerisable monomers at a temperature above the boiling point of the one or more polymerisable monomers. However, contacting at such a temperature may lead to vaporisation of the monomers, which may lead to monomer loss.

In various embodiments the activated surface may be cooled prior to contacting with the one or more polymerisable monomers, preferably to a temperature less than the boiling point of the one or more polymerisable monomers at atmospheric pressure. Cooling may be achieved by, for example, storing the substrate comprising the activated surface for a period of time sufficient to cool the activated surface to e.g. room temperature or by immersion in a quench tank. The period of time over which the activated surface is cooled may depend on the mechanism by which the surface is cooled. For example, it will be understood by a person skilled in the art that cooling the activated surface of a substrate in ambient temperature may require a longer cooling time than cooling by immersion of the activated surface or the substrate in a quench tank of, for example, cold water or other suitable liquid. Accordingly, an activated surface may be cooled over less than about 5, 10, 15, 20, 25, 30, 35, 40, 45, 50, 55, 60, 120, 180, 240, 300, 360, 420, 480, 540 or 600 minutes, and suitable ranges may be selected from any of these values, for example the activated surface may be cooled over about 5 minutes to about 600 minutes, about 5 minutes to about 300 minutes, about 5 minutes to about 120 minutes, about 5 minutes to about 50 minutes, or about 5 minutes to about 30 minutes. In various embodiments the activated surface may be cooled over less than 10 hours, preferably less than 5 hours, more preferably less than 2 hours. It will be understood by a person skilled in the art that the temperature, period of time over which heating occurs and subsequent cooling time may be influenced at least partially by factors such as, the type metal surface being heated, in particular the metal(s) present in the metal surface and the size of the metal surface.

In some embodiments, where the metal surface is heated with a laser or other source of heat capable of rapidly heating the metal surface such as plasma to produce the activated surface, the one or more monomers may be contacted with the activated surface immediately after forming the activated surface, for example by spraying. in some embodiments where a laser used (as opposed to plasma, for example) to produce the activated surface, the monomers may be contacted prior to or simultaneous with formation of the activated surface. Such embodiments may depend on the laser power and spot size. The laser provides only local surface heating of a thin layer of the surface and the heat absorbed rapidly dissipates into the bulk of the remaining surface and/or substrate. As such, the activated surface cools to temperature suitable for contact with the monomers significantly faster. In some embodiments, a laser beam (continuous wave or pulsed) is moved over the metal surface to produce the activated surface and is followed or tracked by dispenser, such as a nozzle, that delivers the one or more monomers to the activated surface, preferably immediately after activation. In some embodiments, the dispenser may be followed or tracked by a source of irradiation under which polymerisation occurs. In some embodiments, the monomers form a liquid coating on the activated surface that may prevent or reduce a reduction in the level of activity of the activated surface prior to polymerisation occurring. In some embodiments, the one or more monomers and activated surface are irradiated to induce polymerisation immediately after contacting with the activated surface. Such embodiments using lasers in producing the activated surface may be useful for producing various metal polymer composites, including substrates that due to their shape, size, composition, or other feature(s), may not for example be easily heat treated in an oven.

A number of substrates comprising a metal surface, for example the substrates listed above, may be prepared industrially at an elevated temperature. For example, substrates such as steel, zincalume and zinc may be prepared from molten metal mixtures and cast or set in various moulds to provide a desired shape and/or configuration, which may depend on the intended application. The elevated temperature used to produce such substrates will typically result in the substrate having an activated metal surface. Accordingly, in some embodiments the method comprises providing a substrate comprising an activated metal surface, where the activated metal surface is produced when forming the substrate.

In other embodiments the method comprises providing a substrate comprising a metal surface and treating the substrate to produce a substrate comprising an activated metal surface.

The concept of providing a substrate comprising an activated metal surface for use in the method of the invention may be illustrated using galvanised steel as an example. The industrial preparation of galvanised steel involves a method known as hot-dip galvanising whereby a surface of steel is dipped in a bath of molten zinc, resulting in a coating of zinc on the steel surface. The high temperatures (typically in excess of 400° C.) used for this process result in the production of a galvanised steel whose surface is activated.

As such, newly-produced galvanised steel may be used directly in the method of the invention, with or without cooling.

Galvanised steel may be made by batch processing, in which all samples of galvanised steel in a particular batch are processed together through each step of the manufacturing process. Alternatively, galvanised steel may be made by continuous processing whereby each galvanised steel sample undergoes all processing steps sequentially without breaks in time or sequence.

The method described herein may be incorporated into both batch-wise and continuous processes of galvanised steel manufacture. For example, a newly galvanised piece of steel may come off the line at an elevated temperature and be provided for use in the method described herein either at the elevated temperature or after cooling. The method described herein may therefore be incorporated into processes currently used in the art for the manufacture of galvanised steel and other substrates described herein.

As mentioned above, the manufacturing process of substrates such as galvanised steel, electrogalvanized steel, galfan steel, zincalume, zinc metal, aluminium metal, titanium metal, zinc-magnesium coated steel or zinc-aluminium-magnesium coated steel may result in the production of substrates comprising an activated surface suitable for use in the method of the invention. However, often such substrates may be stored for extended periods of time prior to shipping and use in their intended applications. In some embodiments where such substrates may be stored for extended periods of time prior to use in the method for producing a polymer described herein, before use in the method of the invention, it may be beneficial to evaluate the activity of the surface. In some embodiments it may be desirable to subject the substrate to a treatment step as described herein prior to contacting with the polymerizable monomers.

As described herein, the level of activation of a surface may be evaluated for example by measuring the production of hydroxyl radicals by the surface of the substrate as described herein. Monitoring the level of activation of a surface may be useful to determine the period of time and/or conditions that may be used for contacting the one or more polymerisable monomers with the activated surface. The level of activation of the activated surface is indicative of and/or related to the concentration of one or more compounds capable of initiating polymerisation on the activated surface.

The one or more polymerisable monomers may be any monomers capable of being polymerised, preferably by radical polymerisation, for example by polymerisation comprising, consisting of or consisting essentially of photochemical polymerisation. In various embodiments the one or more monomers may be a commercially available monomer that is liquid at room temperature. The use of monomers that are gases or solids are room temperature are also contemplated herein.

In various embodiments the one or more polymerisable monomers are photoactive monomers. In various embodiments the one or more polymerisable monomers are unsaturated, preferably olefinically unsaturated, preferably ethylenically unsaturated. In some embodiment the one or more polymerisable monomers may be esters or amides, preferably esters, of 1 to 15, preferably 1 to 10 carbon atoms of ethylenically unsaturated carboxylic acids, for example esters or amides of acrylic and methacrylic acid. In various embodiments the one or more polymerisable monomers are monoolefinically unsaturated monomers, preferably a monoethylenically unsaturated monomers; or a polyolefinically, preferably diolefinically, unsaturated monomers, preferably a polyethylenically unsaturated monomers; preferably diethyleneically unsaturated monomers.

The one or more polymerisable monomers may comprise at least one carbon-carbon double bond capable of polymerising. In various embodiments the at least one carbon-carbon double bond may be part of a moiety comprising a structure as shown in formula I:

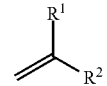

I or a moiety as shown in formula II:

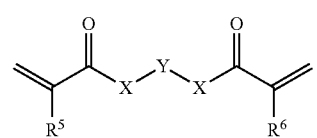

II or a moiety as shown in formula III:

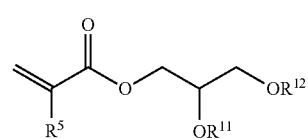

III wherein $R^1$, $R^2$, $R^5$, $R^6$, $R^{11}$, $R^{12}$, X and Y are as described herein.

In some embodiments the one or more polymerisable monomers may be selected from the group consisting of vinyl monomers, preferably acrylates or methacrylates.

In some embodiments the one or more polymerisable monomers are monomers of formula I:

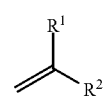

I wherein $R^1$ and $R^2$ are as described herein.

In some embodiments the one or more polymerisable monomers are monomers of formula II:

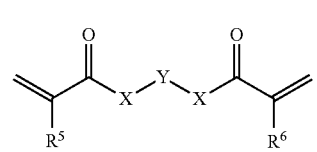

II wherein $R^5$, $R^6$, X and Y are as described herein.

In some embodiments the one or more polymerisable monomers are monomers of formula III:

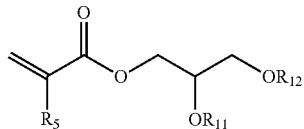

wherein $R^5$, $R^{11}$ and $R^{12}$ are as described herein.

In monomers of formula II, Y may be a linking group, the linking group may comprise a linear chain of at least 2, 5, 10, 15, 20, 25, 30, 35, 40, 45, 50, 55, 60, 65, 70, 75, 80, 85, 90, 95, 100 or more atoms, preferably selected from carbon, nitrogen, oxygen and sulfur, and suitable ranges may be selected from any of these values, for example from about 1 to about 100 atoms, for example from about 1 to about 100 linear chain of atoms. In various embodiments the linking group may comprise atoms selected from the group consisting of carbon, hydrogen, nitrogen and oxygen. In some embodiments the linking group may comprise a branched or unbranched, saturated or unsaturated alkyl chain comprising from about 1, 5, 10, 15, 20, 25, 30, 35, 40, 45, 50, 55, 60, 65, 70, 75, 80, 85, 90, 95, 100 or more atoms, and suitable ranges may be selected from any of these values, for example from about 1 to about 100 atoms. In various embodiments Y is a linking group. In various embodiments Y is a linking group of formula $(CR^{30}R^{40})_q$ or formula $(CR^{50}R^{60}O)_r(CR^{70}R^{80})$, wherein $R^{30}$, $R^{40}$, $R^{50}$, $R^{60}$ $R^{70}$ and $R^{80}$ are at each instance independently H or alkyl, preferably C1-10alkyl, and q and r is each independently an integer from 1 to 40. In various embodiments Y is selected from the group consisting of $(CH_2)_m$, $CH_2CH_2CH(CH_3)$, $(CH_2CH_2O)_p(CH_2CH_2)$, and a linking group of formula IIA:

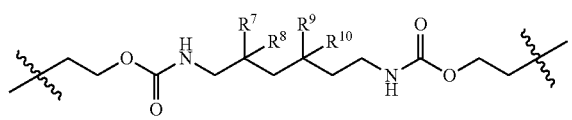

wherein $R^7$, $R^8$, $R^9$, $R^{10}$, m and p are as defined herein.

In various embodiments the one or more polymerisable monomers are monomers of formula II. In various embodiments X at each instance is 0. In some embodiments the one or more polymerisable monomers are monomers of formula II having a linking group of formula IIA.

In some embodiments $R^5$ and $R^6$ are both methyl. In some embodiments $R^7$ and $R^9$ are both methyl, $R^8$ and $R^{10}$ are each independently selected from the group consisting of H and $CH_3$, preferably one of $R^8$ and $R^{10}$ is H and the other of $R^8$ and $R^{10}$ is $CH_3$, preferably $R^7$ and $R^9$ are both methyl and $R^8$ and $R^{10}$ are present as a 1:1 mixture of H and $CH_3$.

In exemplary embodiments the one or more polymerisable monomers are diurethane dimethacrylate having a CAS number of 72869-86-4.

In various embodiments the one or more polymerisable monomers are monomers of formula III.

In some embodiments the one or more polymerisable monomers may be selected from a group consisting of methyl acrylate, methyl methacrylate, butyl methacrylate, poly(ethyleneglycol) methyl ether methacrylate, butyl acrylate, styrene, vinyl acetate, diurethane dimethacrylate (DUDMA), ethylene glycol dimethylacrylate (EGDMA), 1,3-butanediol dimethylacrylate, 1,6-hexanedioldimethacrylate, poly(ethyleneglycol) dimethacrylate, di(ethylene glycol) dimethacrylate and glycerol dimethacerylate.

In various embodiments the one or more polymerisable monomers are selected from a group consisting of methyl acrylate, methyl methacrylate, butyl methacrylate, diurethane dimethacrylate, poly(ethyleneglycol) methyl ether methacrylate, butyl acrylate, styrene and vinyl acetate.

The monomers described herein may be commercially available.

The one or more polymerisable monomers may be contacted with the activated metal surface in a number of ways. For example, the one or more polymerisable monomers may be contacted with the activated metal surface by spraying, painting, sputtering, spin-coating, immersing, dipping or otherwise applying the one or more polymerisable monomers to the surface (or vice versa).

The activated surface may be contacted with one or more monomers of a single type to form a homopolymer. For example, the activated surface may be contacted with one or more monomers of formula I, II or III to form a polymer of the monomers. Conditions for polymerising the one or more monomers are described herein.

In other embodiments the activated metal surface may be contacted with two or more polymerisable monomers (that is, two or more different types of monomers) to form a co-polymer. The activated metal surface may be contacted with one or more polymerisable monomers at the same time or sequentially. For example, the activated metal surface may be contacted with a first type of monomer and a second type of monomer at the same time. Alternatively, the first type of monomer may be contacted with the activated surface first, and the second type of monomer may be contacted with the activated surface second. That is, the first type monomer may be contacted with the activated for a period time to polymerise said monomer prior to contacting the second monomer. In embodiments where the activated surface is contacted with different types of monomers a co-polymer of the different types of monomers is produced. For example, in embodiments where a first type of monomer is contacted with the activated surface first and the second type of monomer is contacted with the activated surface second, a co-polymer of the first and second type of monomer may be produced. As a further example, to form an alternating polymer for example, a solution comprising a first monomer may first be contacted with the activated surface, followed by a solution comprising a second monomer, and this process may be repeated one or more times. The copolymers formed in the methods described herein may be block, brush co-polymers, statistical co-polymers (random-copolymers), grafted co-polymers, preferably block co-polymers.

In various embodiments the activated surface may be contacted with one or more polymerisable monomers in a liquid (for example neat or as a solution in a solvent or mixture of solvents for example organic solvents and/or water) or gaseous state. In some embodiments the activated surface may be contacted with one or more polymerisable monomers in a solid state at room temperature. The solid polymerisable monomers may be heated to a temperature sufficient to melt the polymerisable monomers or the solid polymerisable monomers may be dissolved in a solvent. It will be understood by a person skilled in the art that the use of no or minimal solvents may be desirable in some cases, for example for reasons such as cost and/or safety. Accordingly, in certain preferred embodiments, the one or more monomers are contacted with the activated surface in the absence of solvent (i.e. neat).

In other embodiments the activated surface may be contacted with one or more polymerisable monomers in one or more solvents having a low hydrogen atom transfer (HAT) tendency to carbon-centred radicals (low transfer and termination tendency), for example dimethylformamide (DMF) and/or toluene. Without wishing to be bound by theory the inventors believe that the use of solvents having a high HAT tendency may inhibit or prevent chain growth during polymerisation.

It will be understood by a person skilled in the art that the state of the one or more polymerisable monomers may depend on factors such as for example, the nature of the one or more monomers, the contacting temperature and the contacting pressure. In various embodiments the activated surface may be contacted with the one or more polymerisable monomers at or about room temperature (20-25° C.) and/or at or about atmospheric pressure (760 mmHg). In other embodiments the activated surface may be contacted with the one or more polymerisable monomers at an elevated temperature and/or pressure.

The rate of polymerisation and characteristics of the polymer formed may be depend on the conditions used for polymerisation, including but not limited to the concentration and nature of the one or more polymerisable monomers, the contacting temperature, the contacting pressure, the length of time allowed for the contacting step and when used, the length of exposure to the light, for example ultraviolet (UV) light, and the power of the light used for irradiation. The rate will also depend on the level of activation of and/or concentration of the compounds capable of initiating polymerisation on the activated surface.

In various embodiments the activated metal surface and the one or more polymerisable monomers may be contacted at a first temperature for a first period of time. Accordingly, in various embodiments the activated metal surface is contacted with the one or more polymerisable monomers for a first period of time at a temperature of at least about 10, 15, 20, 25, 30, 35, 40, 45, 50, 55, 60, 65, 70, 75, 80 or 85° C. or more and useful ranges may be selected from any of these values, for example from about 10° C. to about 85° C., preferably 20° C., more preferably 85° C.

The first period of time may be at least about 30 seconds, 1, 5, 10, 15, 30 or 60, 70, 80, 90, 100, 110 or 120 minutes, and useful ranges may be selected from any of these values, for example at about 30 seconds to about 120 minutes or about 30 seconds to about 60 minutes. As mentioned above, it will be understood by a person skilled in the art that the first period of time may depend on factors such as for example the intensity of the light, preferably UV light, under which the metal surface and the polymerisable monomers are contacted.

In some embodiments the activated metal surface may be contacted with one or more polymerisable monomers for a first period of time followed by contacting for a second period of time.

In various embodiments the method of forming a polymer may comprise contacting and irradiating the activated metal surface and one or more polymerisable monomers with light, preferably comprising UV light, for a first period of time. The activated metal surface and the one or more polymerisable monomers may be contacted and irradiated with light of a wavelength of from about 10, 50, 100, 150, 200, 250, 300, 350, 400, 450, 500, 550, 600, 650, 700, 750, 800, 850, 900, 950, 1000, 1050, 1100, 1150, 1200, 1250 nm or more, for example for a first period of time, and useful ranges may be selected from any of these values, for example from about 10 nm to about 1000 nm, from about 10 nm to about 700 nm, preferably from about 10 nm to about 400 nm. Further useful ranges selected from the preceding wavelength values include, for example, about 10-400, 50-400, 100-400, 150-400, 200-400, 10-700, 50-700, 100-700, 150-700, 200-700, 300-700, 400-700, 10-1000, 50-1000, 100-1000, 150-1000, 200-1000, 300-1000, 400-1000, 500-1000, 600-1000, or 700-1000 nm. The wavelength may be selected based on the metal/metal oxide(s) present on the activated surface. The wavelength and/or the power of the light used for irradiation may depend on, for example, the metal(s) in the activated metal surface to be used as the initiator in the polymerisation. Different metal(s) may be subjected to different power levels and/or different wavelengths of light, for example UV light, to initiate polymerisation.

The light may be selected to comprise a wavelength that optimises the production of hydroxyl radicals by the one or more compounds capable of initiating polymerisation in the activated surface. For example, the light may be selected to comprise a wavelength at which electrons are generated by the compounds capable of initiating polymerisation. Suitable wavelengths or wavelength ranges will be apparent to those skilled in the art. In this way, irradiation with light of other wavelengths, which may undesirably heat or otherwise interact with the activated surface, one or more monomers, or polymer produced, may be reduced or avoided.

Although the polymerisation may be initiated using relatively low power light, and may proceed, for example in visible light such as for example in sunlight, the use of light, for example UV light, of a higher power level may result in faster polymerisation. Accordingly, in some embodiments the light may have a power of at least about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95, 100, 105, 110, 115, 120, 125, 130 W or more, and useful ranges may be selected from any of these values, for example from about 1 to about 130 W. In some embodiments, the intensity of the light is at least 1, 2, 3, 4, 5, 6, 7, 8, 9, or 10 W per m2 of the activated surface that is irradiated. The amount of hydroxyl radicals generated by the activated surface and/or the degree of conversion of the one or more monomers to polymer may, in some embodiments, be increased by increasing the intensity of irradiation. Any suitable light source may be used. Examples of suitable sources include lamps and lasers of various powers and wavelengths.

In various embodiments the activated metal surface may be contacted with the one or more polymerisable monomers for a first period of time followed by a second period of time, characterised by a difference in temperature and/or irradiation, for example irradiation with UV light. In various embodiments the activated metal surface may be contacted with the one or more polymerisable monomers for a first period of time at a first temperature and a second period of time at a second temperature, wherein the first temperature is different to the second temperature, preferably the first temperature is greater than the second temperature. In various embodiments the activated metal surface may be contacted with the one or more polymerisable monomers under irradiation with light, for example with UV light, for a first period of time only. In various embodiments the method may comprise contacting the activated metal surface and the one or more polymerisable monomers for a second period of time to propagate the polymerisation, optionally without further irradiation. In various embodiments the method may comprise contacting the activated metal surface and the one or more polymerisable monomers in the absence of light, for example UV light, for a second period of time to propagate the polymerisation. In various embodiments the activated metal surface may be contacted with the one or more polymerisable monomers for a second period of time at a temperature of at least about 10, 15, 20, 25, 30, 35, 40, 45, 50, 55, 60, 65, 70, 75, 80, or 85° C., preferably 10° C. to about 85° C., more preferably 50 to 85° C.

In some embodiments, on an industrial scale the contacting of an activated metal surface and one or more polymerisable monomers under irradiation with light, for example UV light, may be achieved by irradiating a substrate comprising the activated metal surface and the one or more polymerisable monomers in a chamber, for example through which for a continuous process the substrate may pass or within which for a batch process the substrate may be enclosed. In other embodiments, a light source for providing the irradiation, such as a laser, may be moved over the substrate.

As mentioned above the method of the invention may be incorporated into a continuous process for the manufacture of a substrate, for example a continuous process for the manufacture of a galvanised steel substrate. In some embodiments where the method of the invention is incorporated into a continuous process, a substrate for example galvanised steel may be carried, for example by a conveyor belt, from one stage of the manufacturing process to another. The substrate comprising may pass through a first processing stage, for example a first chamber, in which a metal surface of a substrate is converted to an activated surface. Alternatively, the substrate may be supplied with a surface that is already activated. The substrate comprising the activated metal surface may then pass through a second processing stage in which it is contacted with one or more polymerisable monomers in the presence of light, for example UV light, for a first period of time to initiate the polymerisation of the one or more polymerisable monomers on or at the activated metal surface.

With continued reference to the continuous process described above, the substrate may pass from the second processing stage into a third processing stage in which the polymerisation may be propagated for a second period of time under conditions as described herein. In some embodiments the third processing stage may be, for example, a chamber, storage unit or a shipping container.

In some embodiments the activated metal surface and the one or more polymerisable monomers may be contacted at a first temperature for a first period of time followed by contacting at a second temperature for a second period of time. The first temperature may be the same as or different from the second temperature and the first period of time may be the same as or different from the second period of time. In some embodiments after the first period of time the activated surface and the one or more polymerisable monomers may be heated for a second period of time at a temperature of from about 20, 25, 30, 35, 40, 45, 50, 55, 60, 65, 70, 75, 80 or 85° C. or more and useful ranges may be selected from any of these values, for example from about 20° C. to about 85° C. for a second period of time, preferably about 50° C. to about 85° C.

It will be understood by a person skilled in the art that the first period of time as described above, may be dependent on the intensity, wavelength and/or power of the instant light, for example the UV light used to irradiate the activated surface and the one or more polymerisable monomers during the first period of time.

In embodiments where the activated surface and the one or more polymerisable monomers are contacted for a first period of time followed by a second period of time, the first period of time may be used to aid in the initiation of the polymerisation and the second period of time may be used to aid in the propagation of the polymerisation.

The second period of time may be at less than about 72, 48, 36, 24, 12, 11, 10, 9, 8, 7, 6, 5, 4, 3, 2, or 1 hour, and useful ranges may be selected from any of these values for example, from about 1 to about 72 hours, preferably less than about 5 hours, more preferably less than about 1 hour. In some embodiments the second period of time may not require the presence of light, that is, the polymerisation may be propagated in the dark.

Without wishing to be bound by theory the inventors believe that under irradiation with light, for example UV light, one or more metals on the activated metal surface may act as a photocatalyst to initiate the polymerisation of the one or more polymerisable monomers at the activated metal surface (e.g. steel)-polymer interface. The inventors believe that under irradiation with light, such as for example light in the UV-Visible range, preferably light in the UV range, metal compounds, for example metal oxides such as zinc oxide, on the activated metal surface may produce hydroxyl radicals as described herein.

In various embodiments the characteristics of the polymer or metal-polymer composite produced by the method of the invention may be controlled by the selection of the monomer(s) used in the method, by modifying the conditions used to treat a metal surface to form an activated metal surface and/or the conditions used to contact the activated metal surface and the one or more polymerisable monomers. For example, the molecular weight, degree of crosslinking in the polymer, glass transition temperature (Tg) and polydispersity index of the polymer formed by the method may be controlled. In some embodiments, it may also be possible to control the hardness of the polymer. This control may allow for the production of polymers and metal-polymer composites tailored for specific applications. In some embodiments, polymers produced by the method of the present invention may have higher molecular weights and narrower polydispersity indexes than polymers produced by prior art polymerisation processes that employ external or extraneous initiators and/or chain transfer agents.

In various embodiments described herein the activated metal surface may act as a polymerisation initiator. Accordingly the choice of activated surface may be used to control the molecular weight of the polymer formed, for example to change the mechanical and/or other properties of the polymer formed, for example to tailor the polymer produced for a particular intended application. For example, in some embodiments the use of thermally treated zincalume (TTZnAl) may give rise to a polymer having a molecular weight greater than that of a polymer prepared using galvanised steel thermal treated at 600° C. (TTGS (600)). Without wishing to be bound by theory the inventors believe that different initiators may produce different amounts or concentrations of radicals on their surface and this difference may give rise to polymer products of different molecular weights.

It will be understood by a person skilled in the art that the method described herein may be used to prepare polymers having a wide range of molecular weights. Furthermore, the method described herein may be used to produce a polymer within a certain molecular weight range, for example to tailor the polymer to one or more intended applications. In various embodiments the polymer may have a number average molecular weight (Mn) of at least about 2,000, 10,000, 50,000, 100,000, 150,000, 200,000, 250,000, 300,000, 350,000, 400,000, 450,000, 500,000, 550,000, 600,000, 650,000, 700,000, 750,000, 800,000, 850,000, 900,000, 950,000, 1,000,000, 1,050,000, 1,100,000, 1,150,000, or 1,200,000 g/mol and useful ranges may be selected from any of these values, for example from about 2,000 to about 1,200,000, from about 10,000 to about 1,200,000, from about 50,000 to about 1,200,000, from about 100,000 to about 1,200,000, from about 500,000 to about 1,200,000, from about 2,000 to about 500,000, from about 10,000 to about 500,000, from about 50,000 to about 500,000, or from about 100,000 to about 500,000 g/mol. In other embodiments, the polymer has a number average molecular weight of at least about 500,000, 550,000, 600,000, 650,000, 700,000, 750,000, 800,000, 850,000, 900,000, 950,000, 1,000,000, 1,050,000, 1,100,000, 1,150,000, 1,200,000, 1,250,00, 1,500,000, 2,000,000, 3,000,000, 4,000,000 or 5,000,000 g/mol, and useful ranges may be selected from any of these values, for example from about 500,000 to about 5,000,000 g/mol.

The light intensity used to initiate polymerisation may also have an effect on the molecular weight of the polymer formed. For example, in some embodiments polymerisation using a relatively high intensity of light, for example using a 15 W light source, may result in the production of polymers with a comparatively lower molecular weight than polymers produced with a lower intensity of light, for example a 6 W light source.

In some embodiments the UV intensity may be dependent on the substrate.

In some embodiments control over the irradiation time may allow control over the molecular weight of the polymer formed. For example, in some embodiments a longer irradiation time may result in polymers having a relatively low molecular weight. Without wishing to be bound by theory the inventors believe that the irradiation time may have an impact on the amount or concentration of radicals produced by an activated metal surface, and that this in turn may affect the molecular weight of the resulting polymer.

The polydispersity index (PDI) may be used as a measure of the uniformity of particles in a mixture. PDI is another parameter that may be controlled by the method of the invention. In various embodiments the method of forming a polymer described herein may result in polymers with a narrow PDI range. In various embodiments the polymer may have a polydispersity index (PDI) of at least about 1, 1.05, 1.1, 1.15, 1.2, 1.25, 1.3, 1.35, 1.4, 1.45, 1.5, 1.55, 1.6, 1.65, 17, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.95, 2.9, 2.95, 3, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.5, 4.55, 4.6, 4.65, 4.7, 4.75, 4.8, 4.85, 4.9, 4.95, or 5 or more, and useful ranges may be selected from any of these values, for example from about 1 to about 5, preferably at least about 1.05 to about 2.5, preferably from about 1.05 to about 1.5, more preferably from about 1.05 to about 1.2.

In the preparation of co-polymers by the method of the invention, the feed ratio of the monomers may also play a role in determining the characteristics of the co-polymer formed. The feed ratio represents the proportion of each type of monomer in a mixture compared to the total amount of monomer provided to an activated surface. For example, in the formation of a co-polymer of two types of polymerisable monomers, the feed mixture (the mixture of monomers applied to the activated surface) may comprise a first type of polymerisable monomer to a second type of polymerisable monomer in a ratio of, for example 2:1.

The inventors have found that the method of the invention may be used to prepare co-polymers having a glass transition temperature (Tg) differing form the Tg of the corresponding homopolymers and that Tg may be controlled by adjustment of the monomer feed ratio. The glass transition temperature of the co-polymers may be controlled further by adjusting other parameters during the contacting step and may allow the preparation of co-polymers tailored for specific applications.

As mentioned above the polymers and metal-polymer composites of the invention may be useful in a number of different applications. In some embodiments the parameters of the method for forming a polymer described herein may be tailored to the production of polymers adapted for use in various applications.

One example of an application that metal-polymer composites, for example composites comprising galvanised steel, may be useful in is in the construction industry. The use of polymer coated-metals in the construction industry may be desirable, because the polymer coating may protect a metal surface against corrosion by serving as a physical barrier to slow the permeation of corrosive electrolytes into the metal surface.

In various embodiments the method described herein may be used to prepare metal-polymer composites that are resistant to corrosion. A number of methods may be used to evaluate corrosion resistance, and include accelerated corrosion tests, for example salt spray test ASTM D610-08. The level of corrosion may also be assessed using ASTM D1654-08 as described herein. In some embodiments, the metal-polymer composite has a rust grade as determined by ASTM D610-08 of at least 2, 3, or 4; and/or a rating number ($R_s$) as determined by ASTM D1654-08 of at least 5, 6, or 7. In some circumstances, the diffusion of corrosive species into the coating/metal interface may result in the reduction of coating adhesion and thus may decrease the corrosion resistance of a coating over time. Hence, the inventors believe that the adhesion strength of a coating may influence the corrosion resistance of a material. As described herein, the method of the invention may be tailored to control the adhesion strength of a polymer to the metal surface on which the polymer is formed.

The method of forming a polymer as described herein may be used to prepare a polymer or a metal-polymer composite of the invention.

It will be understood by a person skilled in the art that in embodiments where a metal-polymer composite is prepared, the polymer is typically attached to the metal surface of the substrate. In various embodiments the polymer may form as a coating or layer on the surface of the substrate.

In some embodiments the polymer produced may be recovered from the reaction mixture. For example, if necessary, in some embodiments the polymer may be removed from the surface of the substrate.

In various embodiments the polymer may be directly attached to a metallic surface of the substrate. In various embodiments the polymer may form a coating on the surface of the substrate. The coating may be of a thickness of from about 0.1, 0.2, 0.3, 0.4, 0.5, 0.6, 0.7, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 120, 130, 140, or 150 μm, and useful ranges may be selected from any of these values, for example from about 0.1 to 150, 1 to 150, 0.1 to 100, 1 to 100, 5 to 100, 10 to 100, 20 to 100, 1 to 50, 5 to 50, 10 to 50, 20 to 50, or 10 to 30 μm.

In some embodiments, the method is for producing a metal-polymer composite, and the one or more polymerisable monomers polymerise onto and/or at the activated metal surface, thereby producing the metal polymer composite.

The direct attachment may comprise mechanical and/or chemical bonding, preferably mechanical and chemical bonding. In various embodiments the chemical bonding may comprise one or more different types of chemical bonds. For example, in some embodiments the chemical bonding may comprise covalent or non-covalent bonding, or a combination thereof. In some embodiments the chemical bonding may comprise van der Waals forces, hydrogen bonding, ionic bonding or metallic bonding, or a combination of any two or more thereof. Without wishing to be bound by theory the inventors believe that in various embodiments the direct attachment may comprise, consist of or consist essentially of non-covalent bonding between the polymer and the metal surface, preferably hydrogen bonding.

Different types and/or strengths of bonding/adhesion may be desired depending on, for example, the applications in which the polymer or metal-polymer composite is to be used.

In some embodiments the direct attachment may comprise bonding weak enough to allow the polymer to be separated from the activated surface so as to allow recovery of the polymer. Weak bonding may be desired, for example, where a polymer has been tailored for a specific application, for example, biomedical applications.

In some embodiments the direct attachment may comprise bonding strong enough to prevent the polymer from being separated from the activated surface, resulting in a metal-polymer composite. Strong bonding may be desired, for example in materials for use in the construction industry. The strength of the bond, that is, adhesion strength, between a polymer and the activated metal surface may be measured in a number of ways, for example using ASTM D439-14, which is a standard test method for rubbery property-adhesion to rigid substrates or using a pull of strength test such as ASTM D4541-09. Other methods of measuring bonding strength will be clear to a person skilled in the art, for example ASTM D3359 as described herein.

Bonding strength may be affected by a number of factors, including but not limited to characteristics of the metal and/or activated surface, for example the presence of irregularities on the metal and/or activated surface, the type or types of metal present on the metal and/or activated surface, the treatment time and conditions for producing the activated surface from the metal surface, the length of time between the treatment step and the contacting step and the length of time for which the activated surface is contacted with the one or more polymerisable monomers.

The bonding strength between a metal surface and a polymer may also be affected by the type or types of monomer(s) and/or the concentration of the one or more monomers contacted with the activated surface. For example, without wishing to be bound by theory the inventors believe that monomers comprising a high content of polar groups may have increased wettability which may increase bonding strength.

In various embodiments, the bond between the activated metal surface and the polymer is characterised by a tape test classification of at least 2B, preferably 3B, preferably 4B, as determined by AST D3359.

In various embodiments the bond between an activated metal surface and a polymer may be characterised by a pull off strength as determined by ASTM D4541-09 of greater than about 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.5, 6, 6.5, 7, 7.5, 8, 8.5, 9, 9.5, or 10 MPa, and useful ranges may be selected from any of these values for example from about 1.5 to 10, 2.5 to 10, 1.5 to 7.5, 2.5 to 7.5, 1.5 to 5, or 1.5 to 4 MPa, preferably from about 2.5 to about 5 MPa. In other embodiments, for example where weak bonding may be desired to facilitate removal of the polymer from the activated surface, the metal-polymer composite has a pull of strength as determined by ASTM D4541-09 of less than 1.5 MPa, for example less than 1.4, 1.3, 1.2, 1.1, 1.0, 0.9, 0.8, 0.7, 0.6 or 0.5 MPa.

In some embodiments the bonding strength between an activated surface and a polymer may result in a relatively strong bond, giving rise to a metal-polymer composite. In some embodiments the bonding between an activated surface and the polymer may be a relatively weak bond, allowing the polymer to be separated from the activated surface.

The metal surface may be subjected to one or more pre-treatment steps (that is, steps prior to the treatment of the metal surface), for example one or more physical, mechanical and/or chemical treatments, for example plasma treatment or surface roughening, for example surface roughening by etching and/or patterning, grinding, blasting, phosphating or using photolithography, prior to said treatment to produce said activated metal surface.

The pre-treatment step may be selected to increase or decrease the surface area of the metal surface, as desired. In some embodiments, to increase the surface area of the metal surface, the surface may be subjected to a surface roughening step. Examples of suitable surface roughening steps include mechanical treatments (e.g. grinding, sanding, blasting such as sand/grit blasting), chemical treatments (e.g. etching), and plasma treatments. Without wishing to be bound, it is believed that by increasing the surface area of the metal surface an activated metal surface having a greater concentration of the one or more compounds capable of initiating polymerisation on the surface may be obtained than if no pre-treatment step to increase the surface area is carried out. This increased concentration of compounds capable of initiating polymerisation may achieve a desired level of conversion of the one or more monomers to polymer faster than if the pre-treatment step is not carried out. Additionally, or alternatively, increasing the surface area of the metal surface may reduce the time required to produce an activated surface having a desired concentration of the one or more compounds capable of initiating polymerisation than if no pre-treatment step to increase surface area is carried. Additionally, or alternatively, increasing the surface area of the metal surface may produce an activated surface having a surface morphology that provides increased mechanical bonding with the polymer formed during the contacting step.

The metal surface may be pre-treated prior to the treatment of the metal surface to produce the activated surface to, for example, modify the characteristics of the metal surface to increase or decrease (as desired) the bonding of the polymer formed in the contacting step.

In some embodiments the metal surface may be modified to increase the bonding of the polymer formed in the contacting step, to give rise to a metal-polymer composite. In other embodiments the metal surface may be modified to decrease the bonding of the polymer formed in the subsequent contacting step, to give rise to a polymer that may be removed from the activated metal surface after polymerisation, for example a polymer having a relatively low pull off strength as determined by ASTM D4541-09.

In various embodiments the metal surface may be modified by physical, physicochemical and/or chemical methods.

The metal surface may be subjected to a pre-treatment step, for example a plasma, laser, chemical, or other pre-treatment step, that increases the wettability and/or free energy of the surface and/or modifies the morphology of the surface to increase bonding (e.g. mechanical bonding) between the polymer and the surface.

Surface roughening, for example by etching, thermal treatment and/or patterning may be used to modify the surface properties of a metal surface and to increase the bonding of the polymer to the metal surface, for example by increasing the mechanical bonding between the polymer and the metal surface.

In various embodiments the metal surface may be modified by plasma treatment. In some embodiments, plasma treatment may improve the wettability, free energy and/or surface morphology of the metal surface. Without wishing to be bound by theory the inventors believe that the increase in wettability, free energy and/or surface morphology may be the result of oxygen-containing functional groups such as hydroxyl groups formed by plasma treatment on the metal surface. A number of plasma treatment methods are known in the art and include, for example, atmospheric plasma treatment. Other plasma treatments will be apparent to a person skilled in the art.

In various embodiments the metal surface may undergo as a pre-treatment step a cleaning step prior to the treatment step. Cleaning may be carried out, for example using a solvent such as methanol or ethanol, or using a mild soap, ammonia or phosphate solution.

In some embodiments the metal surface may be modified by more methods (pre-treatment steps) than one prior to the treatment step. In some embodiments the metal surface may be modified by 2, 3, 4, 5 or more methods prior to the treatment step. The methods may be the same or different. For example, the metal surface may be modified by cleaning followed by plasma treatment or the metal surface may be modified by two cleaning steps followed by a plasma treatment step.

EXAMPLES

Unless stated otherwise, the materials and methods section 1 below applies to all of the Examples.
1. Materials and Methods
1.1 Reagents and Equipment Unless otherwise stated all of the monomers, polymers and other reagents used in this study were purchased from Sigma-Aldrich and were used as received.

Galvanised steel and Zincalume were purchased from New Zealand Steel. The galvanised steel comprised a zinc coating of approximately 20-25 μm and the Zincalume comprised an approximately 35-40 μm thick coating of 55% Zn and 45% Al.

Methyl methacrylate (MMA, 99%, Sigma-Aldrich), butyl methacrylate (BMA, 99%, Sigma-Aldrich), methyl acrylate (MA, 99%, Sigma-Aldrich), and butyl acrylate (BA, 99%, Sigma-Aldrich) were purified and stored in nitrogen atmosphere in cold before use. UV lamps (6 W (UV 1) and 15 W (UV 2)) were obtained from UVTech Systems, Inc. A 15 W UV lamp (365 nm) and a 6 W UV lamp (365 nm) were obtained from UVTech Systems, Inc.

1.2 Purification of Monomers

Methyl methacrylate (MMA), butyl methacrylate (BMA), methyl acrylate (MA), and butyl acrylate (BA) were purified by washing three times with 10 wt % sodium hydroxide (NaOH), followed by washing with deionized water until the monomers were neutral, and then distilled under reduced pressure after drying overnight with sodium sulfate ($Na_2SO_4$) [126]. The purified monomers were stored in a nitrogen atmosphere and fridge at 4° C. before use. Poly (ethylene glycol) methyl ether methacrylate (PEGMEMA) and diurethane dimethacrylate (DUDMA) were used as received.

1.3 Thermal Treatment of Galvanised Steel Substrates

All substrates in the form of 0.5 mm thick sheet were cut into square slides of 15 mm×15 mm in size (with a geometric area of 225 $mm^2$). The substrates were then ultrasonically cleaned with ethanol and distilled water.

Thermal treatment of each substrate was conducted at 400° C. or 600° C. for 2 hours in ambient atmosphere.

1.4 General Procedures for Polymerisation of Vinyl Monomers

Homopolymerisation

The homopolymerisation of methyl methacrylate (MMA) was carried out as follows. Methyl methacrylate (MMA) (9.4 g, 0.094 mol) and thermally treated substrate (15 mm×15 mm) were put into a 20 ml vial and the reaction mixture was irradiated with UV light (6 W or 15 W, λ=350 nm) for 1 hour in an ambient atmosphere.

The sealed vial was held at a fixed temperature (60° C.) in an oven for varying lengths of time (0-48 hours). Samples of about 10 mg were periodically withdrawn to detect the monomer conversion by $^1$H NMR.

The polymerisation of other monomers (MA/BMA/BA/DUDMA/PEGMEMA) was conducted following the same procedure as described above for MMA.

Copolymerisation

The procedure for the copolymerisation of vinyl monomers was carried out as follows. A mixture with different proportions of methyl methacrylate and butyl methacrylate was introduced into a 20 ml vial and the reaction mixture was irradiated with UV light (15 W, λ=350 nm) for 1 hour.

The sealed vial was held at fixed temperature (60° C.) in an oven for varying lengths of time (8-48 hours).

Block Co-Polymerisation

The procedure for block copolymerisation of vinyl monomers was as follows. After polymerisation of the MMA (as described in section 1.4 above), the obtained polymer (PMMA) was placed into a new monomer solution (MM or BMA), and the reaction mixture was held at 60° C. for different durations to get block copolymers.

1.5 Characterisation Methods

The chemical composition of the substrate surfaces was determined by X-ray photoelectron spectroscopy (XPS).

The surface morphology examination and qualitative elemental chemical analyses of the substrates were performed by scanning electron microscopy (SEM) with energy dispersive spectrometry (EDS).

The crystallinity and the phases present in substrates were characterised by X-ray diffraction (XRD).

The formation of radicals was determined by fluorescence spectroscopy (FL) using terephthalic acid (TA) as a probe.

The change in chemical species during polymerisation was monitored by Fourier-transform infrared spectroscopy (FTIR).

The structure of the monomers and polymers were detected by nuclear magnetic resonance (NMR) spectroscopy with $CDCl_3$ as a solvent.

Polymer molecular weights and molecular weight distributions were measured by size exclusion chromatography (SEC).

The glass transition temperature of the polymer samples was measured by modulated differential scanning calorimetry (MDSC).

The polymer degradation characteristics were determined by thermogravimetry analysis (TGA).

These characterisation techniques and the details of the experimental parameters are supplied below.

X-Ray Photoelectron Spectroscopy (XPS)

The chemical composition of substrate surfaces was analysed prior to and after thermal treatment by XPS using a Kratos Axis DLD X-ray photoelectron spectrometer with an average pressure of $10^{-9}$ torr at the University of Auckland.

The modified Auger parameter of Zn ($\alpha'$ Zn) was measured and compared to literature values to identify the zinc compounds present, as described in C. D. Wagner, Analytical Chemistry, 44 (1972) 967-973. XPS data was collected with 150 W monochromatic Al (K$\alpha$) X-ray source (1486.6 eV) at a pass energy of 160 eV for survey spectra and 20 eV for high resolution spectra.

For all XPS analyses, the built-in charge neutraliser was utilised. The C 1s peak of the adventitious carbon at 284.8 eV was taken as a reference and was used in the charge correction of all spectra.

Data processing was performed using CasaXPS. Peak areas were measured with linear or Shirley background subtraction and standardization using Scofield sensitivity factors.

Energy Dispersive x-Ray Spectrometry (EDS)

The surface morphology and qualitative elemental chemical analyses of the substrates were performed by scanning electron microscopy (SEM) with energy dispersive x-ray spectrometry (EDS) using a Field Electron and Ion (FEI) Quanta 200 field emission environmental SEM-EDS. The substrates were coated in a vacuum with platinum by physical vapour deposition (PVD). The substrates were then examined at the acceleration voltage of 10 kV in the secondary electron mode and 20 kV in the backscattering electron mode.

X-Ray Diffraction

Crystallinity and the phases present in substrates were characterised by X-ray diffraction (XRD).

Changes in the crystalline properties of reference zinc carbonate hydroxide powders after thermal treatment were studied using XRD. XRD patterns of zinc carbonate hydroxide powders before and after thermal treatment were collected using an X-ray diffractometer (Bruker D8), equipped with Cu-K$\alpha$ radiation (wavelength=1.5418 Å). The scanning angle (2 $\theta$) ranged from 10 to 80°, and a step size (2 $\theta$) of 0.05° with a counting time of 10 s/step was used to collect the spectra.

Fourier Transform Infrared Spectroscopy (FTIR)

Changes in chemical compounds during polymerisation were monitored by Fourier Transform Infrared Spectrometer (FTIR).

The degree of conversion of monomers to polymers was measured by determining the remaining double bonds from attenuated total reflection (ATR)-FTIR (ATR-FTIR). ATR-FTIR was performed by a Nicolet 8700 FTIR spectrometer with diamond crystal ATR attachment. Spectra were recorded in the range 400-4,000 $cm^{-1}$ with 4 $cm^{-1}$ resolution for 64 scans.

Nuclear Magnetic Resonance (NMR)

The structures of the monomers used in the reactions and the polymers formed were analysed by $^1$H NMR spectroscopy. The degree of monomer conversion and monomer consumption during polymerisation were monitored by $^1$H-NMR spectroscopy as well. The degree of conversion was measured by determination of remaining methylene (=$CH_2$) protons after polymerisation. Monomer consumption was calculated by comparing the integrated ratios of methylene (=$CH_2$) protons to polymeric methoxyl (—$OCH_3$) protons. $^1$H-NMR spectra were recorded on a Bruker Advance 400 MHz Spectrometer with $CDCl_3$ as solvent. Chemical shifts were determined with respect to tetramethylsilane (TMS) as an internal reference.

Size Exclusion Chromatography (SEC)

The molecular weight, molecular weight distribution and polydispersity index (PDI) of polymers were measured by size exclusion chromatography (SEC) equipped with a Waters model 510 pump, a Waters model 486 refractive index detector, and two Styragel HR 4.5 µm columns. THF was used as the eluent at 30° C. with a flow rate of 1.0 mL/min and the columns were calibrated with polystyrene standards obtained from Polymer Laboratories. Samples were filtered through microfilters with a pore size of 0.2 µm before injection.

Modulated Differential Scanning Calorimetry (MDSC)

Modulated Differential Scanning Calorimetry (MDSC) was used to thermally analyse polymer samples using a TA Instruments model Q1000. Heat flow curves were normalized to the mass of the polymer only and not to the mass of the total sample. Two heating scans and one cooling scan were taken from 35 to 250° C., at a rate of 2.5° C./min, a modulation amplitude of ±1° C., and a period of 60 s. The mass of the sample was approximately 7-8 mg, and the cell was purged with nitrogen gas at 50 mL/min during the scans.

The second heating scan was used to determine the glass transition data from the reversing heat flow curves so that all the samples were subjected to a similar thermal history.

The reported glass transition (Tg) was found by using the half-height temperature of the transition step, that is identifying the temperature range corresponding to the transition from a glassy to a rubbery state and taking the middle point of this temperature range.

Thermogravimetric Analysis (TGA)

The polymer degradation characteristics were determined by Thermogravimetric analysis (TGA) using a TGA Q (5000) instrument. Measurements were carried out under a nitrogen atmosphere, in the temperature range from 35 to 600° C., at a heating rate of 20° C. $min^{-1}$. The temperature at maximum process rate (Tmax), and mass loss (Dm) were determined by TA Instruments Universal Analysis 2000 software.

Fluorescence Spectroscopy (FL)

Without wishing to be bound by theory the inventors believe that terephthalic acid (TA) reacts with hydroxyl radical to produce the highly fluorescent product, 2-hydroxy terephthalic acid (TAOH) [1]. TAOH has a unique fluorescence peak around 425 nm. The intensity of this fluorescence peak is in proportion to the amount of hydroxyl radicals produced in solution [2]. Therefore, the formation of radicals was determined by Fluorescence spectroscopy using terephthalic acid (TA) as a probe for hydroxyl radical detection.

The fluorescence spectrum of each sample tested was recorded on a PerkinElmer LS 55 Fluorescence Spectrometer.

1.6 General Procedure for Preparing a TAOH Calibration Curve

To determine the relationship between TAOH concentration and the fluorescence intensity measured for a particular sample, a calibration curve was prepared as follows. Aqueous solutions of 2-hydroxyterephthalic acid (TAOH) at known concentrations between 0.5 and 4 µM (Solution 1 to 8) were prepared in aqueous NaOH (0.001 mol/L, pH=11, in distilled water) as described below.

Solution 1: Dissolved 1.457 mg of TAOH in NaOH solution in 2000 mL volumetric flask. This solution corresponds to 4 µM of TAOH (calculated based on the following information [M (TAOH)=182.13 g·mol−1] i.e. (0.001457 g/182.13)/2×1000,000). 20 mL of this TAOH solution 1 was placed in a small container (flask, vial).

Solution 2: Put 10 ml of the Solution 1 (4 µM) into another small container and diluted with 10 mL of NaOH solution to make a final solution with a TAOH concentration of 2 µM.

Solution 3: Put 10 ml of the Solution 2 (2 µM) into another small container and diluted it with 10 mL of NaOH solution to make a final solution with a TAOH concentration of 1 µM.

Solution 4: Put 10 ml of the Solution 3 (1 µM) into another small container and diluted it with 10 mL of NaOH solution to make a final solution with a TAOH concentration of 0.5 µM.

Solution 5: Put 10 ml of the Solution 1 (4 µM) and 10 ml of the Solution 2 (2 µM) into a small container to make a final solution with a TAOH concentration of 3 µM.

Solution 6: Put 10 ml of the Solution 5 (3 µM) into another small container and diluted it with 10 mL of NaOH solution to make a solution with a TAOH concentration of 1.5 µM.

Solution 7: Put 10 ml of the Solution 3 (2 µM) and 10 ml of the Solution 5 (3 µM) into a small container to make a final solution with a TAOH concentration of 2.5 µM.

Solution 8: Put 10 ml of the Solution 1 (4 µM) and 10 ml of the Solution 5 (3 µM) into a small container to make a final solution with a TAOH concentration of 3.5 µM.

The fluorescence (FL) instrument emission wavelength of each of solutions 1 to 8 was measured at 315 nm and the FL intensity was measured at 425 nm using a PerkinElmer LS 55 Fluorescence Spectrometer, starting with the solution with the lowest concentration.

Figure 16:
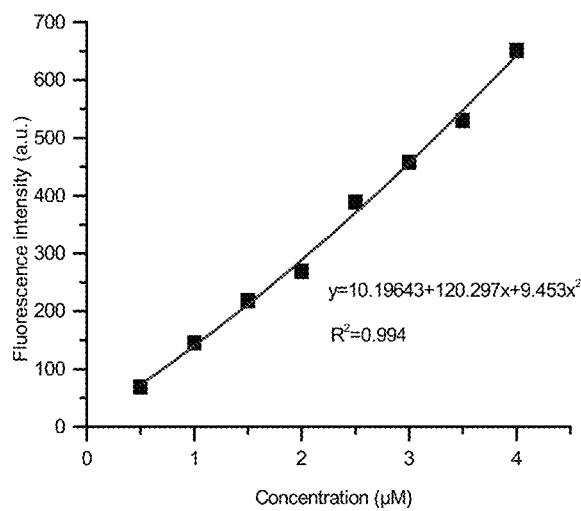
FIG. 16 is a fluorescence calibration curve showing the fluorescence intensity in absorbance units (a.u.) at various TAOH concentration (μM). The points on the curve produced the equation $y=10.19643+120.297x+9.453x^2$ and gave an $R^2$ value of 0.994.

The fluorescence intensity value measured at 425 nm for each of solutions 1 to 8 was plotted on a graph with fluorescence intensity (measured in absorbance units (a.u.)) on the y-axis and the concentration of the solution corresponding to that fluorescence intensity measurement on the x-axis to produce a calibration curve shown in FIG. 16.

1.7 General Procedure for Testing TAOH Generation by an Activated Metal Surface

Step 1

A terephthalic acid (TA) stock solution was prepared in dilute aqueous NaOH (0.001 mol/L in distilled water) to ensure its solubility. The pH value of the NaOH solution was 11. The TA stock solution was prepared by dissolving 5 mg of TA in the NaOH solution in a 1 L volumetric flask and the resulting TA stock solution was stored at room temperature (20-25° C.) in the dark until use. The stock solution had a TA concentration of 30.096 µM (0.005 g in 1 L) calculated based on the following information: $[M_{(TA)}=166.13$ g·mol$^{-1}]$ i.e. (0.005 g/166.13)×1000,000.

Step 2

A control sample was prepared by adding 15 ml of the TA stock solution (prepared as described in step 1 above) into an empty container.

The control sample was then left at room temperature in the dark for 1 h. After 1 hour, 2 ml of the control sample was withdrawn and analysed using a PerkinElmer LS 55 Fluorescence Spectrometer. Excitation spectra were monitored at 315 nm, and emission spectra were measured at 425 nm. The fluorescence intensity produced by the control sample at 425 nm was recorded and used in step 5 described below.

Step 3

All substrates in the form of 0.5 mm thick sheets were cut into square slides of 15 mm×15 mm in size (with a geometric area of 225 mm²). The substrates were then ultrasonically cleaned with ethanol and distilled water.

For substrates that underwent thermal treatment, thermal treatment was conducted at 400° C. or 600° C. for 2 hours in an ambient atmosphere in a furnace.

Step 4

To test the ability of a surface of a substrate to produce TAOH in the presence of TA, 15 ml of the TA stock solution (prepared as described in step 1 above) was added to a sample of the substrate (prepared as described in step 3 above) in a vial.

The sample was left at room temperature in the dark for 1 h, and then placed under UV irradiation (365 nm, 15 W) at room temperature (20-25° C.). After 1 hour, 2 ml of reaction solution was withdrawn and analysed using a PerkinElmer LS 55 Fluorescence Spectrometer. Excitation spectra were monitored at 315 nm, and emission spectra were measured at 425 nm. The fluorescence intensity produced by the sample substrate at 425 nm was recorded and used in step 5 described below.

Step 5

The fluorescence intensity of the control sample at 425 nm (as measured in step 2) was subtracted from the fluorescence intensity of the sample substrate at 425 nm as measured in step 4, to give a corrected fluorescence intensity of the sample substrate at 425 nm. The "corrected fluorescence intensity" is the fluorescence intensity of a substrate corrected for the background fluorescence intensity, that is, the fluorescence intensity of a control sample that does not comprise the substrate comprising the activated surface.

The corrected fluorescence intensity of the sample substrate at 425 nm was marked on the calibration curve shown in FIG. 16 (obtained as described in section 1.6 above), and the concentration of TAOH corresponding to that fluorescence intensity was read off the calibration curve. This concentration corresponds to the TAOH concentration produced by the surface of the sample substrate (prepared and tested as described in steps 3 to 5 above) in the presence of TA, corrected for the background TAOH concentration of a control sample that does not comprise the substrate comprising the activated surface 2. Example 1—Thermal Treatment and Characterisation of Galvanised Steel 2.1 Introduction Galvanised steel is steel coated with a zinc-containing layer for corrosion protection. Without wishing to be bound by theory, the inventors believe that zinc carbonate and zinc carbonate hydroxide may form on the surface of galvanised steel when the zinc layer is in contact with oxygen, carbon dioxide, and water in the atmosphere. The thermal treatment of galvanised steel and other substrates having a coating that comprises zinc may produce ZnO, for example by oxidising metallic zinc, and/or decomposing zinc carbonate or zinc carbonate hydroxide that may be present in the zinc layer.

This example describes conditions that may be used to form ZnO.

The thermal decomposition of reference zinc carbonate hydroxide powders was conducted to determine the thermal treatment temperature.

The chemical composition of the galvanised steel surfaces before and after thermal treatment was investigated by XPS.

The modified Auger parameter of Zn ($\alpha'$ Zn) was measured and compared to the literature values to identify the zinc compounds present [3]. The surface morphology and the qualitative elemental chemical of the substrates were also detected by SEM-EDS.

2.2 Experimental Method

The thermal treatment and characterisation of galvanised steel was conducted as described in sections 1.4 and 1.6. The thermal decomposition of reference zinc carbonate hydroxide was carried out by heat-treating zinc carbonate hydroxide powders at different selected temperatures (100° C., 200° C., 300° C., and 400° C.) for 2 hours.

The thermogravimetric analysis of the zinc carbonate hydroxide powders was conducted using a TGA Q 500 Instrument in a flowing air atmosphere (50 mL/min). Approximately 15 mg of the samples were heated in an open platinum crucible at the rate of 10.0° C./min up to 600° C. To analyse the decomposition process of zinc carbonate hydroxide further, the DTG curve was also recorded. The products of thermal decomposition were studied by XRD analysis.

2.3 Results and Discussion 2.3.1 Species Present on the Substrate Surface

Thermal decomposition of reference zinc carbonate hydroxide powders was carried out to investigate the effect of the thermal treatment temperature on the formation of ZnO.

The decomposition reaction of zinc carbonate hydroxide to form solid zinc oxide and gaseous carbon dioxide is illustrated by equation (1) below, with a theoretical maximum weight mass loss of 25.9% [4] [5] [6].

$$Zn_5(CO_3)_2(OH)_6 \rightarrow 5ZnO + 2CO_2 + 3H_2O \quad (1)$$

FIG. 1 shows TGA-DTG curves for the thermal decomposition of zinc carbonate hydroxide at the rate of 10° C./min in air. The curves show that zinc carbonate hydroxide pyrolyses in two steps with maximum rates of weight loss at 46° C. and 262° C. The small mass loss up to 100° C. may be from the loss of physisorbed water. Further mass loss starting from approximately 210° C. may be attributed to water loss as well as carbon dioxide loss from zinc carbonate hydroxide. Without wishing to be bound by theory the inventors believe that the final remaining solid material may be undecomposed zinc oxide. The total mass-loss due to the thermal decomposition was 24.6±0.1%, which agreed well with the theoretical value of 25.9% calculated above.

Figure 2:
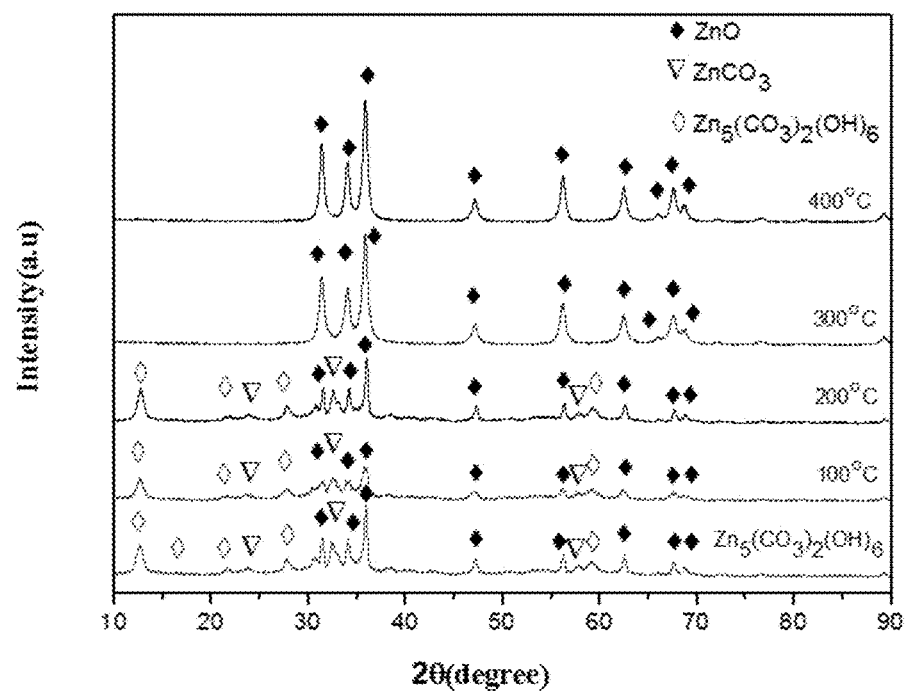
FIG. 2 shows the X-ray diffraction pattern of un-annealed zinc carbonate hydroxide powder (bottom trace) and the annealed zinc carbonate hydroxide powder at different thermal treatment temperatures of 100, 200, 300, and 400° C. (bottom trace to second trace from the top respectively). A key that uses the shapes, ♦, ∇ and ◇ is used to indicate the signals corresponding to particular chemical species such that ♦ is used to indicate a peak corresponding to ZnO, ∇ is used to indicate a peak corresponding to $ZnCO_3$ and ◇ is used to indicate a peak corresponding to o $Zn_5(CO_3)_2(OH)_6$. The y axis of FIG. 2 shows the intensity in absorbance units (a.u.) and the x axis is 2θ(degree).

Zinc carbonate hydroxide samples annealed at different selected temperatures (100-400° C.) were analysed by powder X-ray diffraction (FIG. 2). The diffraction pattern for zinc carbonate hydroxide powder annealed at 100° C. and 200° C. in FIG. 2 indicated the presence of both zinc oxide (Joint Committee on Powder Diffraction Standards (JCPDS) 36-1451), zinc carbonate (JCPDS 83-1765) and zinc carbonate hydroxide phases (JCPDS19-1458). The diffraction pattern for zinc carbonate hydroxide powder annealed at 300° C. and 400° C. in FIG. 2 was consistent with zinc oxide (JCPDF 36-1451), which indicates that the annealed powders at 300° C. and 400° C. are ZnO powders in the wurtzite hexagonal phase.

The TGA-DTG and XRD analyses showed that zinc carbonate hydroxide decomposed under thermal treatment in air via a two-stage process and the decomposition product was ZnO. The first stage was physisorbed water loss occurring at about 100° C. The decomposition occurred mostly at the second stage with simultaneous dehydration and decarbonation starting at about 210° C. and reaching a maximum weight loss of 24.6% at about 400° C. Hence, the thermal treatment was conducted at 400° C. or over 400° C. for 2 hours in ambient atmosphere to produce thermally treated galvanised steel (TTGS), and thermally treated Zincalume (TTZnAl).

2.3.2 Characterisation of Galvanised Steel

XRD was conducted to determine the crystalline phases of galvanised steel before and after thermal treatment. Comparison of the measured XRD spectra with reference spectra from the JCPDS database indicated that only metallic zinc (JCPDS 4-831) was detected on both UTGS and TTGS (600). After heat treatment, a zinc (201) peak on UTGS disappeared, whereas a new zinc (004) peak was detected on TTGS (600). Therefore, the results indicate that the thermal treatment has changed the Zn growth orientations. The finding that the only detectable phase is Zn is consistent with the findings of others. No zinc oxide, zinc carbonate, or zinc carbonate hydroxide were detected on both untreated and thermally treated galvanised steel by XRD. It may be that those compounds are still present on the galvanised steel surface but are undetectable by XRD, perhaps because they are in relatively small amounts on the surface or they are not very crystalline.

Since the zinc compounds on the galvanised surface may be too thin for bulk sensitive methods, sophisticated surface analytic methods such as XPS were performed to investigate the chemical composition of the galvanised steel prior to and after thermal treatment. XPS spectra of reference ZnO and zinc carbonate hydroxide compounds were collected. Reference ZnO powders were annealed just before analysis to reduce the interference of zinc carbonate residuals with the ZnO signal.

Figure 3A:
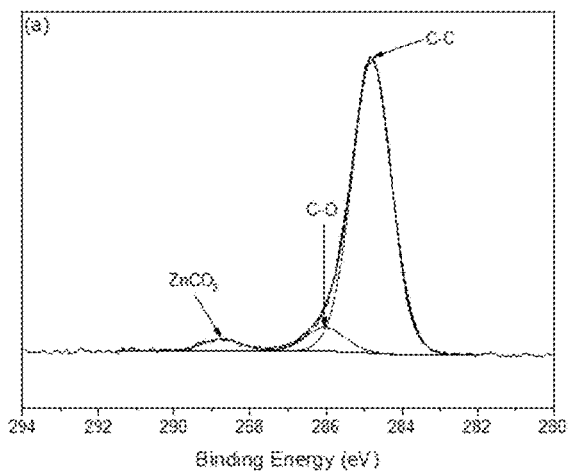
FIGS. 3(a) and 3(b) are X-ray Photoelectron Spectroscopy (XPS) spectra of C 1s (FIG. 3(a)), O 1s (FIG. 3(b)) Zn 2p 3/2 (FIG. 3(c)) and Zn $L_3M_{45}M_{45}$ (FIG. 3(d)) of reference annealed ZnO powders. The spectra show peaks at various binding energies (eV) and the signals (peaks) corresponding to particular chemical species are identified in each figure.
Figure 4A:
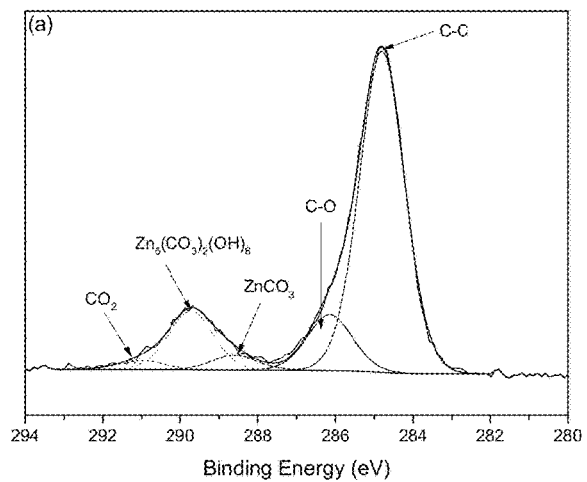
FIGS. 4(a) and 4(b) are C 1s (FIG. 4(a)), O 1s (FIG. 4(b)) Zn 2p 3/2 (FIG. 4(c)) and Zn $L_3M_{45}M_{45}$ (FIG. 4(d)) spectra of reference zinc carbonate hydroxide powders. The signals corresponding to particular chemical species are identified in each figure. The spectra show peaks at various binding energies (eV) and the signals (peaks) corresponding to particular chemical species are identified in each figure.

The XPS C 1s spectra taken from reference ZnO and zinc carbonate hydroxide compounds are shown in FIG. 3(a) and FIG. 4(a) respectively. Table 1 shows the relative atomic composition of C 1s components based on these spectra. The peak at 284.8 eV in both FIGS. 3(a) and 4(a) was assigned to adventitious carbon and used to correct binding energies (BE) of other components. The peak at 286.1 eV in both FIGS. 3(a) and 4(a) was assigned to C—O bond from contamination. The higher binding energy peaks in FIG. 4(a) at 288.7 eV and 289.7 eV were in good agreement with values reported for the carbonate and hydroxide carbonate, respectively. The peak at 291 eV was assigned to adsorbed $CO_2$. It is worth noting that carbonate peak also appears to exist in reference annealed ZnO (FIG. 3(a)).

TABLE 1

Component-fitted C 1 s spectra of reference ZnO and zinc carbonate hydroxide.

| | Relative atomic composition (%) | | | | |
|---|---|---|---|---|---|
| Sample BE (eV) | C—C 284.8 (eV) | C—O 286.1 (eV) | $CO_3^{2-}$ 288.7 (eV) | $(CO_3)_2(OH)_6^{10-}$ 289.7 (eV) | $CO_2$ 291 (eV) |
| ZnO | 89 | 7 | 4 | — | — |
| $Zn_5(CO_3)_2(OH)_6$ | 70 | 12 | 3 | 13 | 2 |

Figure 3B:
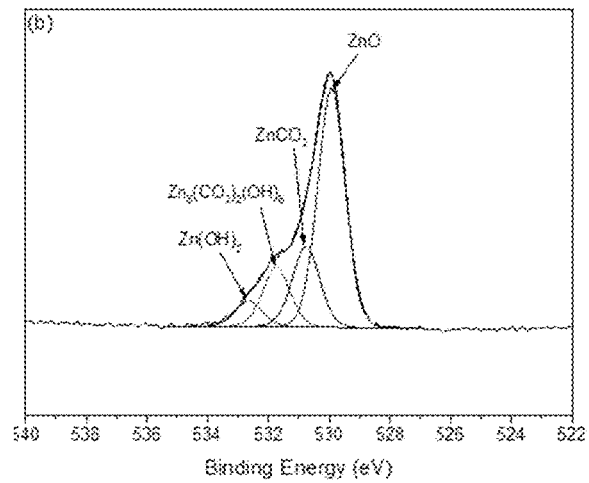
Figure 3C:
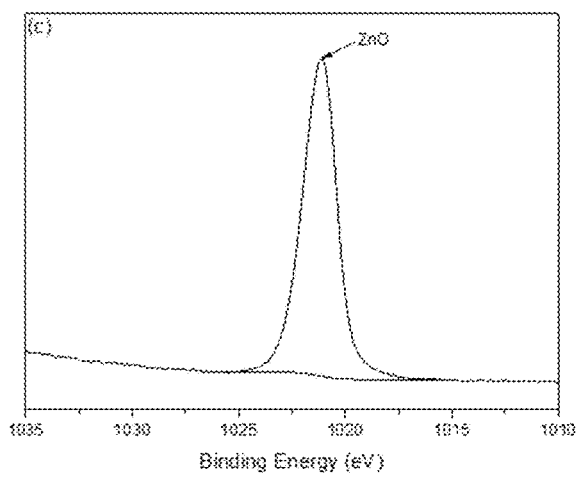
Figure 3D:
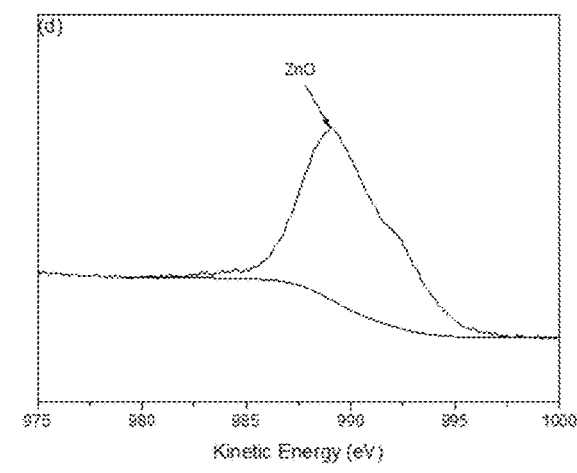
Figure 4B:
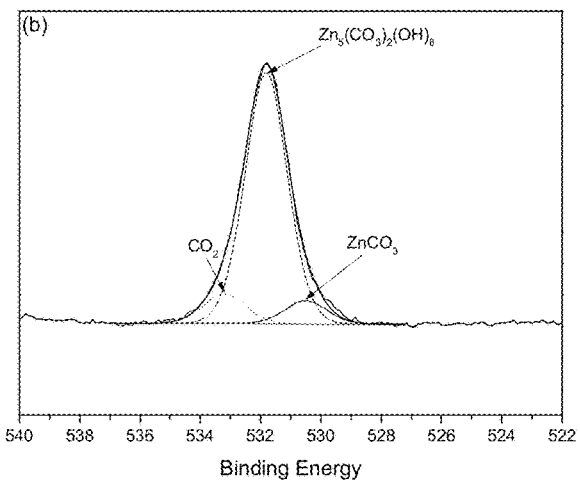
Figure 4C:
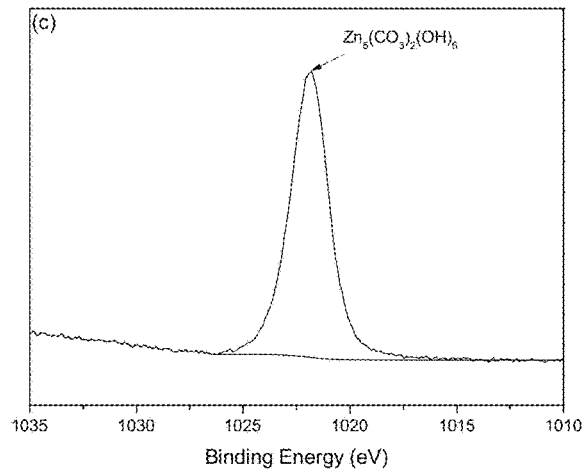
Figure 4D:
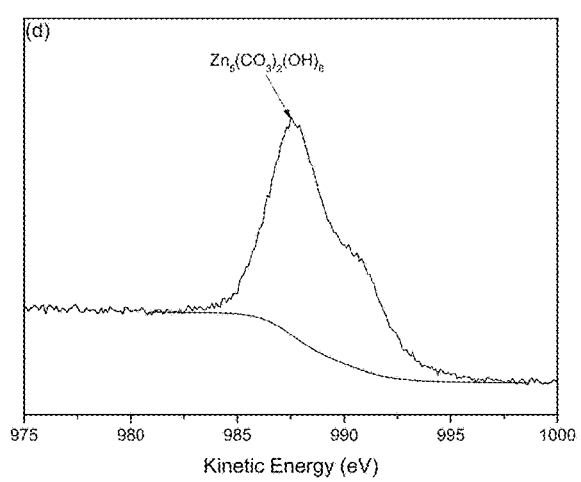

FIG. 3(b) and FIG. 4(b) show the XPS O 1s spectra of reference ZnO and zinc carbonate hydroxide compounds respectively. With reference to FIG. 3(b), the peak at 529.9 eV was ascribed to oxygen from zinc oxide, which is in good agreement with the literatures. The peaks at 530.7 eV and 531.7 eV (FIG. 3(b) and FIG. 4(b)) were attributed to carbonate and hydroxide carbonate, respectively based on literature values. A peak at 532.6 eV (in FIG. 3(b)) may be attributed to hydroxide.

With reference to the O 1s spectra in FIG. 4(b), the most intense peak was the reference annealed ZnO sample was the ZnO peak, and the most intense peaks in reference zinc carbonate hydroxide sample were those corresponding to zinc carbonate and zinc carbonate hydroxide. The O 1s spectrum of reference ZnO (shown in FIG. 3(b)) further supports the existence of $Zn_2CO_3$ and $Zn_5(CO_3)_2(OH)_6$ in reference annealed ZnO powders.

XPS spectra of Zn 2p 3/2; and Zn L3M45M45 of reference zinc oxide powders and reference zinc carbonate hydroxide powders were also recorded and the results are shown in FIGS. 3(c), 3(d) and 4(c), 4(d) respectively.

Table 2 shows the relative atomic compositions of O 1s components based on reference ZnO and zinc carbonate hydroxide.

TABLE 2

Component fitted O 1 s spectra of reference ZnO and zinc carbonate hydroxide

| | Relative atomic composition (%) | | | | |
|---|---|---|---|---|---|
| Sample BE (eV) | ZnO 529.9 (eV) | $CO_3^{2-}$ 530.7 (eV) | $(CO_3)_2(OH)_6^{10-}$ 531.7 (eV) | $(OH)_2^{2-}$ 532.6 (eV) | $CO_2$ 533.2 (eV) |
| ZnO | 59 | 20 | 14 | 7 | — |
| $Zn_5(CO_3)_2(OH)_6$ | — | 8 | 83 | — | 9 |

Without wishing to be bound by theory, the inventors believe that zinc species show only a small binding energy shift in the Zn 2p 3/2 region, and thus it may be difficult to differentiate Zn species. The use of the modified Auger parameter ($\alpha'$) is therefore preferred for Zn species identification.

The binding energies of the Zn 2p 3/2 peak, the kinetic energies of the Zn $L_3M_{45}M_{45}$ Auger peak, along with the corresponding modified Auger parameter ($\alpha'$) of the reference ZnO and zinc carbonate hydroxide were compared with the data of the NIST XPS database as shown in Table 3. The modified Auger parameters of the reference ZnO and zinc carbonate hydroxide compounds were 2010.2 eV and 2009.3 eV, respectively. The modified Auger parameters ($\alpha'$) of reference samples were very close to the values reported in NIST XPS database and other literatures.

TABLE 3

Modified Auger parameter of measured reference materials: ZnO, and Zinc carbonate hydroxide.

| | NIST XPS Database | | | Reference Samples | | |
|---|---|---|---|---|---|---|
| Chemical State | BE Zn $2p_{3/2}$ | KE Zn $L_3M_{45}M_{45}$ | $\alpha'$ | BE Zn $2p_{3/2}$ | KE Zn $L_3M_{45}M_{45}$ | $\alpha'$ |
| ZnO | 1021.9 | 988.2 | 2010.1 | 1021.1 | 989.1 | 2010.2 |
| $Zn_5(CO_3)_2(OH)_2$ | 1021.8 | 987.5 | 2009.3 | 1021.8 | 987.5 | 2009.3 |

Figure 5:
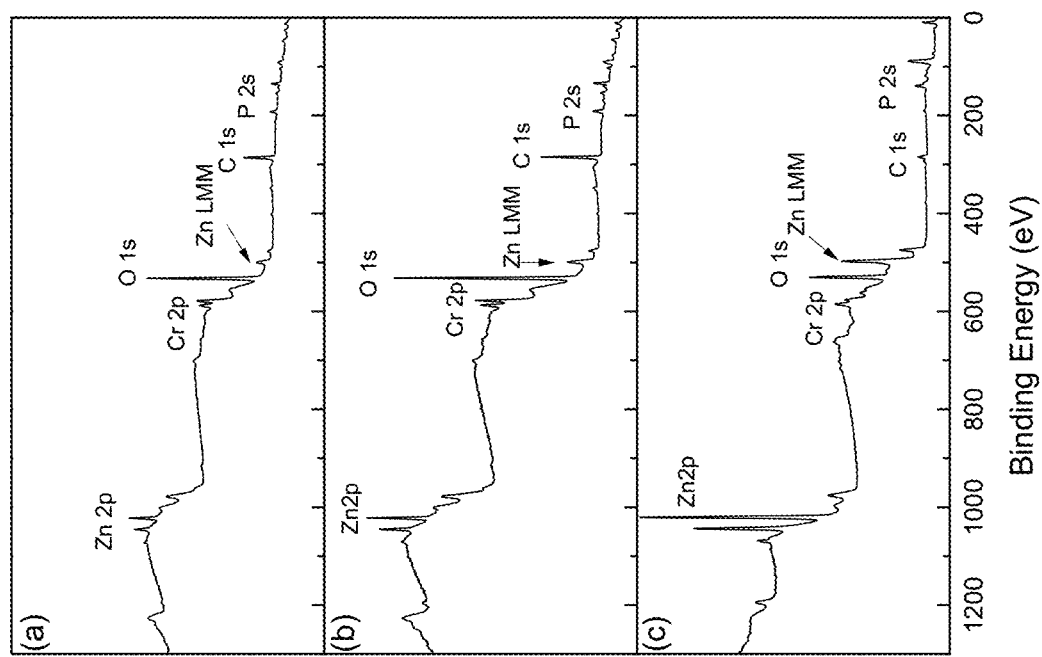
FIGS. 5(a) to 5(c) are XPS spectra taken from untreated galvanised steel (UTGS) (FIG. 5(a)), thermally treated galvanised steel thermal treated at 400° C. (TTGS (400)) (FIG. 5(b)), and thermally treated galvanised steel thermal treated at 600° C. (TTGS (600)) (FIG. 5(c)). The spectra show peaks at various binding energies (eV) and the signals (peaks) corresponding to particular chemical species are identified on each spectrum.
Figure 8:
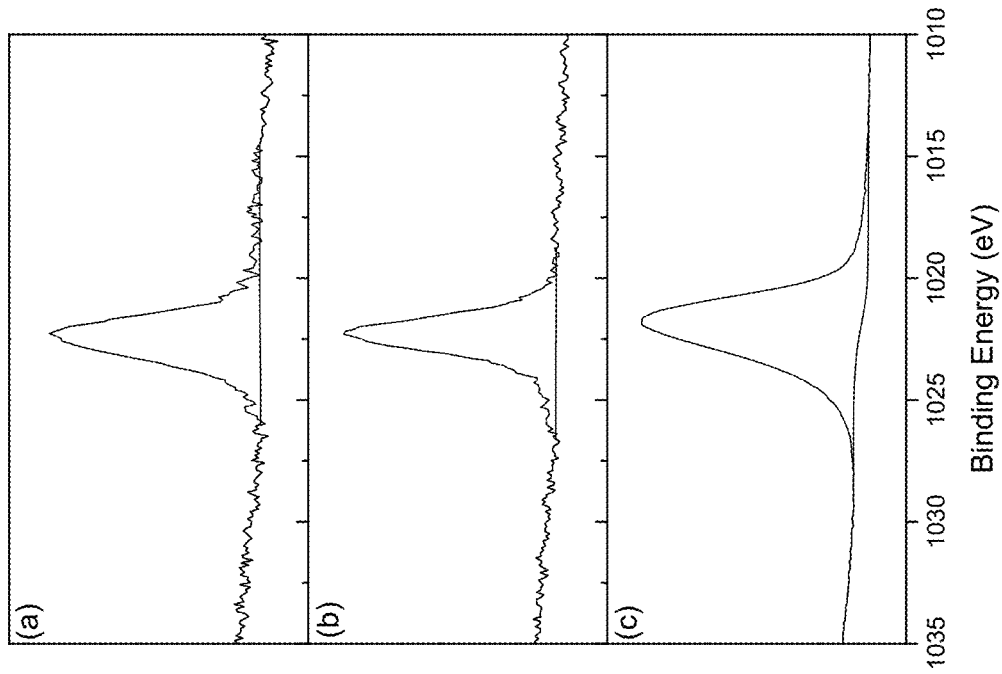
FIG. 8(a) to 8(c) shows the Zn 2p3/2 spectra taken from (a) UTGS, (b) TTGS (400), and (c) TTGS (600).

The reference spectra as described above were used as a baseline for the peak deconvolution of the galvanised steel samples. That is, to enhance the accuracy of the curve-fitting and chemical assessment, the spectra of the pure reference compounds were used to fit and evaluate the experimental XPS spectra. The XPS survey of untreated galvanised steel (UTGS), galvanised steel thermal treated at 400° C. (TTGS (400)), and galvanised steel thermal treated at 600° C. (TTGS (600)) are shown in FIG. 5.

Table 4 presents the elemental composition of the galvanised steel surface before and after thermal treatment. Along with carbon, oxygen and zinc, small amounts of chromium, phosphorus, and calcium were detected on the surface of the steel samples. It was found that the Zn and O signal increased with annealing temperature. In contrast, the intensity of the C signal decreased with annealing temperature.

TABLE 4

Elemental composition of UTGS, TTGS (400), and TTGS (600)

| | Relative atomic composition (%) | | | | | | |
|---|---|---|---|---|---|---|---|
| Samples | C 1s | O 1s | Zn 2p 3/2 | Cr 2p 3/2 | P 2s | Ca 2p | N 1s |
| UTGS | 40 | 43 | 2 | 5 | 8 | <1 | 1 |
| TTGS (400) | 38 | 45 | 3 | 5 | 7 | <1 | <1 |
| TTGS (600) | 17 | 52 | 22 | 4 | 4 | <1 | — |

Figure 6:
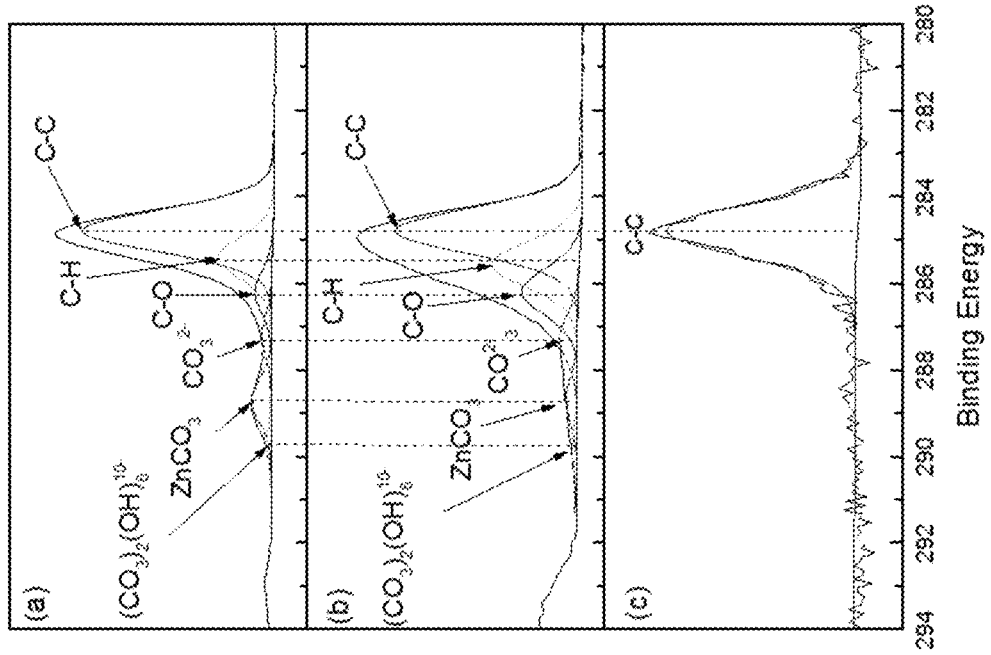
FIGS. 6(a) to 6(c) show the C 1s spectra taken from UTGS (FIG. 6(a)), TTGS (400) (FIG. 6(b)) and TTGS (600) (FIG. 6(c)). The spectra show peaks at various binding energies (eV) and the signals (peaks) corresponding to particular chemical species are identified on each spectrum.
Figure 7:
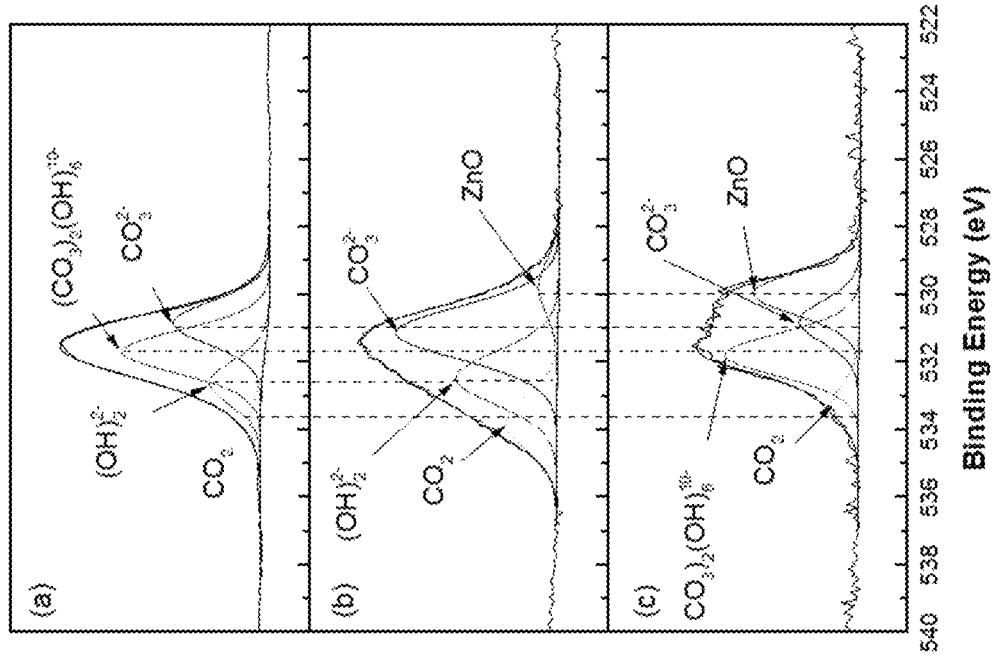
FIGS. 7(a) to 7(c) show the O 1s spectra taken from UTGS (FIG. 7(a)), TTGS (400) (FIG. 7(b)) and TTGS (600) (FIG. 7(c)). The spectra show peaks at various binding energies (eV) and the signals (peaks) corresponding to particular chemical species are identified on each spectrum.
Figures 9A, 9B, 9C:
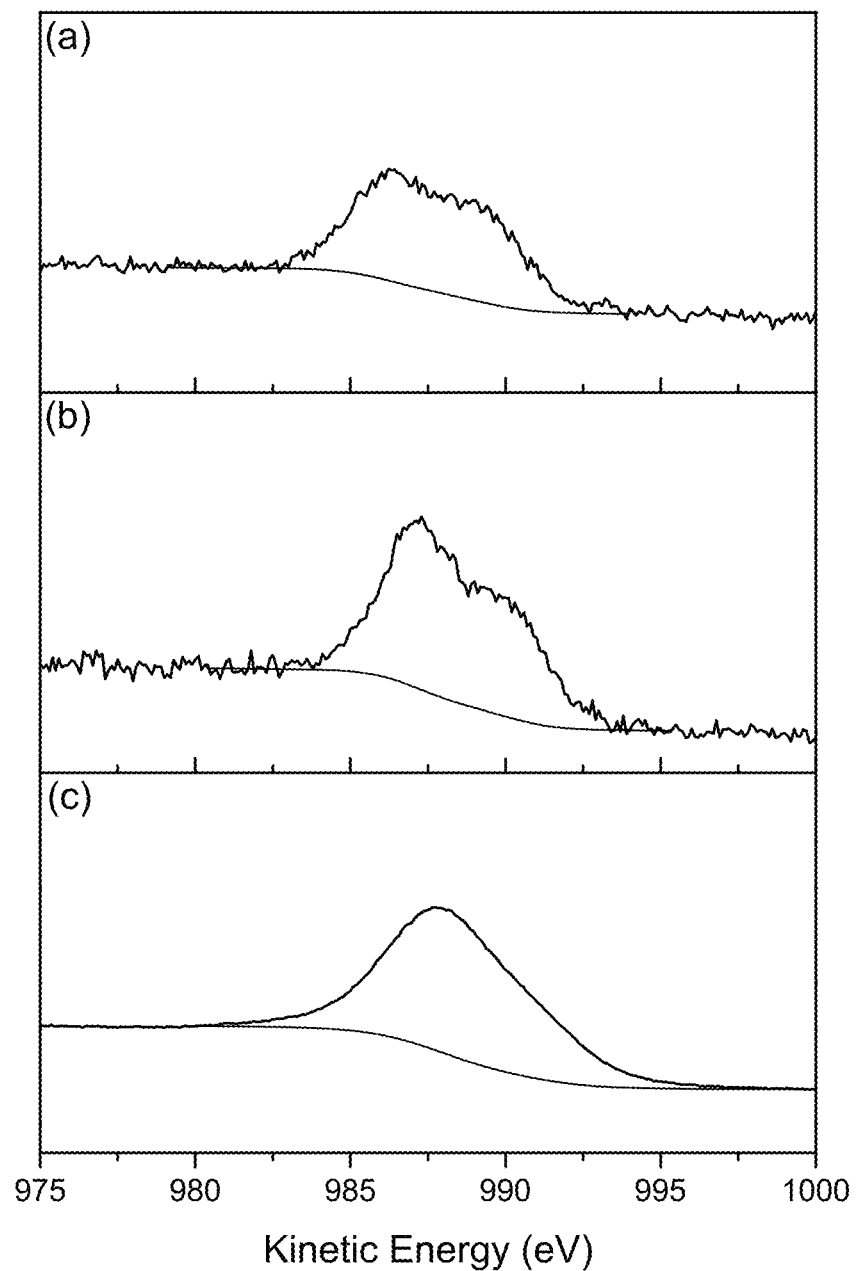
FIG. 9(a) to 9(c) shows the Zn $L_3M_{45}M_{45}$ spectra taken from (a) UTGS, (b) TTGS (400), and (c) TTGS (600).

The higher resolution spectra of C 1s, O 1s, Zn 2p 3/2, and Zn $L_3M_{45}M_{45}$ were recorded and the C 1s and O 1s spectra are shown in FIGS. 6 and 7 respectively for UTGS, TTGS (400), and TTGS (600). Peak positions determined from the reference spectra of ZnO and zinc carbonate hydroxide samples were used in the data fitting.

The component-fitted C 1s and O 1s spectra of galvanised steel samples match well with the spectra of the ZnO and zinc carbonate hydroxide reference samples. The most intense peaks in the C 1s spectra of UTGS, TTGS (400), and TTGS (600) appeared to be from common surface contamination-adventitious carbon. The C 1s spectra indicated the presence of zinc carbonate and zinc carbonate hydroxide on the surface of UTGS and TTGS (400), while only adventitious carbon was detected in TTGS (600). The intensity of the zinc carbonate signal decreased with an increase in annealing temperature, indicating the decomposition of zinc carbonate compounds on the galvanised steel surface.

In the O 1s spectra shown in FIG. 7, most of the peaks for UTGS and TTGS (400) were from zinc carbonate and zinc carbonate hydroxide. The relative O 1s atomic percentage in FIG. 7 (b) showed that approximately 6% and 38% of the oxygen was present as ZnO in TTGS (400) and TTGS (600) respectively. These results indicated the existence of zinc carbonate hydroxide on the surfaces of all galvanised steel substrates and indicated the formation of ZnO on TTGS (400) and TTGS (600) surfaces.

Table 5 shows the relative atomic composition of C 1s components based on UTGS, TTGS (400), and TTGS (600).

TABLE 5

Results of the component-fitted C 1s spectra of UTGS, TTGS (400), and TTGS

| | Samples | | | Relative atomic composition (%) | | |
|---|---|---|---|---|---|---|
| BE(eV) | C—C 284.8 (eV) | C—H 285.4 (eV) | C—O 286.1 (eV) | $CO_3^{2-}$ 287.2 (eV) | $ZnCO_3$ 288.7 (eV) | $(CO_3)_2(OH)_6^{10-}$ 289.7 (eV) |
| UTGS | 65 | 18 | 6 | 3 | 7 | 1 |
| TTGS 400 | 51 | 24 | 16 | 5 | 3 | 1 |
| TTGS 600 | 100 | — | — | — | — | — |

Table 6 shows the relative atomic composition of O 1s components based on UTGS, TTGS (400), and TTGS (600).

TABLE 6

Results of the component-fitted O 1 s spectra of UTGS, TTGS (400), and TTGS (600)

| | Relative atomic composition (%) | | | | |
|---|---|---|---|---|---|
| Samples | ZnO 529.9 (eV) | $CO_3^{2-}$ 530.7 (eV) | $(CO_3)_2(OH)_6^{10-}$ 531.7 (eV) | $(OH)_2^{2-}$ 532.6 (eV) | $CO_2$ 533.2 (eV) |
| UTGS | — | 32 | 48 | 17 | 3 |
| TTGS 400 | 6 | 48 | — | 30 | 16 |
| TTGS 600 | 38 | 9 | 47 | — | 6 |

TABLE 7

Modified Auger parameters of (a) UTGS, (b) TTGS (400), and (c) TTGS (600)

| | BE (eV) Zn $2p_{3/2}$ | KE (eV) Zn $L_3M_{45}M_{45}$ | a' |
|---|---|---|---|
| UTGS | 1022.3 | 986.9 | 2009.2 |
| TTGS (400) | 1022.3 | 987.2 | 2009.5 |
| TTGS (600) | 1021.7 | 988.3 | 2010 |

In Table 7, the modified Auger parameter (α') of Zn on untreated and thermally treated galvanised steel are shown. The modified Auger parameters were compared with the data of the NIST XPS database and our reference samples (Table 3). Due to the small binding energy shift in the Zn2p3/2 region and the spectral overlap in the Zn $L_3M_{45}M_{45}$ spectra, the mixed systems of metal, metal oxide, and metal carbonate were difficult to quantify. In FIGS. 8(a) to (c) and 9(a) to (c), the most intense peak of Zn2p3/2 and Zn $L_3M_{45}M_{45}$ respectively was used for calculation. The modified Auger parameter of UTGS was at 2009.2 eV, matching with the value for $Zn_5(CO_3)_2(OH)_6$ from our reference and NIST XPS database. This match indicated the existence of $Zn_5(CO_3)_2(OH)_6$ on the surface of UTGS.

The modified Auger parameters of TTGS (400) was 2009.5 eV, which is between the α' of ZnO (2010.2 eV) and $Zn_5(CO_3)_2(OH)_6$ (2009.3 eV). This value may be attributed to a mixture of ZnO and $Zn_5(CO_3)_2(OH)_6$ on the surface of the TTGS (400). However, the modified Auger parameter value of the TTGS (400) was unable to unambiguously identify the zinc compounds on the surface.

The modified Auger parameter of the TTGS (600) was 2010.0 eV, which was in good agreement with the reference ZnO sample, indicating the existence of ZnO on TTGS (600).

The analysis of XPS spectra and modified Auger parameters pointed to the conclusion that zinc carbonate and zinc carbonate hydroxide were present on the surface of all the galvanised steel samples, and indicated that both thermally treated galvanised steel surfaces contained a complex mixture of zinc compounds with some ZnO present. The amount of ZnO on the thermally treated galvanised steel surface increased with the thermal treatment temperature, whereas carbonate compounds decreased with an increase in temperature.

2.3.3 Morphology of Galvanised Steel Samples Before and After Thermal Treatment

Figure 10:
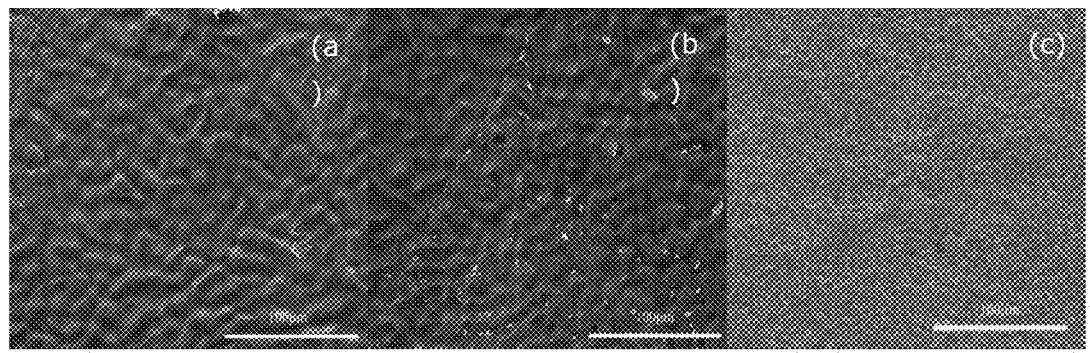
FIGS. 10(a) to 10(c) are scanning electron microscopy (SEM) secondary electron images (SEI) of UTGS (FIG. 10(a)), TTGS (400) (FIG. 10(b)) and TTGS (600) (FIG. 10(c)). The scale bar in each of these figures corresponds to 100 μm.

The morphology and qualitative elemental composition of the galvanised steel before and after thermal treatment were analysed by SEM-EDS. The secondary electron images (SEI) of the galvanised steel prior to and after thermal treatment are shown in FIG. 10.

The UTGS sample exhibited typical wrinkled morphology, consisting of plateaus, valleys and dispersed pores (FIG. 10(a)). The TTGS (400) exhibits a similar surface topography, as shown in FIG. 10(b), but with more pores than the UTGS. Dramatic changes were observed after thermal treatment at 600° C. The TTGS (600) contained grains in the range of 1-5 μm (FIG. 10(c)). This change may be attributed to the thermal decomposition of zinc compounds and the oxidation of zinc on the galvanised steel surface.

Figure 11:
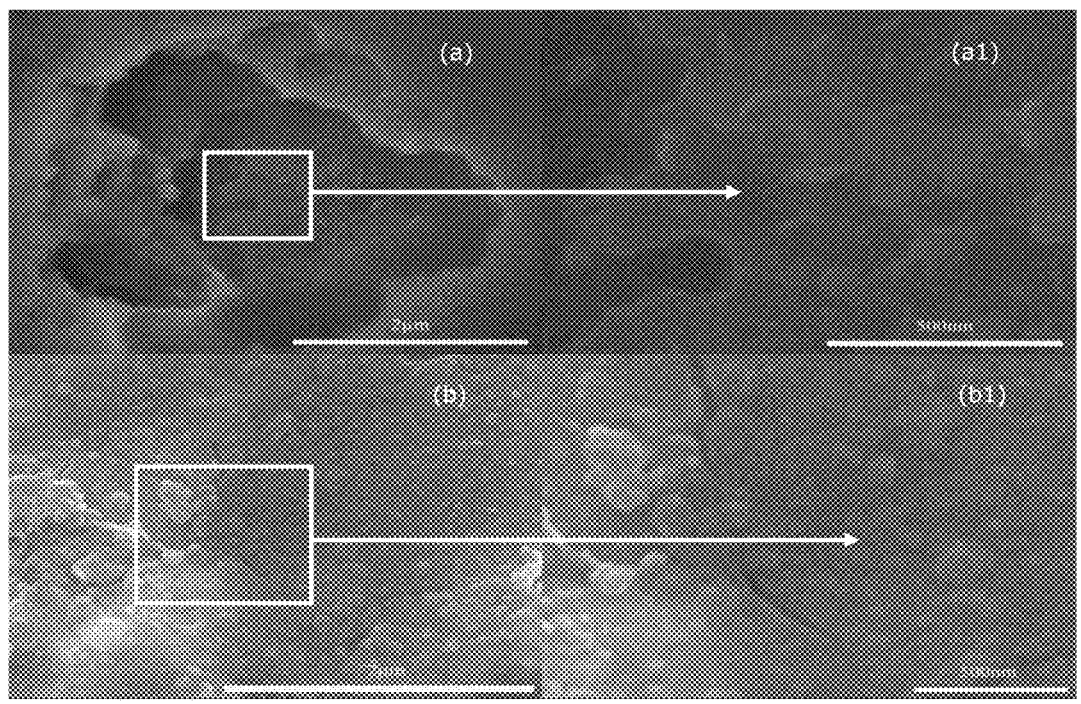
Figure 12:
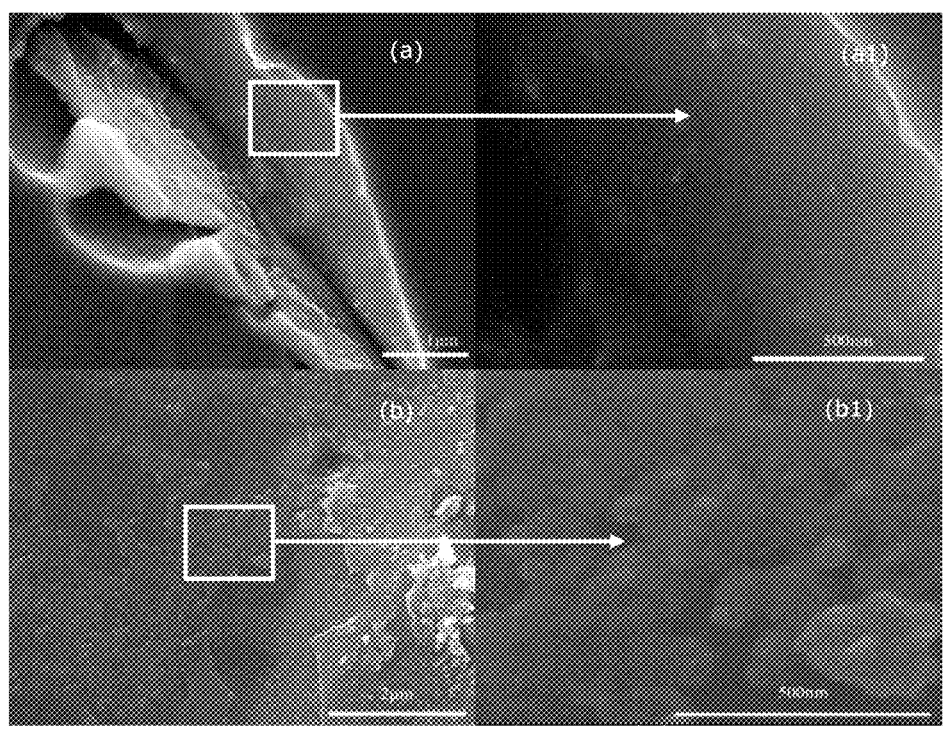
Figure 13:
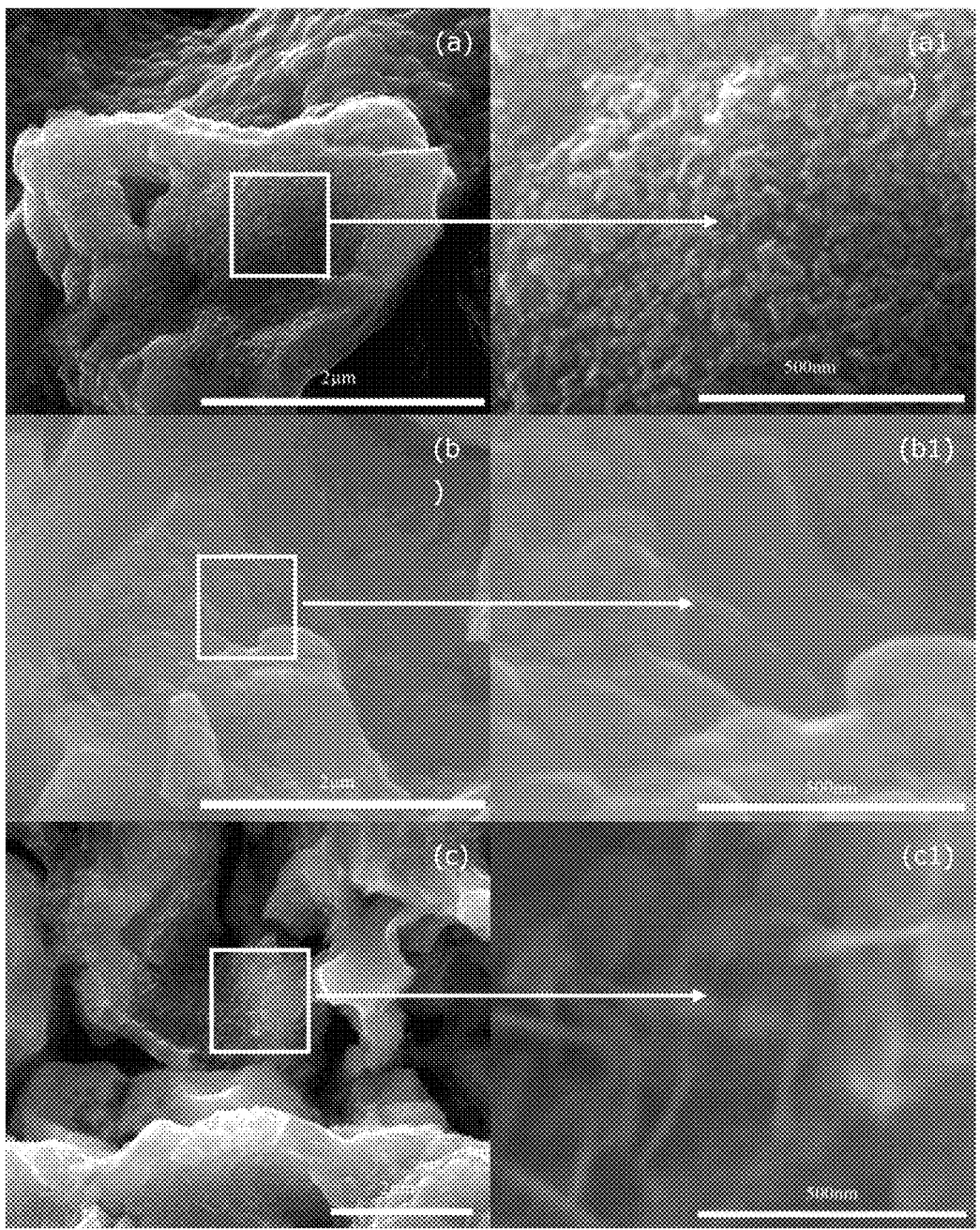

To further investigate the structure of the pores, granular particles and substrate in both untreated and thermally treated galvanised steel, secondary electron images (SEI) were taken at a higher magnification. As shown in FIG. 11 (UTGS) and FIG. 12 (TTGS (400)), both the UTGS and TTGS (400) exhibited micrometre-scale irregular pores, and there was no detectable nanostructure inside the pores. Individual and aggregated spherical nanoscale grains were observed on both the UTGS and TTGS (400) with no significant difference in shape and size. SEM images of galvanised steel annealed at 600° C. (FIG. 13) showed that the TTGS (600) was composed of pebble-shaped, aggregated spherical and needle-shaped grains of nanoscale size.

Figure 14:
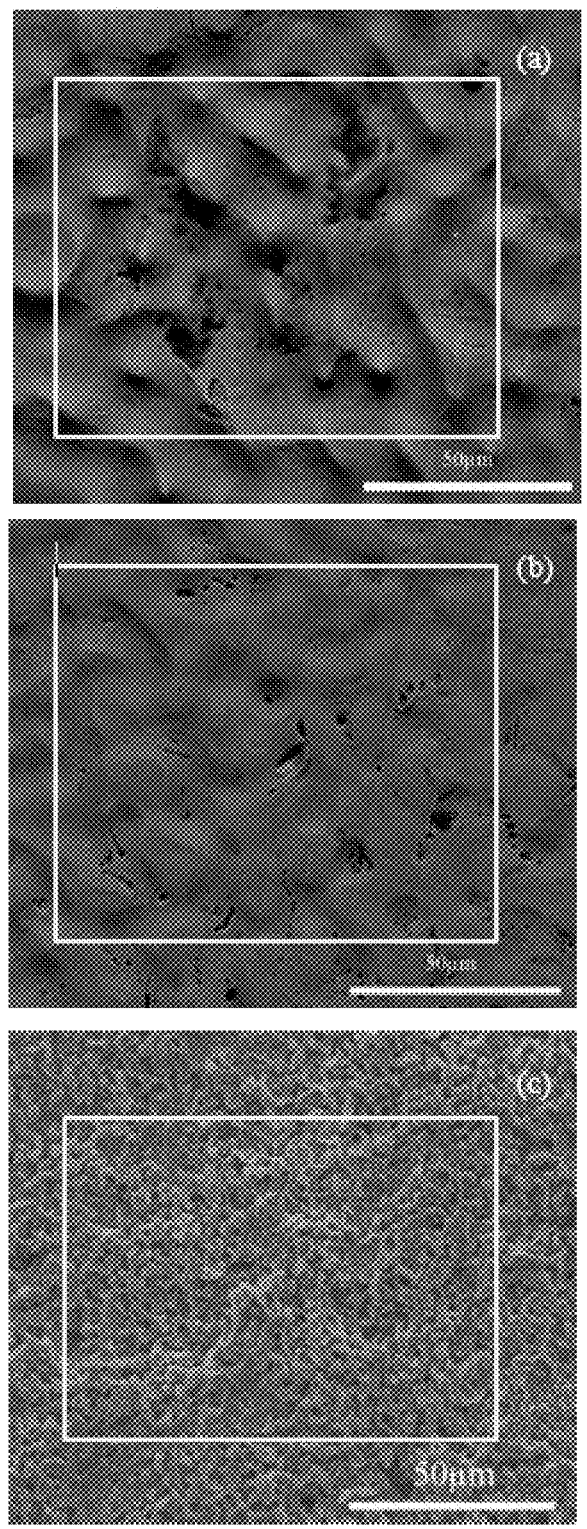
FIG. 14 are SEM backscattered electron images (BSE) of UTGS (FIG. 14(a)), TTGS (400) (FIG. 14(b)) and TTGS (600) (FIG. 14(c)).

To analyse the elemental composition of the samples, backscattered electron images and the corresponding EDS spectra were taken in different regions of the samples. The backscattered electron images of UTGS, TTGS(400) and TTGS(600) and the corresponding EDS spectra (see FIG. 14). The analysis revealed that the surface of all three substrates consists of primarily zinc with trace amounts of Fe, Pb, Al, Cr, and Ca as shown in Tables 8 below.

TABLE 8

Analysis of the elemental composition of UTGS, TTGS (400) and TTGS (600)

| | | \multicolumn{7}{c}{Element} | | | | | | |
|---|---|---|---|---|---|---|---|---|
| | | C | O | Zn | Al | Ca | Cr | Fe |
| UTGS | Wt % | 5.42 | 0.84 | 90.25 | 0.67 | 0.3 | 0.3 | 0.41 |
| | At % | 23.2 | 2.7 | 71.39 | 0.67 | 0.39 | 0.3 | 0.38 |
| TTGS | Wt % | 3.59 | 1.08 | 92.4 | 0.41 | 0.15 | 0.08 | 0.43 |
| (400) | At % | 16.37 | 3.71 | 77.88 | 0.83 | 0.21 | 0.09 | 0.42 |
| TTGS | Wt % | 1.18 | 4 | 75.92 | 1.33 | 0.15 | 0.26 | 14.87 |
| (600) | At % | 5.32 | 13.54 | 65.96 | 2.67 | 0.2 | 0.27 | 14.44 |

The concentration of Fe in the TTGS (600) sample (15%) was higher than in the UTGS sample (1%) and TTGS sample (400) (1%). In addition, the concentration of C in the UTGS sample (5%) was higher than in the TTGS (400) sample (4%) and the TTGS (600) sample (1%). Conversely, the O concentration increased with an increase in the annealing temperature. These results are consistent with XPS analysis and may indicate the decomposition of zinc carbonate hydroxide and the formation of ZnO on the galvanised steel surface.

2.4 Conclusion

A comparative study of the surface chemistry of galvanised steel before and after thermal treatment was carried out using XPS and SEM-EDS. The investigation of thermal decomposition of zinc carbonate hydroxide reference powders indicated the formation of ZnO by thermal decomposition of zinc carbonate hydroxide and was used to determine the heat treatment temperature that may be used for the galvanised steel substrates.

The XPS spectra and modified Auger parameters indicated the existence of zinc carbonate and zinc carbonate hydroxide on the surface of all galvanised steel samples, and confirmed that both the thermally treated galvanised steel surfaces (TTGS (400) and TTGS (600)) contain a complex mixture of zinc compounds with some ZnO present.

XPS results also indicated the decrease of carbonate compounds and the increase of ZnO with an increase in thermal treatment temperature, which may be the result of the thermal decomposition of zinc carbonate and zinc carbonate hydroxide, or oxidation of metallic zinc to form ZnO.

The SEM results revealed the change in morphology of galvanised steel with thermal treatment. More pores were observed on the TTGS (400) surface than on the UTGS, and there was no nanostructure inside the pores. Individual and aggregated spherical nanoscale particles were observed on the untreated and thermally treated galvanised steel substrate. More obvious morphological changes were observed after thermal treatment at 600° C. The TTGS (600) was composed of pebble-shaped particles, aggregated spherical particles and needle-shaped particles with nano-scaled size.

3. Example 2—Investigating the Surface-Initiated Controlled Radical Polymerisation (CRP) of Vinyl Monomers Using Galvanised Steel as the Photoinitiator The previous Examples showed that ZnO forms on the surface of thermally treated galvanised steel. This example examined the photoinitiation efficiency of ZnO on the surface of thermally treated galvanised steel (TTGS).

Polymerisations of several vinyl monomers were carried out using TTGS substrates as photoinitiators. The polymerisation mechanism was elucidated through a series of experiments. The monomer consumptions during polymerisation were monitored to give insight into polymerisation kinetics. Some of the key properties of the resultant polymers were measured.

3.1 Experiment 3.1.1 Materials

Methyl methacrylate (MMA), butyl methacrylate (BMA), methyl acrylate (MA), and butyl acrylate (BA) were purified and stored in a nitrogen atmosphere and fridge at 4° C. before use. The purification of the monomers was conducted as described in section 1.3 above.

Poly (ethylene glycol) methyl ether methacrylate (PEG-MEMA), diurethane dimethacrylate (DUDMA), chloroform-D ($CDCl_3$), tetrahydrofuran (THF), terephthalic acid (TA), and 2-hydroxy terephthalic acid (TAOH) were used as received.

UTGS, TTGS (400) and TTGS (600) sheets were ultrasonically cleaned with distilled water. A 15 W UV lamp (365 nm) was obtained from UVTech Systems, Inc.

3.1.2 General Procedures for Homopolymerisation

Vinyl monomers (MMA/MA/BMA/BA/DUDMA/PEG-MEMA) (0.1 mol) and galvanised steel substrate (UTGS/TTGS (400)/TTGS (600)) were added to a 20 ml vial and the reaction mixture was irradiated with a UV light (15 W, $\lambda$=350 nm) at room temperature for one hour. The sealed vial was held at a fixed temperature (60° C.) in an oven for different durations of time (0-48 h).

3.1.3 General Procedures for Block Copolymerisation

After the polymerisation of MMA, the obtained polymer (PMMA) was placed in a new monomer solution (MMA or BMA), and the reaction mixture was held at 60° C. for different durations of time to get block copolymers.

3.1.4 Characterisation

Fluorescence spectroscopy was used to probe the hydroxyl radicals formed on the UV-illuminated UTGS, TTGS (400) and TTGS (600) photoinitiators.

The change in chemical compounds during polymerisation was monitored by ATR-FTIR.

The molecular weights and polydispersity index (PDI) of the resulting polymers were measured by size exclusion chromatography (SEC).

The monomer consumptions and structural changes during polymerisation were monitored by $^1H$ NMR spectroscopy.

3.2 Results and Discussion

The first investigation determined the ability of a galvanised steel surface to photo-initiate polymerisation under UV illumination. As this system does not contain any catalyst that requires an inert atmosphere to retain activity, all the polymerisations were conducted in an ambient atmosphere to simplify the reaction setup.

The polymerisations of methyl methacrylate (MMA) were first performed at 60° C. without UV irradiation or under one-hour UV irradiation, and without using any initiator or additional materials. MMA monomers were also polymerised without UV irradiation at 60° C., using UTGS, TTGS (400) or TTGS (600) as photoinitiators.

Polymerisations of MMA were conducted under UV irradiation for one hour, using UTGS, TTGS (400) or TTGS (600) as photoinitiators. The reaction mixtures were then placed in the dark at 60° C. for 48 hours. The presence of a transparent solid polymer indicated that polymerisation had occurred and PMMA polymers were synthesised.

The resulting materials were identified by $^1H$ NMR. The detailed reaction conditions and the observation of resulting materials are listed in Table 9.

| Photo-initiators | UV irradiation time (hour) | Reaction temperature (° C.) | Phase | Resulting materials |
| --- | --- | --- | --- | --- |
| — | — | 60 | Liquid | MMA monomer |
| — | 1 | 60 | Liquid | MMA monomer |
| UTGS | — | 60 | Liquid | MMA monomer |
| TTGS (400) | — | 60 | Liquid | MMA monomer |
| TTGS (600) | — | 60 | Liquid | MMA monomer |
| UTGS | 1 | 60 | Liquid | A mixture of MMA and PMMA |
| TTGS (400) | 1 | 60 | Solid | PMMA polymer |
| TTGS (600) | 1 | 60 | Solid | PMMA polymer |

Table 9. The polymerisation of MMA at different reaction conditions and the observation of resulting materials. Reaction conditions: Monomer: MMA, Monomer weight: 0.094 mol, UV intensity: 15 W, reaction time in dark: 48 h.

The resulting polymers were also characterised by ATR-FTIR. The distinctive absorption band around 1640 cm$^{-1}$ in the spectra of the MMA monomer and the polymer prepared by UTGS, which was assigned to carbon double bond (C=C). The high residual quantity of double bonds in the polymer prepared by UTGS was taken to be indicative of incomplete polymerisation. However, the absorption peak at the same wavenumber (1640 cm$^{-1}$) was not observed for polymers prepared by TTGS (400) and TTGS (600). This disappearance of the carbon double bond peak confirmed that polymerisation occurred and PMMA polymers were synthesised using TTGS (400) and TTGS (600) photoinitiators.

The next investigation focused on elucidating the mechanism of polymerisation. Without wishing to be bound by theory the inventors believe that the mechanism may involve the formation of ZnO photocatalyst on the galvanised steel surface, and photo-excitation of the ZnO to produce hydroxyl radicals that are capable of initiating polymerisation. The inventors believe that upon UV illumination of ZnO photocatalysts, conduction-band electrons ($e_{cb}^-$) and simultaneously valence-band holes ($h_{vb}^-$) may be produced. The electrons and holes may respectively react with oxygen and water from the atmosphere to generate hydroxyl radicals. To validate this proposed mechanism, the production of hydroxyl radicals on galvanised steel surface was investigated.

To evaluate the photocatalytic activity of the galvanised steel surface, fluorescence spectroscopy was used to detect hydroxyl radicals formed on UV-illuminated UTGS, TTGS (400) and TTGS (600). Terephthalic acid (TA) was used as a fluorescence probe for hydroxyl radicals as it reacts with the radicals to produce the highly fluorescent product, 2-hydroxy terephthalic acid (TAOH). The intensity of the fluorescence peak is proportional to the amount of hydroxyl radicals produced in the solution.

Figure 15:
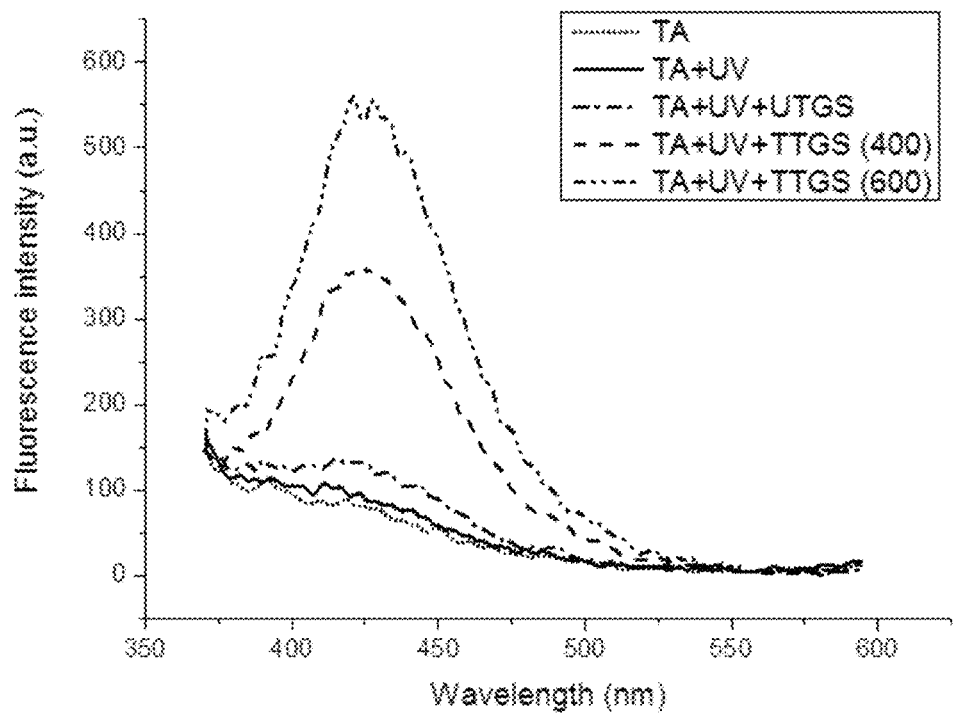
FIG. 15 shows the formation of 2-hydroxy terephthalic acid (TAOH) from terephthalic acid (TA) after one hour of UV irradiation measured by fluorescence spectroscopy in the presence and absence of UTGS, TTGS(400) and TTGS (600).

FIG. 15 shows the formation of TAOH in NaOH solution after one-hour of UV irradiation. The spectra of the TA control and UV alone had no peak at 425 nm, indicating TAOH was not formed by UV irradiation alone. There was a small peak in the UTGS spectrum and the peak intensity of UTGS was slightly higher than the TA control background. This small peak may be attributed to a small amount of TAOH present in solution. The spectra of TTGS (400) and TTGS (600) showed an intense peak at 425 nm corresponding to TAOH.

To calculate the TAOH concentration produced by each of the samples tested from the fluorescence intensity measured above and shown in FIG. 15, a calibration curve was prepared using the fluorescence intensity (a.u.) measured for solutions of known concentrations of TAOH (µM) (prepared and measured as described in section 1.6). The resulting calibration curve is shown in FIG. 16.

The fluorescence intensity at 425 nm of each of the substrates tested (UTGS, TTGS (400) and TTGS (600)) were used to calculate the TAOH concentration produced by each sample based on the calibration curve in FIG. 16 (as described in section 1.7).

Table 10 below shows the fluorescence intensity of each of the substrates tested at 425 nm as shown in FIG. 15. The TAOH concentration* shown in Table 10 is the corrected TAOH concentration, that is, the concentration of TAOH corrected for the background TAOH concentration of the TA control sample (TA only in the absence of UV and the sample substrate). The TAOH concentration* is based on a substrate having a surface area 15 mm×15 mm in size (with a geometric area of 225 mm$^2$) as described in section 1.7. The TAOH concentration** is the corrected TAOH concentration based on a substrate with a geometric area of 1 mm$^2$.

TABLE 10

The formation of TAOH measured by fluorescence spectroscopy in the presence of UV (1 hour) and different galvanised steel photoinitiators.

| Photo-initiator | Fluorescence intensity in absorbance units (a.u.) | TAOH Concentration* (µM) | TAOH Concentration** (µM/mm$^2$) |
| --- | --- | --- | --- |
| UTGS | 136.1 | 0.22 | 0.00098 |
| TTGS (400) | 357.5 | 1.81 | 0.0080 |
| TTGS (600) | 557.9 | 3.01 | 0.0134 |

*TAOH concentration for a sample having a geometric area of 225 mm$^2$;
**TAOH concentration for a sample having a geometric area of 1 mm$^2$ It was found that the concentration of TAOH in TTGS (400) was lower than that of TTGS (600). Without wishing to be bound by theory the inventors believe that the lower concentration of TAOH measured for TTGS (400) may correspond to a lower level of ZnO on the surface of TTGS (400). This result was consistent with XPS analysis. These observations indicated the formation of hydroxyl radicals on both untreated and thermally treated substrates with a higher rate on thermally treated ones.

Among all the compounds present on the surface of the galvanised steel, the inventors believe that ZnO may be the photocatalyst that is forming hydroxyl radicals.

The generation of hydroxyl radicals indicated that the polymerisation of vinyl monomers initiated by thermally treated galvanised steel may proceed via a free radical polymerisation. Using the polymerization of methyl methacrylate as an example, the inventors believe that the polymerization may involve the generation of hydroxyl radicals and the reaction of monomer molecules with the hydroxyl radicals to yield initiating radicals. The initiating radicals may then continue to react with the addition of monomers to form propagating radicals. Once propagating radicals form, the chains may then propagate until monomers are consumed or until termination/chain transfer occurs.

The structure of the PMMA/PMA/PBMA/PBA obtained in the above reactions and the monomer conversion during polymerisation were also analysed by $^1$H NMR spectroscopy.

The monomer conversion may be described by equation 2:

$$\text{Conversion} = \frac{[M]_0 - [M]_t}{[M]_0} \quad (2)$$

where [$M_0$] is the amount of monomer at the start, [$M_t$] is the monomer concentration at time t. The conversion degree of MMA/MA/BMA/BA was calculated by comparing the integration of monomer vinyl ($I_{CH2=}$) peaks area with the integration of the methoxy ($I_{O-CH3}$) peaks area by the following equation 3 [7]:

$$\text{Conversion degree} = \frac{I_{O-CH3} - \frac{3}{2}I_{CH2=}}{I_{O-CH3}} \quad (3)$$

The conversion degree of the resulting polymers is tabulated in Table 11. It was found that UTGS was capable of photo-initiating polymerisation with a conversion degree of 6.19%, and the polymerisation rate was slow.

The conversion degree for MMA on TTGS (400) and TTGS (600) were calculated as 95.6% and 97.9% respectively as shown in Table 11 below.

The conversion degree for MA, BMA, and BA were as shown in Table 11 below.

TABLE 11

The conversion degree of the resulting PMMA/MA/BMA/BA polymers Reaction conditions: Monomer weight: 0.094 mol, UV intensity: 15 W, UV irritation time: 60 min, polymerisation temperature: 60° C., reaction time in dark: 36 h.

| Initiator | Monomer | Conversion [%] [a] |
|---|---|---|
| UTGS | MMA | 6.19 |
| TTGS (400) | MMA | 95.6 |
| TTGS (600) | MMA | 97.9 |
| TTGS (400) | MA | 99.8 |
| TTGS (400) | BMA | 95.4 |
| TTGS (400) | BA | 96.2 |

[a] Determined by proton nuclear magnetic resonance ($^1$H NMR).

Thermally treated galvanised steel sheets were investigated in more detail using $^1$H NMR spectroscopy. The $^1$H NMR of PMMA prepared by TTGS (400) and TTGS (600) photoinitiators after 36 hours reaction time showed that the monomer vinyl peaks (at 6.1 ppm and 5.5 ppm) dramatically decreased, and new methyl (—CH$_3$) and methylene (—CH$_2$—) signals appeared from 0.5 to 1.8 ppm. In addition, a new signal was detected around 3.6 ppm, which could be assigned to polymeric methoxy. The results indicated that polymerisation was occurring and that PMMA was forming in the presence of thermally treated galvanised steel sheets as photoinitiators.

The molecular weights and polydispersity index (PDI) of the obtained PMMA were measured by size exclusion chromatography (SEC). The SEC traces showed narrow unimodal distributions of both polymers with a short retention time. Table 12 indicates that both polymers prepared by TTGS (400) and TTGS (600) have high number average molecular weights (Mn) (1,181,000 and 956,000 g/mol respectively) and narrow molecular distributions. (PDI=1.11 and 1.14 respectively). In contrast, the PDI value of commodity polymers usually range from 2 to 5.

TABLE 12

The molecular weights and molecular weight distributions of the resulting PMMA polymers. Reaction conditions: Monomer weight: 0.094 mol, UV intensity: 15 W, UV irritation time: 60 min, polymerisation temperature: 60° C., reaction time in dark: 36 h.

| Initiator | Monomer | Retention time [min] | Mn [a] [g/mol] | PDI [a] |
|---|---|---|---|---|
| TTGS (400) | MMA | 10.31 | 1,181,000 | 1.11 |
| TTGS (600) | MMA | 10.62 | 956,000 | 1.14 |

[a] Determined by size exclusion chromatography (SEC).

In summary, both TTGS (400) and TTGS (600) photoinitiators proved effective in achieving controlled radical polymerisation for MMA with a high conversion degree, high molecular weight and low PDI.

The control of chain growth by the TTGS (600) photoinitiator may be attributed to the presence of a low concentration of hydroxyl radicals and the absence of solvent and organic initiator in the systems.

Without wishing to be bound by theory, the inventors believe that the concentration of the hydroxyl radicals produced in the TTGS (600) sample may have been at a sufficiently low level to enable chain growth on the one hand and reduce chain termination reactions on the other. The chain termination is the annihilation of the chain radicals' activities by the combination or disproportionation of the propagating radicals. A low concentration of hydroxyl radicals may result in a relatively small number of propagating radicals, and thus may reduce the occurrence of chain termination reactions. Additionally, chain transfer to the solvent and organic initiator was eliminated in the absence of solvent and organic initiator. The reduction of chain termination and chain transfers may have allowed the thermally treated galvanised steel photoinitiator system to achieve controlled polymerisation.

To investigate the efficiency of thermally treated galvanised steel in the photo-initiating polymerisation of acrylic monomers, methyl acrylate (MA), butyl acrylate (BA), butyl methacrylate (BMA), poly (ethylene glycol) methyl ether methacrylate (PEGMEMA), and diurethane dimethacrylate (DUDMA) were also polymerised using TTGS (600) as the photoinitiator.

The conversion degree of the resulting polymers is shown in Table 13. It was found that the TTGS (600) photoinitiator was capable of photo-initiating polymerisation with high conversion degree (>95%). $^1$H NMR spectra of vinyl monomers and the resulting polymers was analysed. The decreased vinyl peaks and the increased polymeric methyl or methylene peaks were taken to indicate that polymerisation had occurred and that the resultant polymers had been obtained. These results confirmed the capability of thermally treated galvanised steel to photo-initiate polymerisation of acrylic monomers.

TABLE 13

Polymerisation of acrylic monomers using a TTGS (600) photoinitiator. Reaction conditions: Monomer weight: 0.1 mol, UV intensity: 15 W, UV irritation time: 60 min, polymerisation temperature: 60° C., reaction time in dark: 36 h.

| Initiator | Monomer | Conversion [a] [%] |
|---|---|---|
| TTGS (600) | MA | 99.8 |
| TTGS (600) | BA | 96.2 |
| TTGS (600) | BMA | 95.4 |
| TTGS (600) | PEGMEMA | 99.4 |
| TTGS (600) | DUDMA | 99.6 |

[a] Determined by proton nuclear magnetic resonance ($^1$H NMR).

The polymers obtained above fall into three categories: linear polymers, branched polymers, and cross-linked polymers. Poly (methyl methacrylate) (PMMA), poly (methyl acrylate) (PMA), poly (butyl acrylate) (PBA), poly (butyl methacrylate) (PBMA) are amorphous thermoplastic linear polymers. These polymers are thought to comprise long chains packed close together. Without wishing to be bound by theory, the inventors believe that as a result of this close packing, these linear polymers have a relatively high tensile strength and a relatively high melting point. These polymers also have a relatively low average density. Hence, linear polymer-steel composites may be a lightweight alternative to metal alloys.

Poly [poly (ethylene glycol) methyl ether methacrylate] (PPEGMA) is a branched polymer. This polymer may be used, for example, as an anti-biofouling material because the hydrophilic side chains may prevent bacterial attachment.

Poly (diurethane dimethacrylate) (PDUDMA) is a cross-linked polymer. The double bonds on both ends of PDUDMA may react with each other to form a cross-linked structure.

The molecular weights and polydispersity indices (PDI) of the obtained polymers were then measured by size exclusion chromatography (SEC). The size exclusion chromatography (SEC) results in Table 14 showed that all linear acrylic monomers yielded polymers with relatively high molecular weights (Mn>845,000 g/mol) and low PDI (PDI<1.3). These results indicate that TTGS (600) is an efficient photoinitiator to achieve controlled polymerisation of acrylic monomers.

TABLE 14

The molecular weights and molecular distribution of the resulting linear polymers. Reaction conditions: Monomer weight: 0.1 mol, UV intensity: 15 W, UV irritation time: 60 min, polymerisation temperature: 60° C., reaction time in dark: 36 h.

| Initiator | Monomer | Retention time [min] | $M_n$ [g/mol] | PDI |
|---|---|---|---|---|
| TTGS (600) | MA | 10.53 | 1,003,000 | 1.12 |
| TTGS (600) | BA | 10.6 | 963,000 | 1.14 |
| TTGS (600) | BMA | 10.75 | 845,000 | 1.21 |

To give further insight into polymerisation kinetics, monomer consumption during polymerisation was monitored by $^1$H NMR spectroscopy. In radical polymerisation the rate of polymerisation ($R_p$) can be considered as the rate of consumption of the monomers with respect to time, which is defined by the following equation 4 [8]:

$$R_p = -\frac{d[M]}{dt} = k_p[M][P\cdot] \quad (4)$$

Integrating with respect to time gives equation 5 [9]:

$$\ln\frac{[M]_0}{[M]_t} = k_p[P\cdot]t \quad (5)$$

where $k_p$ is the propagation constant, $[M]_0$ is the amount of monomer at the start, $[M]_t$ is the monomer concentration at time t, and $[P\cdot]$ is the concentration of active propagating species. Without wishing to be bound by theory, the inventors believe that in controlled/living polymerisation, the number of propagating species remains constant and the log of the monomer concentration is a linear function of time.

Figure 17:
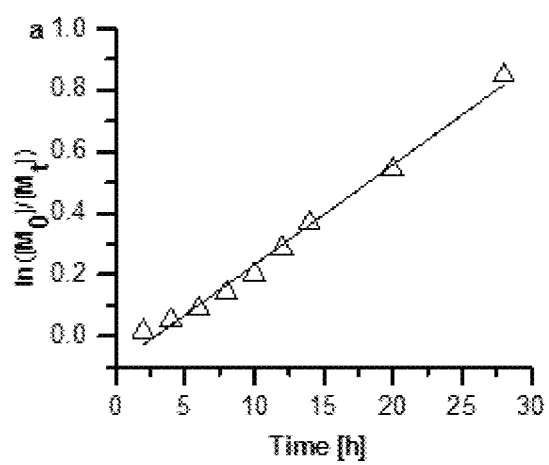
FIG. 17 is a kinetic plot with respect to time showing monomer consumption (that is, the conversion of polymerisable monomers into a corresponding polymer) as a function of reaction time in the polymerization reaction of methyl methacrylate (MMA) using TTGS (600) as the initiator. The y axis corresponds to $\ln([M_0]/[M_t])$ which was calculated as described herein and the x axis corresponds to time in hours (h).

To get the plot of $\ln[M]_0/[M]_n$ versus time, the $^1$H NMR spectra of 10 mg samples prepared by TTGS (600) were recorded at certain time intervals. Methyl methacrylate monomer consumption (that is, the conversion of polymerisable monomers into the corresponding polymer) was calculated by comparing the integrated ratios of methylene ($=CH_2$) protons to methoxy ($-OCH_3$) protons. The kinetic plots for TTGS (600) in FIG. 17 exhibited a linear behaviour, indicating the attainment of controlled polymerisation. The control over chain growth was established by minimising the termination and eliminating chain transfer. Without wishing to be bound by theory the inventors believe that a low concentration of hydroxyl radicals may result in a relatively small number of propagating radicals, and thus may reduce the occurrence of chain termination reactions. Chain transfer to solvent(s) and organic initiators can be eliminated in their absence.

Without wishing to be bound by theory the inventors believe that since the termination and chain transfer are minimised or absent in controlled/living polymerisation, each active species (initiating radical) is responsible for one chain. The inventors also believe that this mechanism may offer control over the average degree of polymerisation ($DP_n$). Hence, the number average molecular weight of the polymer may be predicted by calculating the monomer consumption to the active species ratio. The average degree of polymerisation is described by equation 6 [10]:

$$DP_n = \frac{M_n}{M_0} = \frac{[M]_0 - [M]_t}{[I]_0} = \frac{[M]_0}{[I]_0}\frac{[M]_0 - [M]_t}{[M]_0} = \frac{[M]_0}{[I]_0} \quad (6)$$

Hence $$M_n = \frac{[M]_0}{[I]_0}M_0(\text{Conversion}) \quad (7)$$

where $M_n$ is the number average molecular weight, $M_0$ is the molecular weight of the monomer unit, $[I]_0$ is the concentration of active species (primary radicals), $[M]_0$ is the amount of monomer at the start. According to equation 7, the number average molecular weight increases linearly with conversion in controlled/living polymerisation.

To investigate whether the polymerisation reactions described above have the characteristics of controlled/living polymerisation, the molecular weight and PDI progression as a function of monomer conversion was monitored by SEC.

Figure 18:
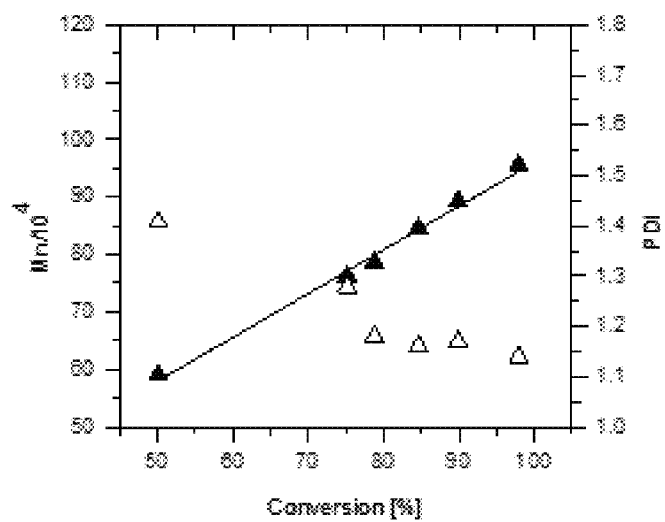
FIG. 18 is a plot of the molecular weight (solid icons ▲) and polydispersity index (PDI) (hollow icons Δ) of polymers obtained in the polymerization reaction of MMA using TTGS (600) as the initiator. Percentage monomer conversion (that is, percentage of the total amount of polymerisable monomers converted into a corresponding polymer) is on the x axis, molecular weight (Mn) is expressed $Mn/10^4$ on the y axis on the left and PDI is on the y axis on the right.

The control provided by TTGS (600) was evidenced by the linear increase in molecular weight values with monomer conversion in FIG. 18. It was also found that PDI values decreased gradually with increasing monomer conversion. Furthermore, the SEC results in Table 15 showed unimodal distributions of polymer and shifts to larger molecular weight values with increasing monomer conversion. These results further demonstrate that the TTGS (600) photoinitiator provided control over both molecular weights and molecular distributions of the polymers formed.

TABLE 15

The evolution of molecular weights and PDI with monomer conversion initiated by TTGS (600) photoinitiator. Reaction conditions: Monomer weight: 0.094 mol, UV intensity: 15 W, UV irritation time: 60 min, polymerisation temperature: 60° C.

| Initiator | Conversion degree [%] | Retention time [min] | $M_n$ [g/mol] | PDI |
|---|---|---|---|---|
| TTGS (600) | 50.1 | 11.5 | 591,000 | 1.41 |
| TTGS (600) | 75.2 | 10.92 | 762,000 | 1.28 |
| TTGS (600) | 84.6 | 10.75 | 845,000 | 1.16 |
| TTGS (600) | 97.9 | 10.62 | 956,000 | 1.14 |

The polymerisation kinetics and evolution of molecular weight with monomer conversion manifested characteristics of a controlled/living polymerisation.

Without wishing to be bound by theory the inventors believe that living polymerisation may be capable of efficiently re-initiating polymerisation. To examine the re-initiation ability of the polymer obtained, a series of block polymerisations were performed. Poly (methyl methacrylate) (PMMA) obtained by the aforementioned process was introduced into vials comprising various monomers (MMA, and BMA), and then the mixture was placed in the dark at 60° C. until the monomers were consumed.

TABLE 16

Re-initiation of PMMA.

| Monomer | Conversion [%] | Retention time [min] | $M_n$ [g/mol] | PDI |
|---|---|---|---|---|
| MMA [a] | 97.6 | 10.62 | 956,000 | 1.13 |
| Additional MMA [b] | 96.5 | 10.32 | 1,187,000 | 1.08 |
| Additional BMA [c] | 95.9 | 10.38 | 1,133,000 | 1.11 |

[a] Monomer weight: 0.094 mol, UV intensity: 15 W, UV irritation time: 60 min, polymerisation temperature: 60° C., reaction time in dark: 36 h.
[b] Monomer weight of additional MMA: 0.05 mol, UV: N/A, polymerisation temperature: 60° C., reaction time in dark: 36 h.
[c] Monomer weight of additional BMA: 0.05 mol, UV: N/A, polymerisation temperature: 60° C., reaction time in dark: 36 h.

The successful block copolymerisation confirmed the re-initiation ability of polymerisation from the precursor polymer. The resulting block copolymers were transparent rigid polymers.

Figure 19A:
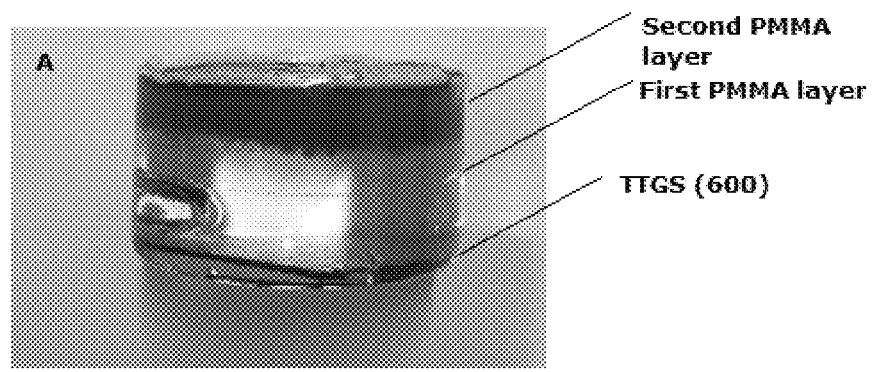
FIGS. 19A and B are pictures of the block co-polymers of MMA and butyl methacrylate (BMA) obtained according to embodiments of the method described herein.
Figure 19B:
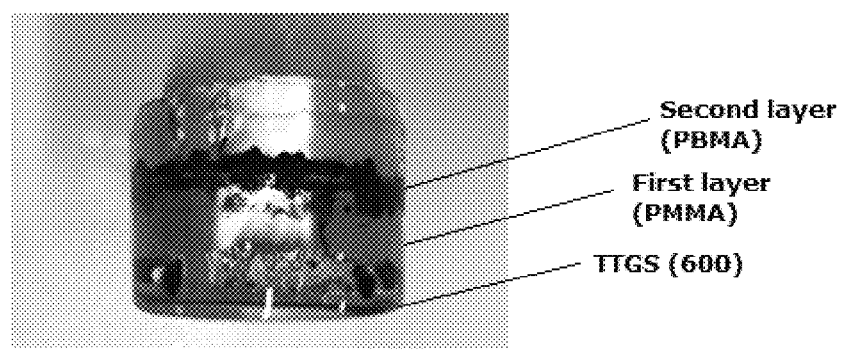
FIG. 19B shows a PMMA layer (first layer) formed on the surface of TTGS(600) on top of which is a second layer (PBMA-co-polymer of butyl methacrylate and methyl methacrylate). To better distinguish different blocks, reddish brown and green dyes were added into different monomers giving rise to the lighter and darker layers shown in FIGS. 19A and B.

To better distinguish different blocks, reddish brown and green dyes were added into additional monomers respectively. As shown in FIGS. 19A and B, two different layers were visible, the first layer corresponding to the original PMMA homopolymer. The presence of the two layers indicated that it may be possible to re-initiate polymerisation again to make multi-layer polymers.

3.3 Summary and Conclusion

Various monomers were successfully polymerised by the galvanised steel mediated surface-initiated controlled radical polymerisation (GSM-SICRP) technique. The attainment of control over polymer molecular weights and molecular weight distributions suggests that GSM-SICRP may be a versatile platform for synthesising various polymers with designed molecular weights and well-defined structure.

The first-order kinetics and the evolution of molecular weight with monomer conversion manifests characteristics of living polymerisation. Block copolymers with controllable molecular weights and narrow molecular weight distributions were successfully synthesised by GSM-SICRP.

The GSM-SICRP technique works without using any solvent, initiator (apart from metal surface, such as for example, galvanised steel), catalyst, or additive. Because of the absence of solvent and initiator, the system has the potential to lead to high purity products. Furthermore, the Examples above show that the polymerisation can be conducted in an ambient atmosphere since the GSM-SICRP system does not contain any catalyst that requires an inert atmosphere to retain activity.

The GSM-SICRP system may be for the polymerisation of an extensive range of monomers. Without wishing to be bound by theory the inventors believe that monomers that polymerisable by conventional free-radical polymerisation may also be polymerisable via GSM-SICRP. The examples herein demonstrate the polymerisation of some activated monomers, such as acrylates and methacrylates, by GSM-SICRP.

GSM-SICRP may be used to tailor the chemical and physical properties of the substrate without the detriment of the metal substrate. The GSM-SICRP technique may require less surface treatment compared to grafted surface-initiated polymerisation and activation of the metal surface may be accomplished through thermal treatment and the Examples above show that the activated metal surface is capable of initiating polymerisation under UV irradiation. Compared to electrochemical or photoelectrochemical induced surface-initiated polymerisation, GSM-SICRP may be more cost-effective due to the absence of an electrical driving force.

4. Example 3—Effect of Polymerisation Conditions on Polymerisation Kinetics and Polymer Properties This example investigated the impact of polymerisation conditions on polymerisation kinetics and polymer properties. Emphasis is placed on the analysis of the effect of photoinitiators, the irradiation parameters, the polymerisation temperatures, and the monomer feed ratio on polymerisation kinetics and the resulting polymer properties.

To evaluate the capability of different galvanised steels in polymerising vinyl monomers, methyl methacrylate (MMA) polymerisation was carried out under identical experimental conditions using two different types of thermally treated galvanised steel (hot dip galvanised steel and Zincalume) as photoinitiators. Then methyl methacrylate (MMA) was polymerised using a TTGS (600) photoinitiator under different UV intensities, irradiation times, and temperatures. The properties of the obtained polymers were also characterised. To give further insight into polymerisation kinetics, monomer consumptions during polymerisation were monitored by $^1$H NMR spectroscopy as well.

To investigate the effect of the monomer feed ratio on glass transition temperature ($T_g$), different proportions of methyl methacrylate and butyl methacrylate were copolymerised. The resulting copolymers were then characterised.

4.1 Experiment
4.1.1 Materials

Methyl methacrylate (MMA) and butyl methacrylate (BMA) were purified and stored in a nitrogen atmosphere in the fridge at 4° C. before use. Chloroform-D (CDCl$_3$), tetrahydrofuran (THF), terephthalic acid (TA), and 2-hydroxy terephthalic acid (TAOH) were used as received.

Untreated galvanised steel (UTGS), Untreated Zincalume (UTZnAl), Thermally treated galvanised steel treated at 600° C. (TTGS (600)), and Thermally treated Zincalume treated at 600° C. (TTZnAl (600)) sheets were ultrasonically cleaned with distilled water. A 15 W UV lamp (365 nm) and a 6 W UV lamp (365 nm) were obtained from UVTech Systems, Inc.

4.1.2 Homopolymerisation

Methyl methacrylate (MMA) (9.4 g, 0.094 mol) and the photoinitiator (TTGS (600) or TTZnAl (600)) were put into a 20 ml vial and the reaction mixture was irradiated with a UV light (6 W or 15 W, λ=350 nm) for different durations (0-60 min). The sealed vial was held at a fixed temperature (60° C. or 80° C.) in an oven for different durations (0-48 h).

4.1.3 Copolymerisation

A mixture with different proportions of methyl methacrylate (MMA) and butyl methacrylate (BMA) was introduced into a 20 ml vial, and the reaction mixture was irradiated with a UV light (15 W, λ=350 nm) for 1h. The sealed vial was held at 60° C. for 48 h.

4.1.4 Characterisation

Fluorescence spectroscopy was used to probe the hydroxyl radicals formed on UV-illuminated UTGS, UTZnAl, TTGS (600), and TTZnAl (600) photoinitiators. The structure of monomers and polymers were detected by $^1$H NMR. Polymer molecular weight and molecular weight distributions were measured by SEC. A MDSC was employed to determine the glass transition temperature of obtained polymers.

4.2 Results and Discussion
4.2.1 Effect of Photoinitiators

The previous Examples demonstrated control over polymer molecular weights and molecular weight distributions using TTGS (600) as a photoinitiator.

To investigate the effect of the photoinitiator on the properties of the final polymers, polymerisation was conducted using a Zincalume (ZnAl) (steel with 55% zinc and 45% aluminium coating) photoinitiator. The chemical compositions of UTGS, TTGS (600), UTZnAl, and TTZnAl (600) were investigated by X-ray photoelectron spectroscopy (XPS). The modified Auger parameter of Zn (α' Zn) was measured and compared to the literature values to identify the zinc compounds present. The XPS results of UTGS and TTGS (600) in Table 17 and Table 18 are the same as the results present in Example 1.

The α' Zn indicated the existence of zinc carbonate hydroxide on the surface of the UTZnAl substrate and validated the formation of ZnO on TTZnAl (600) (Table 17).

The XPS survey spectra confirmed that the concentration of zinc on the surface of TTZnAl (600) is lower than that of TTGS (600), corresponding to the lower level of zinc in the initial untreated substrate (Table 18).

TABLE 17

The Modified Auger parameters of UTGS, UTZnAl, TTGS (600), and TTZnAl (600)

| | BE (eV) Zn 2p$_{3/2}$ | KE (eV) Zn L$_3$M$_{45}$M$_{45}$ | a' |
|---|---|---|---|
| UTGS | 1022.3 | 986.9 | 2009.2 |
| TTGS (600) | 1021.7 | 988.3 | 2010 |
| UTZnAl | 1022.2 | 987.2 | 2009.3 |
| TTZnAl (600) | 1021.8 | 988.3 | 2010.1 |

TABLE 18

Elemental composition of UTGS, UTZnAl, TTGS (600), and TTZnAl (600)

| | Relative atomic composition (%) | | | | | | | |
|---|---|---|---|---|---|---|---|---|
| Samples | C 1s | O1s | Zn 2p 3/2 | Al 2p | Cr 2p 3/2 | P 2s | Ca 2p | N 1s |
| UTGS | 40 | 43 | 2 | — | 5 | 78 | <1 | 1 |
| UTZnAl | 63 | 29 | 1 | 7 | — | — | — | — |
| TTGS (600) | 17 | 52 | 22 | — | 4 | 4 | <1 | — |
| TTZnAl (600) | 39 | 48 | 5 | 8 | — | — | — | — |

Before polymerisation, the photocatalytic activity of all photoinitiators was investigated by fluorescence spectroscopy as follows. 15 ml of the TA stock solution and different substrates: Untreated galvanised steel (UTGS), galvanised steel thermal treated at 400° C. (TTGS 400), galvanised steel thermal treated at 600° C. (TTGS 600), Untreated Zincalume (UTZnAl) and Zincalume thermal treated at 600° C. (TTZnAl 600) were prepared as described in section 1.7 above. The samples prepared in this way were left at room temperature in the dark for 1 h. The samples were then placed under UV irradiation (365 nm, 15 W) at room temperature (20-25° C.). A control sample was also prepared as described in section 1.7. After 1 hour, 2 ml of reaction solution was withdrawn and analysed using a PerkinElmer LS 55 Fluorescence Spectrometer. Excitation spectra were monitored at 315 nm, and emission spectra were measured at 425 nm.

Figure 20:
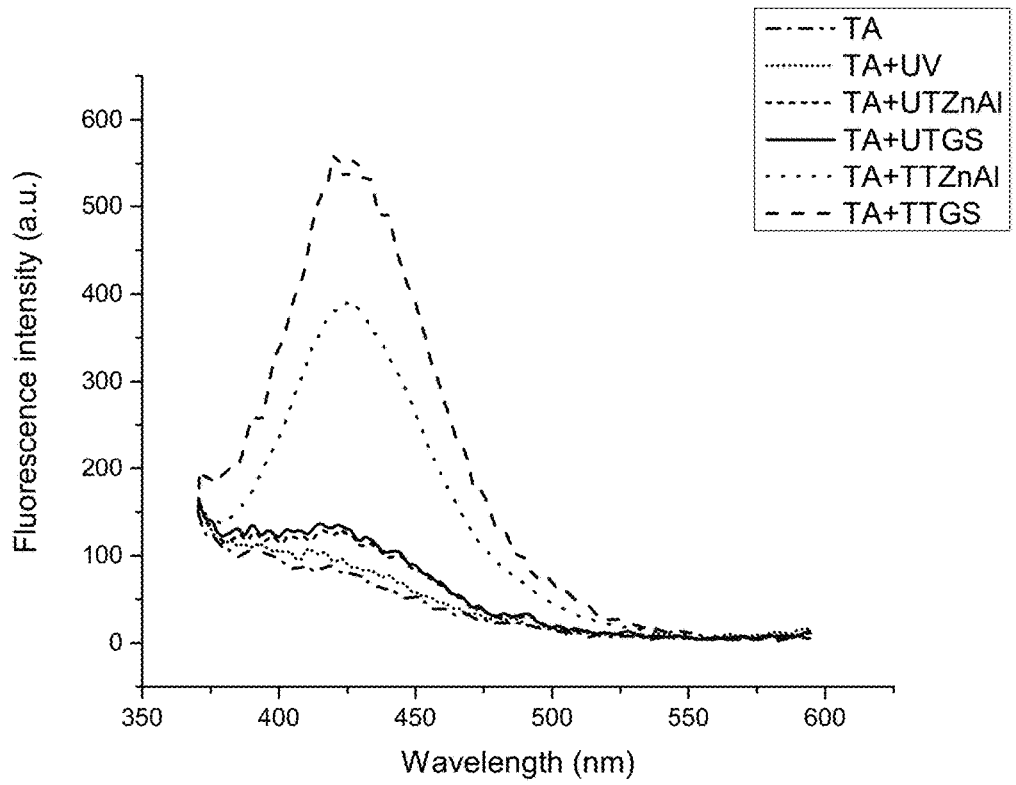
FIG. 20 shows the formation of TAOH from TA under one-hour UV irradiation measured by fluorescence spectroscopy in the presence and absence of Untreated zinc-aluminium alloy coated steel (referred to herein as Zincalume) (UTZnAl) as defined herein, UTGS, Thermally treated Zincalume thermal treated at 600° C. (TTZnAl(600)) and thermally treated galvanised steel thermal treated at 600° C. (TTGS(600)). The spectrum obtained for the TA control sample (TA in the absence of light (UV), UTGS, UTZnAl, TTGS and TTZnAl) is represented by the dash-dot line ─ · ─ · · (bottom trace), TA in the presence of light of various wavelengths (nm) (in the absence of UTGS, UTZnAl, TTGS and TTZnAl) is represented by the short dotted line ············, TA in the presence of light (UV) and UTZnAl is represented by short dotted line ------, TA in the presence of light (UV) and UTGS is represented by the solid line ─────, TA in the presence of light (UV) and TTZnAl (600) is represented by the spaced dotted line · · · · ·, and TA in the presence of light (UV) and TTGS (600) is represented by the long dashed line ─ ─ ─ (top trace).

Fluorescence spectra confirmed the formation of hydroxyl radicals on both untreated and thermally treated photoinitiators (FIG. 20). The generation rate of hydroxyl radicals in untreated photoinitiators was slower than that of thermally treated ones. It was also found that the generation rate of hydroxyl radicals in TTZnAl (600) was 0.92 μM/h/cm$^2$, lower than that of TTGS (600) (1.34 μM/h/cm$^2$).

To calculate the TAOH concentration produced by each of the samples tested from the fluorescence intensity measured above and shown in FIG. 20, the calibration curve shown in FIG. 16 was used as described in section 1.7.

Table 19 below shows the fluorescence intensity of each of the substrates tested at 425 nm as shown in FIG. 20. The TAOH concentration* shown in Table 19 is the corrected TAOH concentration, that is, the concentration of TAOH corrected for the background TAOH concentration of the TA control sample (TA only in the absence of UV and the sample substrate). The TAOH concentration* is based on a substrate having a surface area 15 mm×15 mm in size (with a geometric area of 225 mm$^2$) as described in section 1.7. The TAOH concentration** is the corrected TAOH concentration based on a substrate with a geometric area of 1 mm$^2$.

TABLE 19

The formation of TAOH after one-hour UV irradiation measured by fluorescence spectroscopy in the presence of different photoinitiators. Reaction conditions: UV intensity: 15 W, UV wavelength: 356 nm, UV irritation time: 60 min.

|  | (μM) | (μM/mm$^2$) |
|---|---|---|
| UTGS | 136.1 | 0.22 | 0.00098 |
| UTZnAl | 129.2 | 0.15 | 0.00067 |
| TTGS (600) | 557.9 | 3.01 | 0.0134 |
| TTZnAl (600) | 398.1 | 2.06 | 0.0091 |

*TAOH concentration for a sample having a geometric area of 225 mm$^2$;
**TAOH concentration for a sample having a geometric area of 1 mm$^2$ Methyl methacrylate (MMA) was polymerised under identical experimental conditions using UTGS, UTZnAl, TTGS (600), and TTZnAl (600) as photoinitiators. The polymerisation conditions and some characterisation results are tabulated in Table 20.

TABLE 20

GSM-SICRP of MMA using different photoinitiators under identical experimental conditions. Reaction conditions: Monomer weight: 0.094 mol; UV intensity: 15 W, UV irritation time: 60 min; polymerisation temperature: 60° C., reaction time in dark: 36 h.

| Initiator | Conversion [a] (%) | Retention time [b] (min) | M$_n$ [b] (g·mol$^{-1}$) | PDI [b] |
|---|---|---|---|---|
| UTGS | 6.19 | — | — | — |
| UTZnAl | 5.44 | — | — | — |
| TTGS (600) | 97.9 | 10.62 | 956,000 | 1.14 |
| TTZnAl (600) | 95.6 | 10.32 | 1,164,000 | 1.09 |

[a] Determined by proton nuclear magnetic resonance ($^1$H NMR).
[b] Determined by size exclusion chromatography (SEC), where Mn is number average molecular weight.

As can be seen, slow polymerisation with low conversion degree (5.44-6.19%) occurred when using UTGS and UTZnAl as initiators (Table 20, entry 1, entry 2).

Both TTGS (600) and TTZnAl (600) proved effective in achieving controlled radical polymerisation of MMA with high conversion degree (95.6-97.9%) and low PDI (1.11-1.14). SEC traces showed that using TTZnAl (600) as photoinitiator resulted in higher molecular weight (Mn=1,164,000 g/mol) compared to that of TTGS (600) (Mn=956,000 g/mol), indicating that a lower concentration of hydroxyl radicals resulted in a higher molecular weight. The number of initiating chains decreased as the concentration of hydroxyl radicals decreased. Therefore, the increase of molecular weight may be due to the decrease in the number of chains initiated.

To give further insight into the polymerisation kinetics, monomer consumptions during polymerisation was monitored by $^1$H NMR spectroscopy.

TTGS (600) and TTZnAl (600) photoinitiators were put into a 20 ml vials each with 0.094 mol MMA, and the reaction mixtures were irradiated with UV light (15 W, λ=350 nm) for 60 min in an ambient atmosphere. The sealed vials were then held at 60° C. Samples of about 10 mg were periodically withdrawn and analysed by $^1$H NMR to monitor the monomer conversion and consumption.

Figure 21:
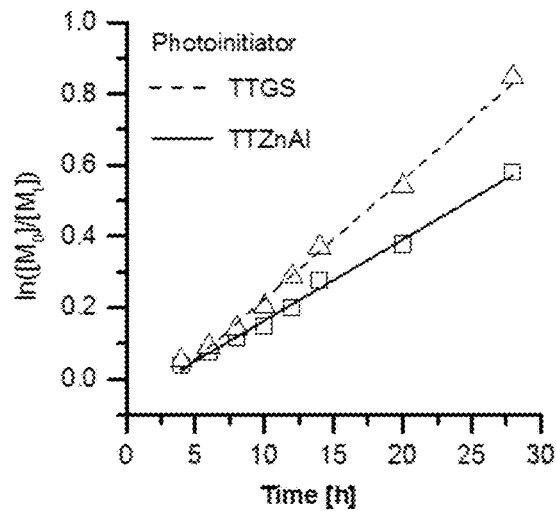
FIG. 21 is a kinetic plot showing monomer consumption (that is, the conversion of polymerisable monomers into a corresponding polymer) as a function of reaction time in the polymerization reaction of MMA using thermally treated galvanised steel thermal treated at 600° C. (TTGS (600)) (dotted line) and Thermally treated Zincalume thermal treated at 600° C. (TTZnAl) (solid line). The y axis corresponds to $\ln([M_0]/[M_t])$ which was calculated as described herein and the x axis corresponds to time in hours (h).
Figure 22:
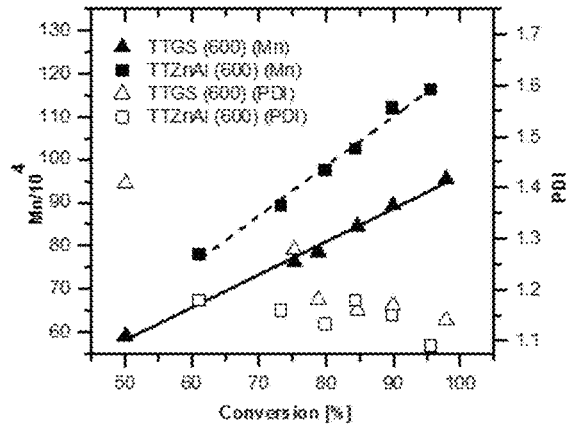
FIG. 22 is a plot of the molecular weight (solid icons) and polydispersity index (PDI) (hollow icons) of polymers obtained in the polymerization reaction of MMA using thermally treated galvanised steel thermal treated at 600° C. (TTGS (600)) represented by the solid and hollow triangles and thermally treated Zincalume thermal treated at 600° C. (TTZnAl (600)) represented by the solid and hollow squares. Percentage monomer conversion (that is, percentage of the total amount of polymerisable monomers converted into a corresponding polymer) is on the x axis, molecular weight (Mn) is expressed $Mn/10^4$ on the left and PDI is on the y axis on the right.

As can be seen from FIG. 21, the kinetic plots for TTGS (600) and TTZnAl (600) exhibited a linear behaviour, indicating the attainment of controlled polymerisation. The higher slope of the TTGS (600) kinetic plot revealed that TTGS (600) provided a higher polymerisation rate than that of TTZnAl (600), which may be attributed to higher hydroxyl radical concentration.

Figure 23:
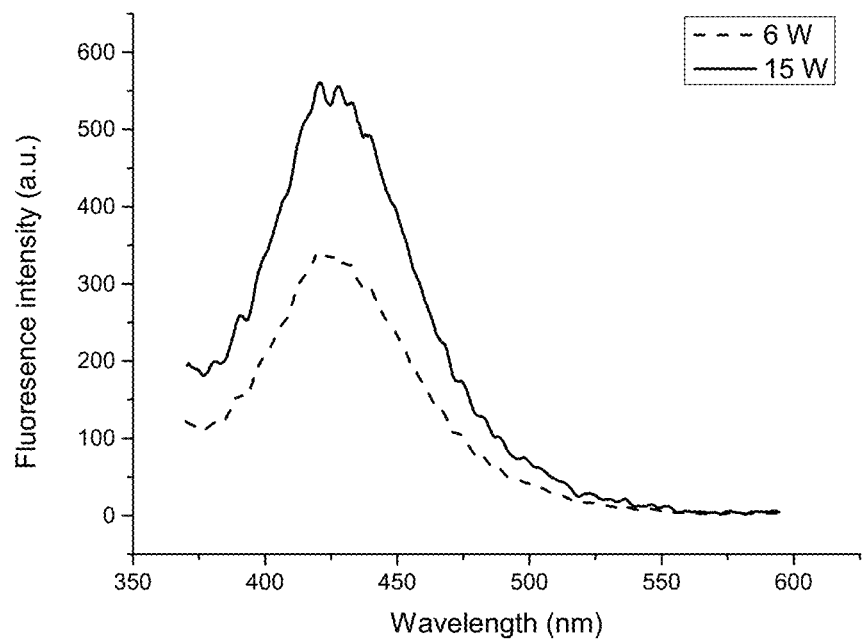
FIG. 23 shows the effect of UV light of different power levels (6 W represented by the dotted line and 15 W represented by the solid line) on TAOH yield from TA as measured by fluorescence intensity, where intensity is measured in absorbance units (a.u.) at a wavelength of 425 nm.

The molecular weights and the PDI progression as a function of monomer conversion were also monitored by SEC as is shown in FIG. 23. The control provided by TTGS (600) and TTZnAl (600) was evidenced by the linear increase in molecular weight values with monomer conversion. It was found that PDI values decreased gradually with increasing monomer conversion in both photoinitiator systems (Table 21 and Table 22).

TABLE 21

The evolution of molecular weights and PDI with monomer conversion initiated by TTGS (600) photoinitiator. Reaction conditions: Monomer weight: 0.094 mol; UV intensity: 15 W, UV irritation time: 60 min; polymerisation temperature: 60° C.

| Initiator | Conversion degree [a] [%] | Retention time [b] [min] | M$_n$ [b] [g/mol] | PDI [b] |
|---|---|---|---|---|
| TTGS (600) | 50.1 | 11.5 | 591,000 | 1.41 |
| TTGS (600) | 75.2 | 10.92 | 762,000 | 1.28 |
| TTGS (600) | 78.8 | 10.87 | 786,000 | 1.18 |
| TTGS (600) | 84.6 | 10.75 | 845,000 | 1.16 |
| TTGS (600) | 89.9 | 10.7 | 893,000 | 1.17 |
| TTGS (600) | 97.9 | 10.62 | 956,000 | 1.14 |

[a] Determined by proton nuclear magnetic resonance ($^1$H NMR).
[b] Determined by size exclusion chromatography (SEC), where Mn is number average molecular weight.

TABLE 22

The evolution of molecular weights and PDI with monomer conversion initiated by TTZnAl (600) photoinitiator. Reaction conditions: Monomer weight: 0.094 mol; UV intensity: 15 W, UV irritation time: 60 min; polymerisation temperature: 60° C.

| Initiator | Conversion degree [a] [%] | Retention time [b] [min] | M$_n$ [b] [g/mol] | PDI [b] |
|---|---|---|---|---|
| TTZnAl (600) | 61.1 | 10.91 | 781,000 | 1.18 |
| TTZnAl (600) | 73.3 | 10.7 | 893,000 | 1.16 |
| TTZnAl (600) | 79.8 | 10.59 | 975,000 | 1.13 |
| TTZnAl (600) | 84.3 | 10.52 | 1,025,000 | 1.18 |
| TTZnAl (600) | 89.8 | 10.38 | 1,121,000 | 1.15 |
| TTZnAl (600) | 95.6 | 10.32 | 1,164,000 | 1.09 |

[a] Determined by proton nuclear magnetic resonance ($^1$H NMR).
[b] Determined by size exclusion chromatography (SEC), where Mn is number average molecular weight.

Furthermore, the SEC traces showed unimodal distributions of polymer and shifts to larger molecular weight values with increasing monomer conversion.

In summary, these results further demonstrated that TTGS (600) and TTZnAl (600) photoinitiators provide control over both molecular weights and molecular distributions. TTGS (600) photoinitiator provided a higher polymerisation rate than that of TTZnAl (600). However, polymerisation using TTZnAl (600) photoinitiator yielded polymers with higher molecular weights.

4.2.2 Effect of Irradiation Parameters

The results presented in the previous section showed that the nature of the photoinitiator affected the generation of hydroxyl radicals and thus the polymerisation of the polymerisation kinetics, and the properties of the polymers were also affected. Therefore, the effect of the irradiation parameters on the yield of the hydroxyl radicals was also studied.

To prepare each of the test samples, 15 ml of the TA stock solution (prepared as described in section 1.7) and a sample of galvanised steel thermal treated at 600° C. (TTGS 600) (prepared as described in section 1.7) were added to a vial. The test samples prepared in this way were then left at room temperature in the dark for 1 h. After this time, each sample was placed under different UV irradiation intensities (UV1: 365 nm, 6 W and UV 2: 365 nm, 15 W) at room temperature (20-25° C.). A control sample was also prepared (see section 1.7). After 1 hour, 2 ml of each test sample was withdrawn and analysed using a PerkinElmer LS 55 Fluorescence Spectrometer. Excitation spectra were monitored at 315 nm, and emission spectra were measured at 425 nm.

The fluorescence spectra of the TTGS 600 solution irradiated with 6 W and 15 W of UV light are shown in FIG. 23.

The fluorescence intensity results at 425 nm shown in FIG. 23 and in Table 23 below were then corrected (by taking into account the fluorescence intensity of a control TA sample without UV irradiation as described in section 1.7). The calibration curve shown in FIG. 16 was then used to calculate the corrected TAOH concentration of each sample based on the corrected fluorescence intensity of the sample at 425 nm. The corrected TAOH concentrations for each sample is shown in Table 23 below.

The results indicated that the generation rate of hydroxyl radicals (as assessed based on the fluorescence intensity at 425 nm) was higher using high intensity (15 W) UV light than using low intensity (6 W) UV light.

TABLE 23

The formation of TAOH measured by fluorescence spectroscopy in the presence of UV and different UV intensities. Reaction conditions: UV wavelength: 356 nm, UV irritation time: 60 min.

| UV intensity (W) | Fluorescence intensity | TAOH concentration* ($\mu$M) | TAOH concentration** ($\mu$M/mm$^2$) |
|---|---|---|---|
| 15 | 557.9 | 3.01 | 0.0134 |
| 6 | 339.8 | 1.68 | 0.0075 |

*TAOH concentration for a sample having a geometric area of 225 mm$^2$;
**TAOH concentration for a sample having a geometric area of 1 mm$^2$ The effect of UV irradiation time on the generation rate of hydroxyl radicals was also investigated as follows. 15 ml of the TA stock solution (prepared as described in section 1.7 above) and galvanised steel thermal treated at 600° C. (TTGS 600) prepared as described in section 1.7 were added to a vial. Six samples were prepared in this way.

Each of the samples was left at room temperature in the dark for 1 h. After this time, each of the samples were irradiated with UV light (365 nm, 15 W) at room temperature (20-25° C.). Every 10 min, 2 ml of reaction solution was withdrawn from each sample (that is, at 10, 20, 30, 40, 50 and 60 minutes) and analysed using a PerkinElmer LS 55 Fluorescence Spectrometer. A control sample comprising TA was also prepared (see section 1.7) and analysed as the 0 minute sample. Excitation spectra were monitored at 315 nm, and emission spectra were measured at 425 nm.

Figure 24:
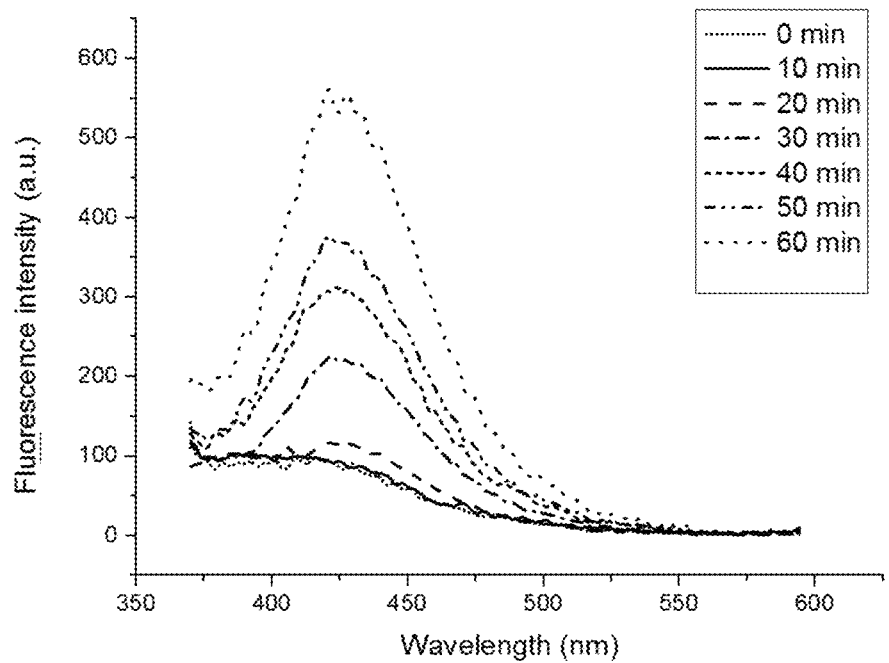
FIG. 24 shows the effect of time on TAOH yield from TA following irradiation of a mixture comprising TA with 15 W of UV light for various lengths of time (0 minutes of irradiation to 60 minutes of irradiation. The results in FIG. 20 show the change in fluorescence intensity expressed as absorbance units (a.u.) recorded at a wavelength of 425 nm, where 0 minutes is represented by the dotted line ············ (bottom trace), 10 minutes is represented by the solid line ─────, 20 minutes is represented by the long dashed line ─ ─ ─, 30 minutes is represented by the dash dot line ─ · ─, 40 minutes is represented by the short dashed line ------, 50 minutes is represented by the dash dot dot line ─ · · ─ ·, and 60 minutes is represented by the spaced dotted line · · · · · (top trace).
Figure 25:
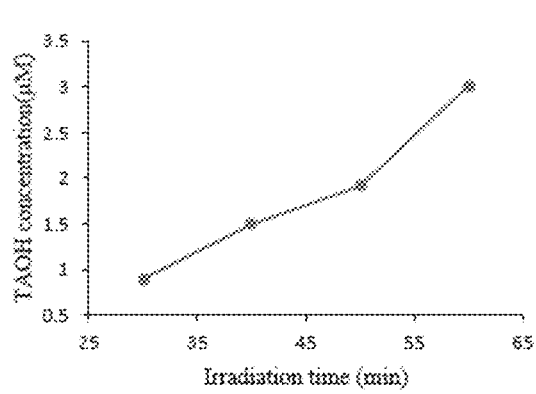
FIG. 25 shows the TAOH yield (μM) as a function of irradiation time (minutes) in the presence of thermally treated galvanised steel (thermal treated at 600° C.) (TTGS (600)) using 15 W of UV light.

The fluorescence spectra of the samples after different periods of UV irradiation are shown in FIGS. 24 and 25. The fluorescence intensity results shown in FIGS. 24 and 25 were then corrected (by taking into account the fluorescence intensity of a control TA sample without UV irradiation as described in section 1.7). The calibration curve shown in FIG. 16 was then used to calculate the corrected TAOH concentration of each sample based on the corrected fluorescence intensity of the sample at 425 nm—the results for the 20 to 60 minute samples are shown in Table 24 below.

Based on the results the yield of hydroxyl radicals (as assessed based on the fluorescence intensity at 425 nm) increased with irradiation time. According to the data analysis, higher irradiation intensities and longer irradiation time lead to a higher generation rate of hydroxyl radicals.

TABLE 24

The formation of TAOH measured by fluorescence spectroscopy at different UV irradiation time. Reaction conditions: UV wavelength: 356 nm, UV intensity: 15 W.

| Irradiation time (min) | FL intensity | TAOH concentration* ($\mu$M) | TAOH concentration** ($\mu$M) |
|---|---|---|---|
| 20 | 115.5 | 0.0496 | 0.00022 |
| 30 | 224.3 | 0.89 | 0.0040 |
| 40 | 312.3 | 1.50 | 0.0067 |
| 50 | 373.8 | 1.91 | 0.0085 |
| 60 | 557.9 | 3.01 | 0.0134 |

*TAOH concentration for a sample having a geometric area of 225 mm$^2$;
**TAOH concentration for a sample having a geometric area of 1 mm$^2$ SEC traces were also recorded for PMMA prepared using various irradiation times (30, 40, 50 and 60 minutes). The SEC traces showed that the molecular weight of the resulting polymers decreased with irradiation time. The concentration of hydroxyl radicals increased with irradiation time, which the inventors believe may have resulted in an increased number of chains initiated. Hence, the decrease in molecular weight may be attributed to the increasing number of chains initiated.

To investigate the effect of irradiation parameters on the properties of polymers, polymerisations were carried out using different UV intensities and irradiation time. The total polymerisation time in each experiment was 48 h. As shown in Table 25, using higher UV intensity (15 W) resulted in lower molecular weight (956,000 g/mol), which the inventors believe may correspond to a higher concentration of hydroxyl radicals. Furthermore, the molecular weight of the resulting polymers decreased with irradiation time. The concentration of hydroxyl radicals increased with irradiation time, thus increasing the number of chains initiated. Hence, the decrease in molecular weight may be attributed to the increasing number of chains initiated.

TABLE 25

GSM-SICRP of MMA using different UV intensities and irradiation time.

| Entry | UV intensity (W) | Irradiation time (min) | Conversion (%) | Retention time (min) | Mn (g · mol$^{-1}$) | PDI |
|---|---|---|---|---|---|---|
| 1 | 15 | 60 | 97.9 | 10.62 | 956,000 | 1.14 |
| 2 | 6 | 60 | 94.2 | 10.29 | 1,198,000 | 1.10 |
| 3 | 15 | 50 | 95.8 | 10.31 | 1,172,000 | 1.15 |
| 4 | 15 | 40 | 96.3 | 10.25 | 1,208,000 | 1.09 |
| 5 | 15 | 30 | 97.2 | 10.23 | 1,296,000 | 1.12 |
| 6 | 15 | 20 | 32.5 | — | — | — |
| 7 | 15 | 10 | 9.8 | — | — | — |

Reaction conditions:
Photoinitiator: TTGS (600),
monomer weight: 0.094 mol,
polymerisation temperature: 60° C.,
reaction time in dark: 48 h.

Figure 26:
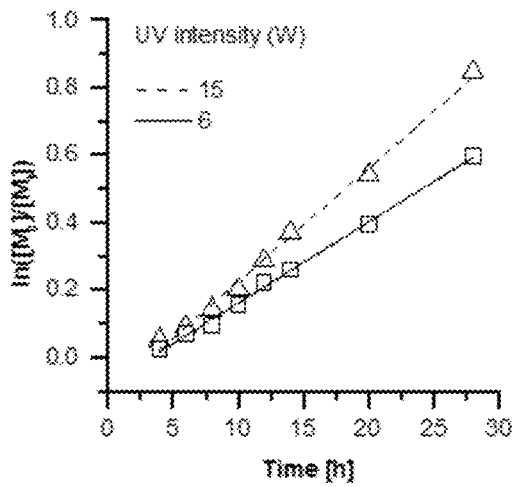
FIG. 26 is a kinetic plot showing monomer consumption (that is, the conversion of polymerisable monomers into a corresponding polymer) as a function of reaction time in the polymerization reaction of MMA in the presence of TTGS (600) under 15 W (dashed line) and 6 W (solid line) UV irradiation. The y axis corresponds to $\ln([M_0]/[M_t])$ which was calculated as described herein and the x axis corresponds to time in hours (h).
Figure 27:
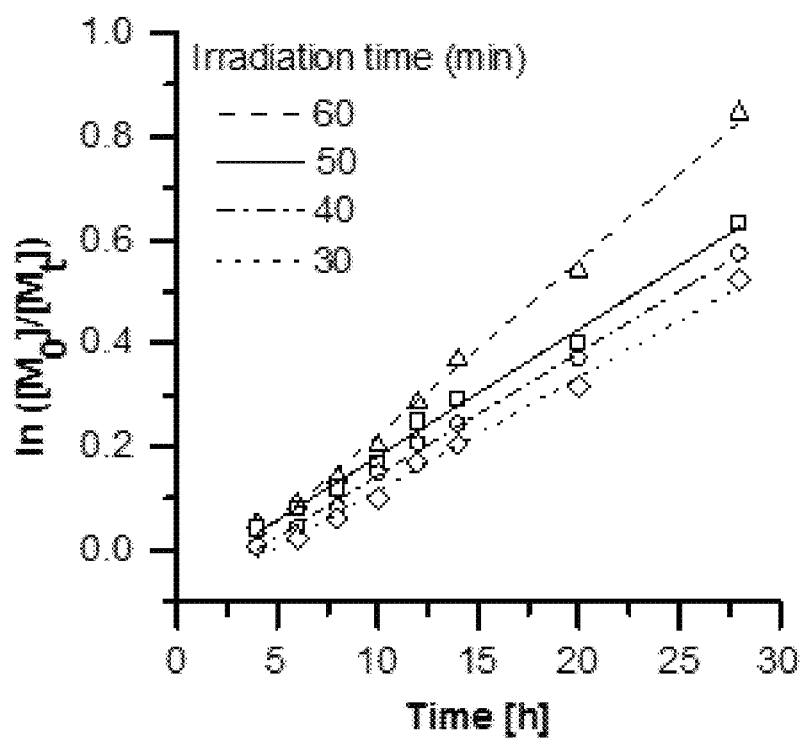
FIG. 27 a kinetic plot showing monomer consumption (that is, the conversion of polymerisable monomers into a corresponding polymer) as a function of reaction time in the polymerisation of MMA with TTGS(600) after an irradiation time of 60 minutes (dashed line), 50 minutes (solid line), 40 minutes (dash dot line) and 30 minutes (dotted line) using 15 W of UV light. The y axis corresponds to $\ln([M_0]/[M_t])$ which was calculated as described herein and the x axis corresponds to time in hours (h).

To further investigate the polymerisation kinetics, monomer consumptions using different UV irradiation intensities and UV irradiation times were monitored. FIGS. 26 and 27 report the monomer consumptions as a function of the reaction time for different UV intensities and irradiation times, respectively. The higher slope of the kinetic plot for polymerisation using 15 W UV revealed that a higher UV intensity provided a higher polymerisation rate. The kinetic plot of the polymerisation using 15 W UV shown in FIG. 26 indicates that the polymerisation rate increased with irradiation time.

In summary, these results demonstrated that a higher UV intensity and longer irradiation time provided a higher polymerisation rate. However, polymerisation using higher UV intensity and longer irradiation time resulted in polymers with lower molecular weights.

4.2.3 Effect of Polymerisation Temperatures

The effect of temperature on the generation rate of hydroxyl radicals was investigated by irradiating TA in the presence of a TTGS photoinitiator for 60 min at different temperatures. In all cases, the temperature was held constant under UV irradiation and in the dark. The resulting fluorescence spectra indicate that the generation rate of hydroxyl radicals was unaffected by temperature.

Table 26 lists the conditions used for the polymerisation of MMA using different temperatures, and some characterisation results. The molecular weight results indicate that the molecular weights of polymers did not show a significant temperature dependence.

TABLE 26

GSM-SICRP of MMA at different temperatures.

| Entry | Temperature under UV (° C.) | Temperature in dark (° C.) | Conversion (%) | Retention time (min) | Mn (g · mol$^{-1}$) | PDI |
|---|---|---|---|---|---|---|
| 1 | Room temperature | Room temperature | 11.3 | — | — | — |
| 2 | 60 | 60 | 97.9 | 10.32 | 956,000 | 1.14 |
| 3 | 80 | 80 | 96.3 | 10.32 | 942,000 | 1.18 |

Reaction conditions:
Photoinitiator: TTGS (600),
monomer weight: 0.094 mol,
UV intensity: 15 W,
UV irradiation time: 60 min,
reaction time in dark: 48 h.

Figure 28:
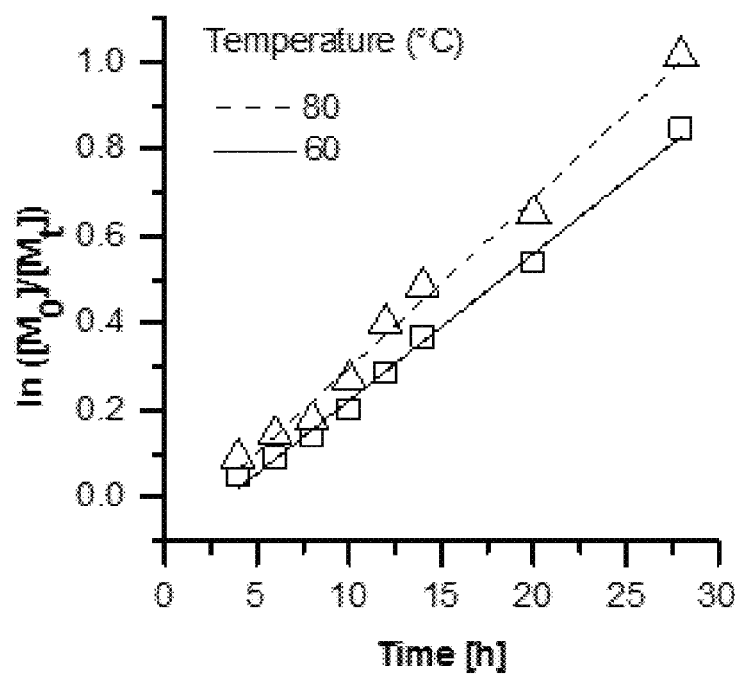
FIG. 28 is a kinetic plot showing monomer consumption (that is, the conversion of polymerisable monomers into a corresponding polymer) as a function of reaction time in the polymerisation of MMA with TTGS(600) as a function of different polymerisation temperature of 80° C. (dashed line) and 60° C. (solid line). The y axis corresponds to $\ln([M_0]/[M_t])$ which was calculated as described herein and the x axis corresponds to time in hours (h). Detailed description of the invention

The monomer consumptions at different temperatures were monitored to investigate the polymerisation temperature dependence of the polymerisation kinetics. FIG. 28 shows the monomer consumptions as a function of reaction time for different polymerisation temperatures. As can be seen, the polymerisation rate increased when the polymerisation temperature was raised. The analyses of the molecular weights and polymerisation kinetics pointed to the conclusion that higher polymerisation temperatures resulted in a higher polymerisation rate, and the molecular weight of polymers did not show any significant temperature dependence.

4.2.4 Effect of Monomer Feed Ratio

The glass transition temperature ($T_g$) is the temperature region where the polymer transitions from a glassy material to a rubbery material. $T_g$ is an important characteristics which may influence the material properties of a polymer and its potential applications. One method to adjust $T_g$ is to copolymerise monomers in a certain ratio. An equation for predicting glass transition temperatures of random copolymers is the Gordon-Taylor equation 8 show below [11]:

$$T_{g,mix} \approx \frac{[w_1 \times T_{g,1} + K \times w_2 \times T_{g,2}]}{w_1 + K \times w_2} \quad (8)$$

where $T_{g,mix}$ is the glass transition temperature of the copolymer, $T_{g,1}$ and $T_{g,2}$ are the glass transition temperatures of the respective homopolymers, $\omega_i$ is the weight fraction of component i, and K is an adjustable fitting parameter [12]. According to the Gordon-Taylor equation 8, the $T_{g,mix}$ of the random copolymer lies between $T_{g,1}$ and $T_{g,2}$, and the actual $T_{g,mix}$ value depends on the ratio of monomers.

To investigate the effect of the monomer feed ratio on the glass transition temperature, different proportions of methyl methacrylate (MMA) and butyl methacrylate (BMA) were copolymerised. The chemical compounds of the resulting copolymer with an initial proportion of butyl methacrylate equal to 0.5 ($f_{BMA}$) was detected by ATR-FTIR.

The FTIR spectra of the MMA monomer, BMA monomer and the copolymer of MMA and BMA were also recorded. A distinctive absorption band around 1640 cm$^{-1}$ (C=C) appeared in the spectra of the MMA and BMA monomers. However, there was no absorption peak at the same wavenumber for the copolymer. The disappearance of the C=C peak in the spectrum of the copolymer confirmed the completion of the copolymerisation.

Homopolymers of MMA and BMA were prepared as described in section 4.1.2 above. The glass transition temperature of the homopolymers and resulting copolymers were determined by MDSC. The DSC traces of PMMA and PBMA respectively prepared in the presence of TTGS (600) show that the $T_g$ of PBMA (31.8° C.) is lower than that of PMMA (108.9° C.).

DSC traces of copolymers prepared in the presence of TTGS (600) were recorded. The Tg values of the copolymers are tabulated in Table 27 along with the concentrations of MMA and BMA used to make each of the copolymers. The glass transition temperature of the prepared copolymers varied from 52.3 to 68.4° C., depending on the monomer feed ratio. The increase of the BMA proportion in the initial monomer mixture resulted in a decrease in the glass transition temperature. Consequently, the glass transition temperature of the resulting copolymers can be tailored by adjusting the monomer feed ratio.

TABLE 27

The experimental conditions for the copolymerisation of MMA and BMA, and effect of monomer feed ratio on glass transition temperature. Reaction conditions: Photoinitiator: TTGS (600), UV intensity: 15W, UV irradiation time: 60 min, polymerisation temperature: 60° C., reaction time in dark: 48 h.

| Expt. | $[MMA]_0$ mol | $[BMA]_0$ mol | $f_{BMA} = \frac{[BMA]_0}{[BMA]_0 + [MMA]_0}$ | $T_g$ ° C. |
|---|---|---|---|---|
| 1 | 0.094 | 0.094 | 0.5 | 68.4 |
| 2 | 0.075 | 0.113 | 0.6 | 63.9 |
| 3 | 0.056 | 0.132 | 0.7 | 61.3 |
| 4 | 0.038 | 0.15 | 0.8 | 57.6 |
| 5 | 0.019 | 0.169 | 0.9 | 52.3 |

4.3 Conclusion

This example demonstrates the effects of photoinitiators, irradiation parameters, polymerisation temperature, and monomer feed ratio on polymerisation kinetic and the resulting polymer properties.

The molecular weights of polymers were affected by the concentration of hydroxyl radicals (as assessed based on the fluorescence intensity at 425 nm). The TTZnAl (600) photoinitiator yielded polymers with higher molecular weights than those of TTGS (600), with the TTZnAl (600), which the inventors believe may correspond to the lower concentration of hydroxyl radicals.

Polymerisation using higher UV intensity resulted in lower molecular weight, with the higher UV intensity thought to correspond to the higher concentration of hydroxyl radicals.

The molecular weight of the resulting polymers decreased with irradiation time. This decrease may be attributed to the increasing concentration of hydroxyl radicals with irradiation time. Moreover, the generation rate of hydroxyl radicals was unaffected by temperature. Consequently, the molecular weight of polymers did not show any significant temperature dependence. The results indicate that the molecular weights of polymers were dependent on the concentration of hydroxyl radicals.

The results show that the concentration of hydroxyl radicals and the reaction temperature influence the polymerisation kinetics. The TTGS (600) photoinitiator that corresponded to a higher concentration of hydroxyl radicals provided a higher polymerisation rate than that of TTZnAl (600). Higher irradiation intensities and longer irradiation time, leading to a higher concentration of hydroxyl radicals, provided higher polymerisation rate. Moreover, a higher polymerisation temperature resulted in a higher polymerisation rate. Hence, a higher concentration of hydroxyl radicals (assessed based on the fluorescence intensity at 425 nm) and a higher reaction temperature lead to a higher polymerisation rate.

The glass transition temperature of the copolymers was affected by the initial comonomer composition. The glass transition temperature of the copolymers produced in this example were between the glass transition temperature of the respective homopolymers and depended on the ratio of monomers. Copolymers with a larger proportion of lower Tg homopolymers resulted had a lower glass transition temperature.

The successful production of polymers and copolymers with various molecular weights and glass transition temperatures indicated that the properties of polymers can be tailored by adjusting the reaction conditions and monomer feed ratio.

5. Example 4—Adhesion Properties and Corrosion Resistance

GSM-SICRP may have the potential to manufacture various configurations of metal-polymer composites, for example steel-polymer composites including laminated steel-polymer, steel fibre reinforced polymer, steel fabric-polymers, and polymer coated galvanised steel.

Polymer-coated galvanised steel and laminated galvanised steel-polymer composites have been successfully prepared via the GSM-SICRP technique.

The analysis and design of composites may involve the testing of composite performance, such as environmental corrosion resistance and mechanical, electromagnetic, and heat transport properties.

This example determined the adhesion strength and corrosion resistance of polymer coatings on galvanised steel surfaces.

Poly (diurethane dimethacrylate) (PDUDMA) was chosen as the polymer for use in this example due to its crosslinking properties combined with its flexible properties.

The adhesion strength of the PDUDMA coatings applied to different galvanised steels was evaluated by the pull-off test (as described below). The pull-off test of epoxy resin on galvanised steels was conducted as a controlled experiment. Epoxy resin was selected as the adhesive as it is a commonly used adhesive for joining dissimilar materials.

The adhesion strength of the PDUDMA coatings to galvanised steel substrates was also measured using a tape test (as described below).

There are multiple potential points of failure in the PDUDMA/galvanised steel system. The failure modes at the interface were studied. The corrosion resistance of PDUDMA/galvanised steel was determined by the salt spray test as well.

5.1 Experiment
5.1.1 Materials

Diurethane dimethacrylate (DUDMA) and sodium chloride (NaCl) were used as received. UTGS, TTGS (400) and TTGS (600) sheets were cut into square slides of 100 mm×100 mm in size, and then ultrasonically cleaned with ethanol and distilled water. A 15 W UV lamp (365 nm) was obtained from UVTech Systems, Inc.

5.1.2 Spin Coating

A spin coater (WS-400 Lite Series) from Laurell Technologies (USA) was employed for spin coating. UTGS, TTGS (400) and TTGS (600) sheets with a thickness of 0.5 mm and a 100 mm×100 mm in size were used as substrates.

The DUDMA monomer was deposited on the galvanised steel substrate at room temperature. The substrate was then rotated horizontally at a rotation rate of 2000 rpm for 60 s.

Deposited samples were irradiated with a UV light (15 W, $\lambda=350$ nm) for one hour, and then were held at a fixed temperature (60° C.) for 48 h followed by cooling to room temperature.

At the end of the reaction, a solid polydiurethane dimethacrylate (PDUDMA) coating on the galvanised steel substrate was obtained. The coating thickness was measured at about 30 μm by a coating thickness gauge (Elcometer Limited, UK, model No: Elcomete 355).

The chemical changes during polymerisation were monitored by ATR-FTIR.

5.1.3 Pull-Off Test

The adhesion strength of the PDUDMA coatings to galvanised steel substrates was measured using a direct pull-off adhesion test. The pull-off test was performed using a pull-off adhesion tester (DeFelsko Corporation, USA, model No: PosiTest AT-M Manual) in accordance with ASTM D4541-09 (Standard Test Method for Pull-Off Strength of Coatings Using Portable Adhesion Testers) [13]. The high durability super strength epoxy (3M, USA) was used as the adhesive. For each type of coating system, five samples were tested, and the corresponding average pull-off strength values were taken. The combination of SEM/EDS and XPS was applied to investigate the types of failure and provide physical and chemical information at high resolution. The failed substrates and corresponding dollies after the pull-off test were studied by stereomicroscopes (Nikon, Japan, model No: MSZ 18). The failure area at the interface was calculated by image analysis software (ImageJ).

5.1.4 Tape Test

The adhesion strength of the PDUDMA coatings to galvanised steel substrates was measured using the tape test. The tape test was performed in accordance with ASTM D3359-17 (Standard Test Methods for Rating Adhesion by Tape Test) using 3M Transparent Duct Tape 2120 (25 mm) and Scotch Blue 2090 Painters Tape (24 mm). Razor blades were used as a cutting tool. PDUDMA coatings having a dry film thickness between 50 μm and 125 μm were used. Six cuts with lengths of about 20 mm and spaced 2 mm apart were made to the film in a first direction and six cuts (of the same length and spacing) in a second direction perpendicular to the first were also made to the film, so as to create a cross hatched pattern (of 5 columns and 5 rows) of 2×2 mm squares. Cuts were made with sufficient pressure to just have the cutting edge reach the substrate. The centre of the tape was placed over the grid and in the area of the grid and smoothed into place to make uniform contact between the tape's adhesive and the coating surface. After 90 s of application, the tape was removed rapidly and the grid area inspected for removal of coating from the substrate.

5.1.5 Salt Spray Test

The salt spray test was conducted in a salt spray chamber (Calibre Plastics Ltd, NZ) in accordance with ASTM B 117-16 standard (Standard Practice for Operating Salt Spray Apparatus) [14]. Three types of uncoated galvanised steel sheets and three types of galvanised steel sheets with a PDUDMA coating were tested. Accelerated ageing on scribed specimens was also performed according to ASTM D1654-08 (Standard Test Method for Evaluation of Painted or Coated Specimens Subjected to Corrosive Environments) [15]. Six specimens were scribed manually with a sharp cutter. The two perpendicular scribe marks on each specimen penetrated the coating and the exposed steel substrate. The length of each scribe was 7 cm. The endpoints of the scribe were 1.5 cm from the edge of the sheet. All the test specimens were sealed on the sides with waterproof silicone sealant (Selleys, NZ). For each type of specimen three samples were tested.

The environmental conditions of both salt spray tests are shown in Table 28 below. The specimens were placed in the chamber at an angle of 80°. The total duration of the salt spray test on the unscribed specimens was 672 h. The specimens were examined after 72, 408, and 672 h of the corrosive environment exposure. The scribed specimens were tested for a total duration of 312 hours. The specimens were investigated after 144, 216 and 312 h of the corrosive environment exposure. For each examination, the specimens were gently washed in clean running water to remove salt deposits and then immediately dried in warm ambient air. The corrosion areas and the failed areas on the scribed samples were calculated by image analysis software (ImageJ).

TABLE 28

The environmental conditions of salt spray test

| Item | Value |
|---|---|
| Solution | 5 wt % NaCl |
| pH value | 6.5-7.2 |
| Condensed air pressure (psi) | 14-16 |
| Temperature in chamber (° C.) | 35 ± 2 |

The corrosion resistance of the specimens was evaluated by the rating number (RN) method in accordance with ASTM D610-08 (Standard Practice for Evaluating Degree of Rusting on Painted Steel Surfaces) [16]. This method provides a standardised approach for quantifying the degree of surface rust by using a zero to ten scale based on the percentage of visible surface rust. Table 29 describes the scale of rusting according to ASTM D610-08.

TABLE 29

Scale and Description of Rust Ratings according to ASTM D610-08 [16]

| Rust Grade (R) | Percent of Surface Rusted |
|---|---|
| 10 | Less than or equal to 0.01 percent |
| 9 | Greater than 0.01 percent and up to 0.03 percent |
| 8 | Greater than 0.03 percent and up to 0.1 percent |
| 7 | Greater than 0.1 percent and up to 0.3 percent |
| 6 | Greater than 0.3 percent and up to 1.0 percent |
| 5 | Greater than 1.0 percent and up to 3.0 percent |
| 4 | Greater than 3.0 percent and up to 10.0 percent |
| 3 | Greater than 10.0 percent and up to 16.0 percent |
| 2 | Greater than 16.0 percent and up to 33.0 percent |
| 1 | Greater than 33.0 percent and up to 50.0 percent |
| 0 | Greater than 50 percent |

The failed areas on the scribed specimens were measured and rated in terms of ASTM D1654-08 [15]. The mean width of creepage from the scribe was measured in millimetres. The degree of mean creepage from the scribe was evaluated using a zero to ten scale based on the width of the creepage as prescribed in Table 30.

TABLE 30

Rating of Failure at Scribe according to ASTM DI654-08 [15]

| Rating Number ($R_s$) | Representative Mean Creepage From Scribe Millimetres |
|---|---|
| 10 | 0 |
| 9 | Over 0 to 0.5 |
| 8 | Over 0.5 to 1.0 |
| 7 | Over 1.0 to 2.0 |
| 6 | Over 2.0 to 3.0 |
| 5 | Over 3.0 to 5.0 |
| 4 | Over 5.0 to 7.0 |
| 3 | Over 7.0 to 10.0 |
| 2 | Over 10.0 to 13.0 |
| 1 | Over 13.0 to 16.0 |
| 0 | Over 16.0 to more |

5.2 Results and Discussion 5.2.1 PDUDMA Coating

The chemical structures of the DUDMA monomers and the PDUDMA coating were characterised by ATR-FTIR. Characteristic absorption peaks at 1725 $cm^{-1}$ and 1530 $cm^{-1}$ were observed corresponding to the C=O stretch and N—H stretch respectively. The distinctive peak at 1640 $cm^{-1}$ that appeared in the spectra of the DUDMA monomer was assigned to carbon double bond (C=C) [113]. An absorption peak at the same wavenumber (1640 $cm^{-1}$) was not observed for the PDUDMA coating. The disappearance of the carbon double bond peak confirmed that the polymerisation occurred and PDUDMA polymer was obtained.

5.2.2 Adhesion Test

The adhesion strength of epoxy resins and PDUDMA coatings on galvanised steel substrates was measured using the pull-off test. The results of the pull-off measurements, along with the average adhesion strength of the specimens are shown in Table 31 below.

The average adhesion strength of epoxy systems was in the range of 1.88 to 1.98 MPa, whereas, the adhesion strength of the PDUDMA coating systems was greater, ranging from 2.40 to 2.48 MPa. Without wishing to be bound by theory the inventors believe that the pull-off strength of polymer-coated steel depends on the properties of the polymers and substrates, and usually ranges from 1.5 to 5 MPa. The pull-off strength of PDUDMA coating systems lies within this range, indicating that PDUDMA coating systems are comparable with conventional adhesive-bonded coating systems. Unlike adhesive-bonded coating systems, the bonding strength of PDUDMA coating systems was achieved without any particular pre-treatment.

TABLE 31

| | Adhesion strength (MPa) | | | | | |
|---|---|---|---|---|---|---|
| Exp | UTGS-Epoxy | TTGS (400)-Epoxy | TTGS (600)-Epoxy | UTGS-PDUDMA | TTGS (400)-PDUDMA | TTGS (600)-PDUDMA |
| 1 | 1.9 | 1.8 | 2.1 | 2.3 | 2.4 | 2.2 |
| 2 | 1.7 | 2 | 2 | 2.7 | 2.8 | 2.6 |
| 3 | 1.8 | 1.8 | 1.7 | 2.4 | 2.2 | 2.1 |
| 4 | 1.9 | 1.9 | 1.9 | 2.9 | 2.4 | 2.7 |
| 5 | 2.1 | 2 | 2.2 | 2.1 | 2.5 | 2.4 |
| Mean | 1.88 | 1.9 | 1.98 | 2.48 | 2.46 | 2.4 |
| Standard deviation | 0.1327 | 0.0895 | 0.1721 | 0.2856 | 0.1959 | 0.22803 |
| Standard error | 0.05933 | 0.04 | 0.0769 | 0.1277 | 0.0876 | 0.1019 |

The adhesion strength of Untreated galvanised steel and Epoxy system (UTGS-Epoxy),
Galvanised steel thermal treated at 400° C. and Epoxy system (TTGS (400)-Epoxy),
Galvanised steel thermal treated at 600° C. and Epoxy system (TTGS (600)-Epoxy),
Untreated galvanised steel PDUDMA system (UTGS-PDUDMA),
Galvanised steel thermal treated at 400° C. and
PDUDMA system TTGS (400)-PDUDMA,
Galvanised steel thermal treated at 600° C. and
PDUDMA system (TTGS (600)-PDUDMA).

Besides the measurement of adhesion strength, the failure modes of epoxy and PDUDMA coating were further studied. Two experiments were prepared. In the first experiment, a dolly was directly attached to galvanised steel surface samples (that is, steel comprising a layer of zinc on its surface) using epoxy adhesive. In the second experiment, a dolly was attached to the PDUDMA-coated surface of a galvanised steel substrate samples (that is, a steel substrate comprising a layer of zinc on its surface).

An adhesive failure may occur at the interface between two phases. In this case, adhesive failure may occur at the epoxy-substrate interface, epoxy-dolly interface, epoxy-PDUDMA interface, or PDUDMA-substrate interface. Without wishing to be bound by theory the inventors believe that adhesive failure may indicate inadequate bonding at the interface. In contrast to adhesive failure, cohesive failure occurs within the bulk of the epoxy or within the bulk of the PDUDMA coating. This failure is usually the desired failure mode because it may be taken to mean that the bond at the polymer/galvanised steel interface is stronger than the internal strength of the polymer.

The combination of optical microscopy, SEM/EDS, and XPS was applied to identify the types of failure at the interface. Optical microscopy preliminarily determined the domain failure modes at the interface. The components on the surface of the substrate and dolly were observed to further understand the mode of failure.

Without wishing to be bound by theory, the inventors believe that an adhesive failure at the epoxy/dolly interface may be evidenced by the presence of epoxy residue on the galvanised steel substrate and the absence of epoxy on the dolly. The presence of epoxy or PDUDMA on the dolly and the absence of any polymer (epoxy or PDUDMA) residue may indicate that an adhesive failure occurred at the epoxy/substrate or PDUDMA/substrate interface. The presence of epoxy or PDUDMA coating on both the galvanised steel substrate and dolly side may demonstrate that a cohesive failure has occurred within the bulk of polymer coating.

The area of residual epoxy and PDUDMA was calculated by image analysis software (ImageJ) using optical images of the pull-off test areas in one of five epoxy resin systems and PDUDMA coating systems (see results in Tables 32 and 33 respectively). For the UTGS-epoxy, TTGS (400)-epoxy, and TTGS (600)-epoxy samples, predominant residual epoxy was present on the dolly side. The fracture mainly occurred at the epoxy/zinc interface (85% and 81%, and 78% respectively for UTGS-epoxy, TTGS (400)-epoxy, and TTGS (600)-epoxy samples as shown in Table 32), indicating relatively low adhesion strength.

| The failure modes of UTGS-Epoxy, TTGS (400)-Epoxy, and TTGS (600)-Epoxy after pull-off tests. | | | |
|---|---|---|---|
| Sample | Mode A | Mode B | Mode C |
| UTGS-Epoxy | 5% | 10% | 85% |
| TTGS (400)-Epoxy | 5% | 14% | 81% |
| TTGS (600)-Epoxy | 11% | 11% | 78% |

In the PDUDMA systems, predominant residual PDUDMA was observed on both the substrate side and the dolly side. The fracture of PDUDMA coating systems predominantly occurred as a cohesive failure in the epoxy and PDUDMA coating.

The percentage of cohesive failure in the epoxy and PDUDMA coating of UTGS-PDUDMA, TTGS (400)-PDUDMA, and TTGS (600)-PDUDMA were 51%, 75%, 73%, respectively. The percentage of cohesive failure in the thermally treated galvanised steel-PDUDMA coating samples (75%, 73%) was higher than that of the UTGS-PDUDMA sample (51%). The increase of cohesive failure area might result from the increase of the surface roughness due to the thermal treatment.

Without wishing to be bound by theory, the inventors believe that thermally treated galvanised steel substrates may initiate more PDUDMA chains compared to the untreated substrates. Hence, another possible reason for the increase of bonding strength of thermally treated samples may be that more PDUDMA chains are bound to the surface of the thermally treated galvanised steel compared to the untreated steel. The fact that the failure predominantly occurred in the polymer coating rather than at the polymer steel interface may be indicative of stronger bonding between PDUDMA and galvanised steel compared to that of the epoxy system (in which the dolly was directly attached to the galvanised steel surface using an epoxy adhesive).

TABLE 33

The failure modes of UTGS-PDUDMA, TTGS (400)-PDUDMA, and TTGS (600)-PDUDMA after pull-off test

| Sample | Mode A | Mode B | Mode C |
|---|---|---|---|
| UTGS-PDUDMA | 1% | 51% | 47% |
| TTGS (400)-PDUDMA | 13% | 75% | 12% |
| TTGS (600)-PDUDMA | 16% | 73% | 11% |

Since optical microscopy only provides approximate domain failure mode, SEM/EDS and XPS were conducted to provide physical and chemical information at the fracture interface. Elemental mapping analysis revealed the location of the polymer residue on the galvanised steel. The presence of C and Zn in the image indicated that the fracture mainly occurred as a mixture of cohesive failure and adhesive failure.

XPS was used to analyse the galvanised steel substrate and corresponding dolly side in the same cohesive failure/adhesive failure zone. Zinc was present on both the galvanised steel side and the dolly side. Tin (Sn) was detected on both surfaces. This Sn element was assigned to Tin complex catalyst (Tin(II) 2-ethyl hexanoate or tin(II) octoate or stannous octoate (Sn(Oct)2)) residue from the PDUDMA coating. The existence of zinc and the PDUDMA coating on both sides further indicated that there may have been a mixture of cohesive failure in the zinc layer, cohesive failure in the PDUDMA coating, and adhesive failure at the PDUDMA/zinc interface.

The relative atomic composition of the steel side and the dolly side of the samples was also analysed and the results are shown in Table 34 below.

TABLE 34

Elemental composition of cohesive failure/adhesive failure surfaces in galvanised steel substrate side and dolly side.

| | Relative atomic composition (%) | | | | | | |
|---|---|---|---|---|---|---|---|
| Samples | C 1s | O 1s | Zn 2p 3/2 | Ca 2p | Si 2s | Sn 3d | N 1s |
| Steel side | 73 | 18 | <1 | 7 | 1 | <1 | — |
| Dolly side | 59 | 19 | <1 | 2 | 8 | 3 | 8 |

In summary, the bonding strength of PDUDMA coating systems was comparable with conventional adhesive-bonded coating systems.

The joining technique described herein (GSM-SICRP) may be used without the need for adhesives, solvents, or other additives which are costly and can be toxic. The absence of additives may make the technique described herein more eco-friendly and may also make the technique more cost-effective than adhesive bonding. Moreover, the GSM-SICRP technique may require less surface treatment compared to adhesive bonding.

5.2.3 Tape Test

The adhesion strength of the PDUDMA coatings to galvanised steel substrates was measured using the tape test. The adhesion test results were classified around 4B (see Table 34a), which corresponds to less than 5% of the cross hatched coating area removed from the substrate after the tape test, indicating good adhesion between PDUDMA coating and substrate.

TABLE 34a

Classification of Adhesion Test Results for cross-cut tape test.
Classification of Adhesion Test Results

| Classification | Percent area removed |
|---|---|
| 5B | 0% None |
| 4B | Less than 5% |
| 3B | 5-15% |
| 2B | 15-35% |
| 1B | 35-65% |
| 0B | Greater than 65% |

5.2.4 Salt Spray Test

The appearance of uncoated and coated galvanised steel samples before and after the salt spray test for different lengths of time in hours (h) is shown in Table 35.

TABLE 35

Rust grade (R) of galvanised steel sheets with and without PDUDMA coating after different exposure times of salt spray test

| | Hours | | | |
|---|---|---|---|---|
| Substrate | 0 | 72 | 408 | 672 |
| UTGS | R (10) | R (10) | R (4) | R (1) |
| UTGS-PDUDMA | R (10) | R (10) | R (5) | R (3) |
| TTGS (400) | R (10) | R (4) | R (0) | R (0) |
| TTGS (400)-PDUDMA | R (10) | R (10) | R (9) | R (4) |
| TTGS (600) | R (10) | R (0) | R (0) | R (0) |
| TTGS (600)-PDUDMA | R (10) | R (10) | R (2) | R (1) |

Corrosion was observed in the UTGS surfaces after 408 h of exposure, whereas, corrosion products did not start to form on the UTGS-PDUDMA surface until 672 h.

In the case of the TTGS (400) sample, some white rust was observed on TTGS (400) surface after 72 h. This white rust may be attributed to simonkolleite ($Zn_5(OH)_8Cl_2$) and hydrozincite ($Zn_5(CO_3)_2(OH)_6$). The white rust then spread across the surface of the TTGS (400) after 408 h of exposure. In contrast, no apparent general corrosion took place on the TTGS (400)-PDUDMA sample after 408 h of exposure. White rust started to form on the TTGS (400)-PDUDMA surface after 672 h of exposure.

For the TTGS (600) sample, the surface was fully covered with red rust after 72 h of exposure. The red rust may have been due to the presence of iron oxide ($Fe_2O_3$). However, no apparent red rust was observed on the TTGS (600)-PDUDMA sample until 408 h of exposure.

These observations indicated that galvanised steel sheets with a PDUDMA coating may exhibit better corrosion resistance than those of uncoated galvanised steel sheets. Moreover, the corrosion rate of galvanised steel increased with thermal treatment temperature. Without wishing to be bound by theory the inventors believe that the passivation layer (zinc carbonate or zinc carbonate hydroxide) was removed, and the surface morphology changed after thermal treatment. The removal of the passivated layer and the change of surface morphology may allow corrosive electrolytes to permeate more easily into the zinc layer and steel substrate.

After a salt spray test of 672 h, the corresponding corrosion resistance rating number of specimens was obtained and listed in Table 36.

TABLE 36

The evaluation of specimens after the salt spray test for 672 hours.

| Specimen | Rust Grade (R) | Percent of Surface Rusted |
|---|---|---|
| UTGS | 1 | Greater than 33.0 percent and up to 50.0 percent |
| UTGS-PDUDMA | 3 | Greater than 10.0 percent and up to 16.0 percent |
| TTGS (400) | 0 | Greater than 50 percent |
| TTGS (400)-PDUDMA | 4 | Greater than 3.0 percent and up to 10.0 percent |
| TTGS (600) | 0 | Greater than 50 percent |
| TTGS (600)-PDUDMA | 1 | Greater than 33.0 percent and up to 50.0 percent |

The galvanised steel sheets with a PDUDMA coating had a larger rust grade (R) than that of corresponding uncoated galvanised steel sheets, indicating that galvanised steel sheets with a PDUDMA coating may have a better corrosion inhibition performance than uncoated steel samples.

Among the galvanised steel samples with PDUDMA coatings, the TTGS (400)-PDUDMA sample had the least corrosion and the highest rust grade (R). The corrosion resistance of TTGS (400)-PDUDMA was better than that of UTGS-PDUDMA, which may have been due to a better coating protection, which the inventors believe may be due to higher bonding strength.

TTGS (400)-PDUDMA had better corrosion resistance than TTGS (600)-PDUDMA. This result may have been due to better corrosion resistance of the zinc layer.

The corrosion resistance of the TTGS (400)-PDUDMA sample may be attributed to combined protection from the polymer coating and the secondary zinc layer.

The corrosion behaviour of scribed specimens was also investigated. Table 37 shows the rust grades of scribed galvanised steel sheets with and without PDUDMA coating exposed to accelerated corrosion media after different periods of time up to 312 h.

TABLE 37

Rust grades of scribed galvanised steel sheets with and without PDUDMA coating after different exposure times of salt spray test; where R is the overall rust grade and Rs is the rust grade of the scribed area.

| Hours | 0 | 144 | 216 | 312 |
|---|---|---|---|---|
| UTGS | R (10) | R (10) | R (10) | R (4) |
|  | $R_s$ (10) | $R_s$ (9) | $R_s$ (8) | $R_s$ (7) |
| UTGS-PDUDMA | R (10) | R (10) | R (10) | R (4) |
|  | $R_s$ (10) | $R_s$ (9) | $R_s$ (8) | $R_s$ (7) |
| TTGS (400) | R (10) | R (0) | R (0) | R (0) |
|  | $R_s$ (10) | $R_s$ (0) | $R_s$ (0) | $R_s$ (0) |
| TTGS (400)-PDUDMA | R (10) | R (5) | R (4) | R (1) |
|  | $R_s$ (10) | $R_s$ (7) | $R_s$ (4) | $R_s$ (0) |
| TTGS (600) | R (10) | R (0) | R (0) | R (0) |
|  | $R_s$ (10) | $R_s$ (—) | (—) | $R_s$ (—) |
| TTGS (600)-PDUDMA | R (10) | R (8) | R (6) | R (1) |
|  | $R_s$ (10) | $R_s$ (—) | (—) | $R_s$ (—) |

Table 38 lists the corresponding rust grade (R) and rust grade on scribed areas ($R_s$) of the specimens.

TABLE 38

The evaluation of scribed specimens after the salt spray test for 312 hours.

| Specimen | Rust Grade (R) | Percent of Surface Rusted | Rust Grade of Scribed Area ($R_s$) | Mean Creepage From Scribe (mm) |
|---|---|---|---|---|
| UTGS | 4 | Greater than 3.0 percent and up to 10.0 percent | 7 | Over 1.0 to 2.0 |
| UTGS-PDUDMA | 4 | Greater than 3.0 percent and up to 10.0 percent | 7 | Over 1.0 to 2.0 |
| TTGS (400) | 0 | Greater than 50 percent | 0 | Over 16.0 to more |
| TTGS (400)-PDUDMA | 1 | Greater than 33.0 percent and up to 50.0 percent | 0 | Over 16.0 to more |
| TTGS (600) | 0 | Greater than 50 percent | 8 | Over 0.5 to 1.0 |
| TTGS (600)-PDUDMA | 1 | Greater than 33.0 percent and up to 50.0 percent | 8 | Over 0.5 to 1.0 |

Note:
For determination of mean creepage see ASTM D7087-05a. Creepage is a gradual process of growing rust. Mean creepage = (area inside the rust creepage area)/(2 × length of scribe line from which creepage is extended and area is integrated).

As shown in Table 38, corrosion products did not start to form until after 216 h of exposure for the UTGS and UTGS-PDUDMA samples. After 144 h of exposure, corrosion products began to form on the TTGS (400) and TTGS (400)-PDUDMA surfaces.

More corrosion products and higher scribe width were observed on TTGS (400) and TTGS (400)-PDUDMA in comparison with untreated ones after 312 h. Moreover, TTGS (400)-PDUDMA had fewer corrosion products than those of TTGS (400), as indicated by the larger rust grade (R=1) of the former specimens than that of the latter specimen (R=0). The TTGS (600) surface was fully covered with corrosion products after 144 h of exposure, denoting a more severe corrosion attack.

The fewer corrosion products on TTGS (600)-PDUDMA and the higher corresponding rust grade (R) than that of TTGS (600) indicated increased corrosion resistance of TTGS (600)-PDUDMA compared to TTGS (600). These observations were in good agreement with the unscribed specimens and further demonstrated that the galvanised steel with PDUDMA coating showed increased corrosion inhibition performance compared to uncoated samples.

Among all the coated scribed specimens, the UTGS-PDUDMA sample had the least corrosion and the highest rust grade (R). The TTGS-PDUDMA sample had more corrosion than that of the corresponding untreated samples, and this may be because the permeation of corrosive electrolytes from the scribed lines caused faster zinc layer corrosion, which deteriorated the polymer coating. In summary, the salt spray test results of the unscribed and scribed specimens indicated that the galvanised steel with PDUDMA coating had better corrosion resistance than the corrosion resistance of samples without a PDUDMA coating.

5.3 Conclusion

This example shows the adhesion properties, as well as the anticorrosion performance of the PDUDMA coating on the surface of different galvanised steel substrates.

The adhesion strength of the PDUDMA/galvanised steel and epoxy/galvanised steel were evaluated by the pull off test. Failure occurred predominantly in the polymer rather than at the polymer/zinc layer interface of the PDUDMA system, which indicated increased bonding strength compared to the bonding strength of the epoxy system. The higher pull off strength values for the PDUDMA system compared to the epoxy system indicated stronger bonding strength.

These results indicated that the bonding strength of PDUDMA/galvanised steel is stronger than that of the epoxy system. The higher percentage of cohesive failure in the thermally treated galvanised steel-PDUDMA coating samples than that of the UTGS coating system also indicated that thermally treated galvanised steel-PDUDMA coating systems may have stronger bonding strength compared to the bonding strength of untreated samples.

The adhesion strength of the PDUDMA/galvanised steel was evaluated by the tape test. The result indicated good adhesion between the PDUDMA coating and the substrate.

The corrosion resistance of different galvanised steel specimens and the corresponding PDUDMA coated galvanised steel specimens was investigated by the salt spray test. The appearance of scribed and unscribed specimens after the salt spray test revealed that the galvanised steel with a PDUDMA coating showed increased corrosion resistance compared to the corrosion resistance of uncoated samples. Moreover, it was found that the corrosion rate of uncoated galvanised steel increased with thermal treatment temperature. The decrease in corrosion resistance in thermally treated samples may be due to removal of the passivated layer and the change of surface morphology, which may make it possible for corrosive electrolytes to permeate more easily into the zinc layer and the steel substrate.

6. Example 5—Polymerisation of Methyl Methacrylate (MMA) Initiated by a Thermally Treated Titanium (Ti) Substrate This example demonstrates the ability of the thermally treated titanium (TTTi) substrate to photo-initiate polymerisation under UV illumination.

6.1 Experiment

Methyl methacrylate (MMA), 99%, Sigma-Aldrich, contains 30 ppm Mequinol (4-methoxyphenol (MEHQ) as inhibitor) was purified by washing three times with 10 wt % NaOH, followed by washing with deionised water until the monomer was neutral, and then distilled under reduced pressure after being dried overnight with $Na_2SO_4$. The purified monomer was stored in a nitrogen atmosphere and fridge at 4° C. before use.

Titanium (Ti) substrates in the form of 0.5 mm thick sheets were cut into square slides of 15 mm×15 mm in size, and then ultrasonically cleaned with ethanol and distilled water. The thermal treatment was conducted at 400° C. for 2 hours in an ambient atmosphere, resulting in thermally treated titanium substrate (TTTi).

For each experiment, methyl methacrylate (MMA) (9.4 g, 0.094 mol) and thermally treated titanium substrate (TTTi) (15 mm×15 mm) were placed in a 20 ml vial, and the reaction mixture was irradiated with a UV light (6 W or 15 W, λ=350 nm) for 1h. The sealed vial was held at a fixed temperature (60° C.) in an oven for different lengths of time (0-48 h). The change in chemical species during polymerisation was monitored by Fourier-transform infrared spectroscopy (FTIR).

6.2 Results and Discussion

As the mixtures of methyl methacrylate (MMA) and thermally treated titanium substrate (TTTi) did not contain any catalyst that required an inert atmosphere to retain activity, all polymerisations were conducted in an ambient atmosphere to simplify the reaction setup.

The polymerisations of methyl methacrylate (MMA) were first performed at 60° C. without UV irradiation or under one-hour UV irradiation, and without using any initiator or additional materials. MMA monomers were also polymerised without UV irradiation at 60° C., using TTTi substrate as photoinitiators. The detailed reaction conditions and the observation of resulting materials are listed in Table 39.

TABLE 39

The polymerisation of MMA at different reaction conditions and the observation of resulting materials. Reaction conditions: Monomer: MMA, Monomer weight: 0.094 mol, UV intensity: 15 W, reaction time in dark: 48 h.

| Photo-initiators | UV irradiation time (hour) | Reaction temperature (° C.) | Phase | Resulting materials |
| --- | --- | --- | --- | --- |
| — | — | 60 | Liquid | MMA monomer |
| — | 1 | 60 | Liquid | MMA monomer |
| TTTi | — | 60 | Liquid | MMA monomer |
| TTTi | 1 | 60 | Solid | PMMA polymer |

As shown in Table 39, no polymerisation took place in the absence of UV irradiation and TTTi photoinitiator. In contrast, a transparent solid polymer was formed in reaction mixtures comprising MMA in the presence of TTTi.

The resulting polymers were characterised by ATR-FTIR. The spectrum of the MMA monomer showed a distinctive absorption band around 1640 $cm^{-1}$, which was assigned to carbon double bond (C=C). The absorption peak at the same wavenumber (1640 $cm^{-1}$) was not observed for polymers prepared by TTTi. The disappearance of the carbon-carbon double bond peak was used to confirm that polymerisation had occurred and PMMA polymers were synthesised using TTTi as photoinitiators.

7. Example 6—Polymerisation of MMA Initiated by Different Metal Initiators 7.1 Experiment This example shows the ability of different initiators to photo-initiate polymerisation under UV illumination.

7.1.1 Materials

Methyl methacrylate (MMA) was purified and stored in a nitrogen atmosphere in the fridge at 4° C. before use. $ZnCO_3$, ZnO, zinc carbonate hydroxide ($Zn_5(CO_3)_2(OH)_6$), and TiO2 powders were used as received. Al foil, Zincalume sheet, Cu sheet were cut into square slides of 15 mm×15 mm in size, and then ultrasonically cleaned with ethanol and distilled water. Thermal treatment was conducted at 400° C. for 2 hours in an ambient atmosphere, resulting in thermally treated metal substrate.

7.1.2 Homopolymerisation

Methyl methacrylate (MMA) (9.4 g, 0.094 mol) and thermally treated metal substrates (15 mm×15 mm)/0.5 wt. % of powders were put into a 20 ml vial, and the reaction mixture was irradiated with a UV light (15 W, λ=350 nm) for 1 h. The sealed vial was held at a fixed temperature (60° C.) in an oven for 48 h.

7.2 Results and Discussion

The polymerisations of methyl methacrylate (MMA) were first performed at 60° C. without UV irradiation or under one-hour UV irradiation, and without using any initiator or additional materials. MMA monomers were also polymerised without UV irradiation at 60° C., using different photoinitiators.

No polymerisation took place in all cases.

The detailed reaction conditions and the observation of resulting materials are listed in Table 40.

Subsequent polymerisation of MMA was conducted under UV irradiation for one hour, using TT Zincalume, ZnO powder, and TiO2 powder as photoinitiators. The reaction mixture was then placed in the dark at 60° C. for 48 hours. A significant amount of transparent solid polymers was formed, indicating that the polymerisation had occurred and PMMA polymers were synthesised.

However, polymerisation to provide a solid phase did not take place when using TT Al foil, $ZnCO_3$, and $Zn_5(CO_3)_2(OH)_6$ as photoinitiators under these conditions.

TABLE 40

The polymerisation of MMA by different initiators at different reaction conditions and the observation of resulting materials. Reaction conditions: Monomer: MMA, Monomer weight: 0.094 mol, UV intensity: 15 W, UV wavelength: 350 nm reaction time in dark: 48 h.

| Photo-initiators | UV irradiation time (hour) | Reaction temperature (° C.) | Phase | Resulting material |
|---|---|---|---|---|
| — | — | 60 | Liquid | MMA monomer |
| — | 1 | 60 | Liquid | MMA monomer |
| TT Zincalume | — | 60 | Liquid | MMA monomer |
| TT Zincalume | 1 | 60 | Solid | PMMA polymer |
| TT Al foil | — | 60 | Liquid | MMA monomer |
| TT Al foil | 1 | 60 | Liquid | MMA monomer |
| $ZnCO_3$ | — | 60 | Liquid | MMA monomer |
| $ZnCO_3$ | 1 | 60 | Liquid | MMA monomer |
| ZnO | — | 60 | Liquid | MMA monomer |
| ZnO | 1 | 60 | Solid | PMMA polymer |
| $Zn_5(CO_3)_2(OH)_6$ | — | 60 | Liquid | MMA monomer |
| $Zn_5(CO_3)_2(OH)_6$ | 1 | 60 | Liquid | MMA monomer |
| $TiO_2$ | — | 60 | Liquid | MMA monomer |
| $TiO_2$ | 1 | 60 | Solid | PMMA polymer |

8. Example 7—Polymerisation of DUDMA on Metal Substrate by Surface-Initiated Polymerisation

8.1 Experiment

This example describes the preparation of PDUDMA coatings on different substrates by spin-coating.

8.1.1 Materials

Diurethane dimethacrylate (DUDMA) was used as received. All metal substrates (galvanised steel (GS), titanium (Ti), Al 5251 sheet (Al), anodized Al sheet (anodized Al), copper sheet (Cu)) were in the form of sheets and were cut into square slides of 100 mm×100 mm in size, and then cleaned with ethanol and distilled water. Thermal treatment was conducted at 400° C. for 2 hours in an ambient atmosphere, resulting in thermally treated substrates.

8.1.2 General Procedures for the Preparation of PDUDMA Coating on Substrates by Spin Coating A spin coater (WS-400 Lite Series) from Laurell Technologies (USA) was employed for spin coating. The DUDMA monomer was deposited on the metal substrate at room temperature. The substrate was then rotated horizontally at a rotation rate of 1000, 2000, 3000 rpm for 2 mins. Deposited samples were irradiated with a UV light (15 W, λ=350 nm) for 2 hours, and then were held at a fixed temperature (60° C. and 80° C.) for various time until solid PDUDMA coatings were obtained, followed by cooling to room temperature.

8.1.3 Characterisation of PDUDMA Coating

The coating thickness was measured by a coating thickness gauge (Elcometer Limited, UK, model No: Elcomete 355). The chemical changes during polymerisation were monitored by ATR-FTIR.

The chemical structures of the DUDMA monomers and the PDUDMA coating were characterised by ATR-FTIR.

8.2 Results and Discussion

Table 41 shows the observation of resulting coating initiated by different metal initiators. Polymerisation occurred and PDUDMA coatings were synthesised by using thermally treated galvanised steel, Ti, Al, anodized Al and copper as photoinitiator.

TTGS and TTTi provides a faster polymerisation rate (6-7 days) than other metal substrates (~12 days).

TABLE 41

Preparation of PDUDMA coating on different substrates by spin-coating and the observation of resulting coating.

| Substrate | Curing time (days) | Observation |
|---|---|---|
| TTGS | 6-7 | Coating |
| TTTi | 6-7 | Coating |
| TTAl | 12 | Coating |
| Anodized TTAl | 12 | Coating |
| TTCu | 12 | Coating |

ATR-FTIR showed characteristic absorption peaks at 1725 cm−1 and 1530 cm−1 related to C═O stretch and N—H stretch respectively. A distinctive peak at 1640 cm−1 appeared in the spectra of the DUDMA monomer and is assigned to carbon double bond (C═C). An absorption peak at the same wavenumber (1640 cm−1) was not observed in the spectra for the PDUDMA coatings. The disappearance of the carbon double bond peak confirmed that the polymerisation occurred and PDUDMA polymer was obtained.

9. Example 8—Molecular Weight Determination of Polymers by SEC-MALS

9.1 Experiment

Methyl methacrylate (MMA) (9.4 g, 0.094 mol) and thermally treated substrate (15 mm×15 mm) were put into a 20 ml vial, and the reaction mixture was irradiated with a UV light (15 W, λ=350 nm) for 1h. The sealed vial was held at a fixed temperature (60° C.) in an oven for different durations (0-48 h). The polymerisation of the other monomers (MA/BMA/BA) were conducted following the same procedure.

9.1.1 Materials

The acrylic monomers were purified and stored in a nitrogen atmosphere in a fridge at 4° C. before use. Samples of hot-dip galvanized steel with an approximately 20-25 μm thick zinc coating were cleaned ultrasonically with deionized water. Thermal treatment was conducted at 400° C. (TTGS (400)) and 600° C. (TTGS (600)) for 2 hours in ambient atmosphere to produce thermally treated galvanized steel.

9.1.2 Characterisation of Polymers by SEC-MALS

The molecular weights and polydispersity indices of polymers were measured by a size exclusion chromatography (SEC) coupled with multi-angle light scattering (MALS). The SEC used THF as eluent at 30° C. and a flow rate of 1.0 mL/min. Data acquisition and processing were performed using the ASTRA 4 software (Wyatt Technologies Corporation).

9.2 Results and Discussion

The molecular weights and polydispersity of the obtained PMMA/PMA/PBMA/PBA were measured by size exclusion chromatography with multi-angle light scattering analysis (SEC-MALS). The properties of the polymers are listed in Table 42.

TABLE 42

The molecular weights and molecular weight distributions of the resulting PMMA polymers. Reaction conditions: Monomer weight: 0.094 mol, UV intensity: 15 W, UV irradiation time: 60 min, polymerisation temperature: 60° C.

| Initiator | Monomer | Conversion [%] | Mn [a] [g/mol] | PDI [a] |
|---|---|---|---|---|
| UTGS | MMA | 6.19 | — | — |
| TTGS (400) | MMA | 95.6 | 2,270,000 | 1.12 |
| TTGS (600) | MMA | 97.9 | 1,605,000 | 1.32 |
| TTGS (400) | MA | 99.8 | 2,065,000 | 1.13 |
| TTGS (400) | BMA | 95.4 | 2,074,000 | 1.14 |
| TTGS (400) | BA | 96.2 | 1,993,000 | 1.14 |

[a] Determined by size exclusion chromatography with multi-angle light scattering analysis (SEC-MALS).

The SEC trace of resulting PMMA displayed unimodal distribution with the high molecular weight (Mn=2,270 k) and the low dispersity (PDI=1.12), which indicates that TTGS (400) photoinitiator can yield high molecular weight and narrow molecular weight distributions through one initiation pathway. To investigate the efficiency of TTGS (400) to synthesize structurally high molecular weight acrylic polymers with low PDI, methyl acrylate (MA), butyl acrylate (BA), and butyl methacrylate (BMA) were also polymerized using TTGS (400) as an initiator. The SEC results showed that all acrylic monomers yielded high molecular weight polymers (Mn>1,993 k) with low PDI (PDI<1.2). These results indicate that TTGS (400) is an efficient photoinitiator for synthesizing acrylic polymers with high molecular weight and narrow molecular weight distributions.

10. Example 9—Measurement of Hardness of PMMA Polymer

The hardness of PMMA polymers produced as described herein by the method of the invention was measured with an Elcometer 3092 Sclerometer Hardness Tester (Pencil hardness test). No deformation of the polymer coating was observed when the maximum force (20N) was applied, therefore the PMMA polymers had a hardness of greater than 20N.

11. Example 10—Polymerisation of DUDMA on a Thermally-Treated Magnesium Substrate Polymerisation of DUDMA on a thermally-treated magnesium substrate was carried out according to the method of the invention as described herein. A PDUDMA coating was observed after a curing time of 12 days.

REFERENCES

[1] Linxiang, L., et al., An HPLC assay of hydroxyl radicals by the hydroxylation reaction of terephthalic acid. Biomedical Chromatography, 2004. 18(7): p. 470-474.
[2] Ishibashi, K.-i., et al., Detection of active oxidative species in TiO2 photocatalysis using the fluorescence technique. Electrochemistry Communications, 2000. 2(3): p. 207-210.
[3] Wagner, C. D., Auger lines in X-ray photoelectron spectrometry. Analytical Chemistry, 1972. 44(6): p. 967-973.
[4] Dollimore, D., et al., Kinetic aspects of the thermal decomposition of zinc carbonate. Thermochimica Acta, 1980. 36(3): p. 343-349.
[5] Hutera, B., et al., Synthesis of ZnO nanoparticles by thermal decomposition of basic zinc carbonate. Archives of Metallurgy and Materials, 2013. 58(2): p. 489-491.
[6] Kanari, N., et al., Thermal decomposition of zinc carbonate hydroxide. Thermochimica Acta, 2004. 410(1): p. 93-100.
[7] Moad, G. and D. H. Solomon, The chemistry of radical polymerization. 2006: Elsevier.
[8] Matyjaszewski, K. and T. P. Davis, Handbook of radical polymerization. 2003: John Wiley & Sons.
[9] Buback, M. and A. M. van Herk, Radical Polymerization: Kinetics and Mechanism. 2007: John Wiley & Sons.
[10] Jagur-Grodzinski, J., Living and controlled polymerization: synthesis, characterization, and properties of the respective polymers and copolymers. 2006: Nova Publishers.
[11] Jagur-Grodzinski, J., Living and controlled polymerization: synthesis, characterization, and properties of the respective polymers and copolymers. 2006: Nova Publishers.
[12] Odian, G., Principles of polymerization. 2004: John Wiley & Sons.
[13] ASTM, D., 4541, Standard Test Method for Pull-Off Strength of Coatings Using Portable Adhesion Testers. ASTM International, USA, 2009.
[14] ASTM, B., 117, Standard Practice for Operating Salt Spray (Fog) Apparatus. ASTM International (1997 Edition), 2011.
[15] Paint, A. C. D.-o., M. Related Coatings, and Applications, Standard Test Method for Evaluation of Painted or Coated Specimens Subjected to Corrosive Environments. 2008: ASTM International.
[16] D610-08, A., Standard Practice for Evaluating Degree of Rusting on Painted Steel Surfaces. ASTM international, 2008.

The following numbered paragraphs define certain aspects and embodiments of the invention described herein:
1. A method for producing a polymer, the method comprising:
providing one or more polymerisable monomers;
providing a substrate comprising an activated metal surface,
the activated metal surface comprising one or more compounds capable of initiating polymerisation of the one or more polymerisable monomers, and
contacting the activated metal surface and the one or more polymerisable monomers to polymerise the one or more polymerisable monomers, thereby producing the polymer.

2. The method of paragraph 1, wherein the activated metal surface when contacted with an aqueous solution of 30.096 µM terephthalic acid and 0.001 mol/L NaOH and irradiated at 365 nm with a light source at 15 W for 1 hour at room temperature is capable of producing 2-hydroxyterephthalic acid at a concentration of at least 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.0105, 0.011, 0.0115, 0.012, 0.0125, or 0.013 µM/mm$^2$ geometric area of activated surface, as determined by fluorescence spectroscopy at 425 nm.

3. The method of paragraph 1 or 2, wherein the activated metal surface when tested according to the procedure set forth in section 1.7 of the Examples produces 2-hydroxyterephthalic acid at a concentration of at least 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.0105, 0.011, 0.0115, 0.012, 0.0125, or 0.013 µM/mm$^2$ geometric area of activated surface.

4. The method of any one of the preceding paragraphs, wherein the activated surface is produced by treating a metal surface of a substrate comprising the metal surface; or wherein the method further comprises providing a substrate comprising a metal surface; and treating the substrate comprising the metal surface to produce the activated metal surface.

5. The method of any one of the preceding paragraphs, wherein the method is for producing a metal-polymer composite, and the one or more polymerisable monomers polymerise onto and/or at the activated metal surface, thereby producing the metal polymer composite.

6. The method of any one of the preceding paragraphs, wherein the polymer is directly attached to the metal surface of the substrate.

7. The method of any one of the preceding paragraphs, wherein the polymer forms a coating on the surface of the substrate.

8. The method of any one of the preceding paragraphs, wherein the activated metal surface comprises one or more metal oxides capable of generating hydroxyl radicals.

9. The method of paragraph 8, wherein the metal oxide is selected from the group consisting of magnesium oxide, lead oxide, zinc oxide, copper oxide, titanium dioxide, silver oxide, tin oxide, aluminium oxide, cadmium oxide, iron oxide and nickel oxide, or a combination of any two or more thereof.

10. The method of paragraph 8 or 9, wherein the metal oxide is selected from the group consisting of lead oxide, zinc oxide, copper oxide, titanium dioxide, silver oxide, tin oxide, aluminium oxide, cadmium oxide, iron oxide and nickel oxide, or a combination of any two or more thereof.

11. The method of any one of paragraphs 8 to 10, wherein the metal oxide is selected from the group consisting of zinc oxide, titanium oxide and aluminium oxide, or a combination of any two or more thereof.

12. The method of any one of paragraphs 8 to 11, wherein the metal oxide is zinc oxide or titanium oxide, or a combination thereof.

13. The method of any one of paragraphs 8 to 11, wherein the metal oxide is zinc oxide.

14. The method of any one of paragraphs 8 or 9, wherein the metal oxide is selected from the group consisting of magnesium oxide, copper oxide, zinc oxide, titanium oxide and aluminium oxide, or a combination of any two or more thereof.

15. The method of any one of the preceding paragraphs, wherein the metal surface comprises one or more metals, an oxide of which is capable of generating hydroxyl radicals.

16. The method of any one of the preceding paragraphs, wherein the metal surface comprises magnesium, zinc, titanium, aluminium, lead, copper, titanium, silver, tin, cadmium, iron or nickel, or a combination of any two or more thereof.

17. The method of any one of the preceding paragraphs, wherein the metal surface comprises zinc, titanium, aluminium, lead, copper, titanium, silver, tin, cadmium, iron or nickel, or a combination of any two or more thereof.

18. The method of any one of the preceding paragraphs, wherein the metal surface comprises zinc, titanium or aluminium, or a combination of any two or more thereof.

19. The method of any one of the preceding paragraphs, wherein the metal surface comprises zinc or titanium, or a combination thereof.

20. The method of any one of the preceding paragraphs, wherein the metal surface comprises zinc.

21. The method of any one of the preceding paragraphs, wherein the metal surface comprises magnesium, copper, zinc, titanium or aluminium, or a combination of any two or more thereof.

22. The method of any one of paragraphs 8 to 21, wherein the one or more metal oxide is produced by treating said metal surface; or the method comprises treating the metal surface to produce the one or more metal oxide.

23. The method of any one of the preceding paragraphs, wherein the method comprises contacting and irradiating the activated metal surface and one or more polymerisable monomers with light, preferably comprising UV light.

24. The method of any one of the preceding paragraphs, wherein said polymerisation is carried out in the absence of an external or extraneous initiator.

25. The method of any one of the preceding paragraphs, wherein the substrate is a unitary body having at least one dimension greater than 100 nm, preferably greater than 1 mm.

26. The method of any one of the preceding paragraphs, wherein the metal surface and/or substrate comprises, consists of, or consists essentially of galvanised steel, electrogalvanized steel, galfan steel, zinc metal, aluminium metal, titanium metal, zinc-aluminium alloy coated steel, zinc-magnesium coated steel or zinc-aluminium-magnesium coated steel, or a combination of any two or more thereof.

27. The method of any one of the preceding paragraphs, wherein the metal surface and/or substrate comprises, consists of, or consists essentially of galvanised steel.

28. The method of any one of the preceding paragraphs, wherein the metal surface and/or substrate comprises, consists of, or consists essentially of hot-dip galvanised steel.

29. The method any one of the preceding paragraphs, wherein the substrate is selected from the group consisting of a particle, fibre, sheet, block, wire, mesh, panel, slab, plate, pole, pillar, bar, rod, beam, foil, joist, laminate, guard rail, pipe, chain, fabric, roofing, coating or any combination of two or more thereof.
30. The method of any one of paragraphs 4 to 29, wherein treating the metal surface to produce the activated surface comprises one or more of heating the metal surface at an elevated temperature (for example, in an oven, with a laser, or other suitable method), applying a current to the metal surface (for example, an anodic oxidation treatment step), subjecting the metal surface a chemical treatment (for example, a treatment that creates hydroxyl groups on the metal surface, an alkali treatment, such as alkali hydroxide treatment, or an acid treatment), subjecting the metal surface to a plasma treatment (for example oxygen plasma treatment), or exposing the metal surface to UV light irradiation.
31. The method of any one of paragraphs 4 to 30, wherein treating the metal surface comprises heating the metal surface at an elevated temperature to produce the activated metal surface.
32. The method of paragraph 31 wherein the metal surface is heated with a laser or other source of heat capable of rapidly heating the metal surface, such as plasma.
33. The method of paragraph 31 or 32, where heating the metal surface comprises heating at a temperature of at least about 100° C. to about 600° C., preferably at least about 300° C. to about 600° C., more preferably at least about 300° C. to about 400° C.
34. The method of paragraph 31 or 33, wherein heating the metal surface comprises heating for at least about 1, 2, 3, 4, 5, 6, 7, 8, 9, 10 or more hours, for example from about 1 to about 10 hours, preferably at least about 1 hour, more preferably at least about 2 hours.
35. The method of any one of the preceding paragraphs, wherein the activated metal surface is contacted with the one or more polymerisable monomers within less than about 72, 48, 24, 12, 6, 5, 4, 3, 2, or 1 hour, preferably within less than about 72 hours, preferably within less than about 24 hours, more preferably within about 2 hours after being produced.
36. The method of any one of the preceding paragraphs, wherein the activated metal surface is cooled prior to contacting with the one or more polymerisable monomers, preferably to a temperature less than the boiling point of the one or more polymerisable monomers at atmospheric pressure.
37. The method of any one of the preceding paragraphs, wherein the activated surface is formed when the substrate is formed.
38. The method of any one of the preceding paragraphs, wherein the one or more polymerisable monomers are photoactive monomers.
39. The method of any one of the preceding paragraphs, wherein the one or more polymerisable monomers are monoolefinically unsaturated monomers, preferably a monoethylenically unsaturated monomers; or a polyolefinically, preferably diolefinically, unsaturated monomers, preferably a polyethylenically unsaturated monomers; preferably diethyleneically unsaturated monomers.
40. The method of any one of the preceding paragraphs, wherein the one or more polymerisable monomers are unsaturated, preferably olefinically unsaturated, preferably ethylenically unsaturated.
41. The method of any one of the preceding paragraphs, wherein the one or more polymerisable monomers are selected from the group consisting of vinyl monomers, preferably acrylates or methacrylates.
42. The method of any one of the preceding paragraphs, wherein the one or more polymerisable monomers are monomers of formula I:

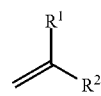

I wherein
$R^1$ is $C(O)OR^3$, $CO(O)R^4$, aryl or $NR^{20}$;
$R^2$ is H or C1-4alkyl, preferably H or $CH_3$;
$R^3$ is C1-10alkyl or $(CH_2CH_2O)_nCH_3$, preferably C1-4alkyl;
$R^4$ is C1-10alkyl, preferably C1-4alkyl;
n is an integer selected from 1 to 20;
$R^{20}$ is H or an alkyl group, preferably H or C1-10alkyl, preferably H.
43. The method of any one of paragraphs 1 to 41, wherein the one or more polymerisable monomers are monomers of formula II:

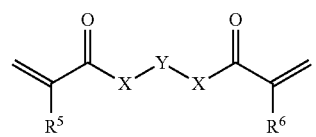

II wherein
X at each instance is independently O or $NR^{20}$;
$R^{20}$ is H or an alkyl group, preferably H or C1-10alkyl, preferably H; and
$R^5$ and $R^6$ are each independently H or C1-5alkyl, preferably H or $CH_3$;
and
Y is a linking group may comprise a linear chain of at least 2, 5, 10, 15, 20, 25, 30, 35, 40, 45, 50, 55, 60, 65, 70, 75, 80, 85, 90, 95, 100 or more atoms, preferably selected from C, N, O and S.
44. The method according to paragraph 43, wherein the linking group is a group of formula $(CR^{30}R^{40})_q$ or formula $(CR^{50}R^{60}O)_r(CR^{70}R^{80})$, wherein $R^{30}$, $R^{40}$, $R^{50}$, $R^{60}$ $R^{70}$ and $R^{80}$ are at each instance independently H or alkyl, preferably C1-10alkyl, and q and r is each independently an integer from 1 to 40.
45. The method according to paragraph 43, wherein Y is selected from the group consisting of $(CH_2)_m$, $CH_2CH_2CH(CH_3)$, $(CH_2CH_2O)_p(CH_2CH_2)$, and a linking group of formula IIA:

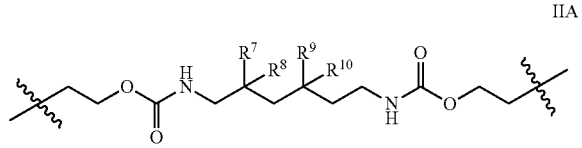

IIA wherein m and p is each independently an integer from 1 to 40, preferably from about 1 to about 10; and $R^7$, $R^8$, $R^9$ and $R^{10}$ are each independently selected from H and C1-5alkyl.

46. The method of any one of paragraphs 1 to 41, wherein the one or more polymerisable monomers are monomers of formula III:

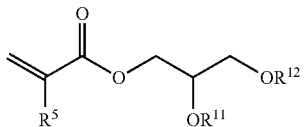

wherein $R^{11}$ and $R^{12}$ are each independently H or

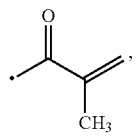

and $R^5$ is as defined in any one of the preceding paragraphs.

47. The method of any one of paragraphs 1 to 41, or 43 to 45, wherein X at each instance is O.
48. The method of any one of paragraphs 1 to 41, 43 to 45, or 47, wherein the one or more polymerisable monomers are monomers of formula II having a linking group of formula IIA.
49. The method of any one of paragraphs 1 to 41, 43 to 45, 47 or 48, wherein $R^5$ and $R^6$ are both methyl.
50. The method of any one of paragraphs 45, or 47 to 49, wherein $R^7$ and $R^9$ are both methyl, $R^8$ and $R^{10}$ are each independently selected from the group consisting of H and $CH_3$, preferably one of $R^8$ and $R^{10}$ is H and the other of $R^8$ and $R^{10}$ is $CH_3$, preferably $R^7$ and $R^9$ are both methyl and $R^8$ and $R^{10}$ are present as a 1:1 mixture of H and $CH_3$.
51. The method of any one of paragraphs 1 to 45, or 47 to 50, wherein the one or more polymerisable monomers are selected from a group consisting of methyl acrylate, methyl methacrylate, butyl methacrylate, diurethane dimethacrylate, poly(ethyleneglycol) methyl ether methacrylate, butyl acrylate, styrene and vinyl acetate.
52. The method of any one of paragraphs 1 to 45, 43, 45, or 47 to 51, wherein the one or more polymerisable monomers are diurethane dimethacrylate having a CAS number of 72869-86-4.
53. The method of any one of the preceding paragraphs, wherein the activated metal surface is contacted with one or more different types of polymerisable monomers.
54. The method of any one of the preceding paragraphs, wherein the activated metal surface is contacted with one or more polymerisable monomers for a first period of time followed by contacting for a second period of time.
55. The method of any one of the preceding paragraphs, wherein the method comprises contacting and irradiating the activated metal surface and one or more polymerisable monomers with light of a wavelength of about 10, 50, 100, 150, 200, 250, 300, 350, 400, 450, 500, 550, 600, 650, 700, 750, 800, 850, 900, 950, 1000, 1050, 1100, 1150, 1200, 1250 nm or more, and useful ranges may be selected from any of these values, for example about 10-400, 50-400, 100-400, 150-400, 200-400, 10-700, 50-700, 100-700, 150-700, 200-700, 300-700, 400-700, 10-1000, 50-1000, 100-1000, 150-1000, 200-1000, 300-1000, 400-1000, 500-1000, 600-1000, or 700-1000 nm.
56. The method of any one of the preceding paragraphs, wherein the method comprises contacting and irradiating the activated metal surface and one or more polymerisable monomers with light of a wavelength of from about 10, 50, 100, 150, 200, 250, 300, 350, 400, 450, 500, 550, 600, 650, 700, 750, 800, 850, 900, 950, 1000, 1050, 1100, 1150, 1200, 1250 nm or more, for example from about 10 nm to about 1000 nm, from about 10 nm to about 700 nm, preferably from about 10 nm to about 400 nm.
57. The method of any one of paragraphs 23 to 56, wherein the light comprises, consists essentially of, or consists of light of a wavelength that optimises the generation of hydroxyl radicals and/or electrons by the one or more compounds capable of initiating polymerisation in the activated surface.
58. The method of any one of the preceding paragraphs, wherein the light has a power of at least about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95, 100, 105, 110, 115, 120, 125, 130 W.
59. The method of any one of paragraphs 23 to 58, wherein the intensity of the light is at least 1, 2, 3, 4, 5, 6, 7, 8, 9, or 10 W per $m^2$ of the activated surface that is irradiated.
60. The method of any one of the preceding paragraphs, wherein the activated metal surface is contacted with the one or more polymerisable monomers for a first period of time followed by a second period of time, characterised by a difference in temperature and/or irradiation.
61. The method of any one of the preceding paragraphs, wherein the activated metal surface is contacted with the one or more polymerisable monomers for a first period of time at a first temperature and a second period of time at a second temperature, wherein the first temperature is different to the second temperature, preferably the first temperature is greater than the second temperature.
62. The method of any one of the preceding paragraphs, wherein the activated metal surface is contacted with the one or more polymerisable monomers under irradiation with light for a first period of time only.
63. The method of any one of the preceding paragraphs, wherein the activated metal surface is contacted with the one or more polymerisable monomers for a first period of time at a temperature of at least about 10, 15, 20, 25, 30, 35, 40, 45, 50, 55, 60, 65, 70, 75, 80, or 85° C., and suitable ranges may be selected from any of these values, for example about 10° C. to about 85° C., more preferably 50 to 85° C., more preferably 20 to 50° C.
64. The method of any one of the preceding paragraphs, wherein the activated metal surface is contacted with the one or more polymerisable monomers for a second period of time at a temperature of at least about 10, 15, 20, 25, 30, 35, 40, 45, 50, 55, 60, 65, 70, 75, 80, or 85° C., and suitable ranges may be selected from any of these values, for example from about 10° C. to about 85° C., from about 50 to about 85° C., preferably at least about 20° C., preferably at least about 50° C., preferably at least about 85° C.
65. The method of any one of paragraphs 54 to 64, wherein the first period of time is at least about 30 seconds, 1, 5, 10, 15, 30 or 60, 70, 80, 90, 100, 110 or 120 minutes, preferably about 30 seconds to about 120 minutes, more preferably about 30 seconds to about 60 minutes.
66. The method of any one of the preceding paragraphs, wherein the second period of time is at less than about 72, 48, 36, 24, 12, 11, 10, 9, 8, 7, 6, 5, 4, 3, 2, or 1 hour, preferably less than about 5 hours, more preferably less than about 1 hour.
67. The method of any one of the preceding paragraphs, wherein the polymer has a number average molecular weight of at least about 500,000, 550,000, 600,000, 650,000, 700,000, 750,000, 800,000, 850,000, 900,000, 950,000, 1,000,000, 1,050,000, 1,100,000, 1,150,000, 1,200,000, 1,250,00, 1,500,000, 2,000,000, 3,000,000, 4,000,000 or 5,000,000 g/mol, and useful ranges may be selected from any of these values, for example from about 500,000 to about 5,000,000 g/mol.
68. The method of any one of the preceding paragraphs, wherein the polymer has a number average molecular weight of at least about 2,000, 10,000, 50,000, 100,000, 150,000, 200,000, 250,000, 300,000, 350,000, 400,000, 450,000, 500,000, 550,000, 600,000, 650,000, 700,000, 750,000, 800,000, 850,000, 900,000, 950,000, 1,000,000, 1,050,000, 1,100,000, 1,150,000, or 1,200,000 g/mol, and useful ranges may be selected from any of these values, for example from about 2,000 to about 1,200,000 g/mol.
69. The method of any one of the preceding paragraphs, wherein the polymer has a polydispersity index of at least about 1, 1.05, 1.1, 1.15, 1.2, 1.25, 1.3, 1.35, 1.4, 1.45, 1.5, 1.55, 1.6, 1.65, 17, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.95, 2.9, 2.95, 3, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.5, 4.55, 4.6, 4.65, 4.7, 4.75, 4.8, 4.85, 4.9, 4.95, or 5, preferably at least about 1.05 to about 2.5, preferably at least about 1.05 to about 1.5, more preferably at least about 1.05 to about 1.2.
70. The method of any one of the preceding paragraphs, wherein the metal polymer composite has a tape test classification of at least 2B, preferably 3B, preferably 4B, as determined by AST D3359.
71. The method of any one of the preceding paragraphs, wherein the metal-polymer composite has a pull off strength as determined by ASTM D4541-09 of greater than about 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.5, 6, 6.5, 7, 7.5, 8, 8.5, 9, 9.5, or 10 MPa, and useful ranges may be selected from any of these values for example from about 1.5 to 10, 2.5 to 10, 1.5 to 7.5, 2.5 to 7.5, 1.5 to 5, or 1.5 to 4 MPa, preferably from about 2.5 to about 5 MPa.
72. The method of any one of the preceding paragraphs, wherein the metal-polymer composite has a pull off strength as determined by ASTM D4541-09 of greater than about 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5 MPa, preferably about 2.5 to about 5 MPa.
73. The method of any one of the preceding paragraphs, wherein the direct attachment comprises, consists of or consists essentially of non-covalent bonding between the polymer and the metal surface.
74. The method of paragraph 73, wherein the non-covalent bonding comprises, consists of or consists essentially of hydrogen bonding.
75. The method of any one of the preceding paragraphs, wherein the one or more polymerisable monomers are polymerised photochemically.
76. The method of any one of the preceding paragraphs, wherein the one or more polymerisable monomers are polymerised in the absence of an electric current, applied voltage, or externally applied potential difference.
77. The method of any one of the preceding paragraphs, wherein the one or more polymerisable monomers are polymerised in a liquid medium comprising less than 90, 85, 80, 75, 70, 65, 60, 55, 50, 45, 40, 35, 30, 25, 20, 15, 10, 5, 4, 3, 2 or 1% solvent by volume, preferably less than 90%, preferably less than 50%, preferably less than 10% solvent by volume, preferably the one or more polymerisable monomers are polymerised in the absence of solvent.
78. The method of any one of the preceding paragraphs, wherein the one or more polymerisable monomers are polymerised under an atmosphere of and/or in the presence of air or another oxygen-containing atmosphere.
79. The method of any one of paragraphs 4 to 78, wherein the metal surface is subjected to one or more pre-treatment steps, for example one or more physical, mechanical and/or chemical treatments, for example plasma treatment or surface roughening, for example surface roughening by etching and/or patterning, prior to said treatment to produce said activated metal surface.
80. The method of paragraph 79, wherein the metal surface is subjected to a pre-treatment step that increases the surface area of the metal surface, for example a surface roughening step.
81. The method of paragraph 79 or 80, wherein the metal surface is subjected to a pre-treatment step, for example a plasma, laser, chemical, or other pre-treatment step, that increases the wettability and/or free energy of the surface and/or modifies the morphology of the surface to increase bonding (e.g. mechanical bonding) between the polymer and the surface.
82. The method of any one of the preceding paragraphs, where in the polymer is removed from the surface of the substrate.
83. The method of any one of the preceding paragraphs, wherein the activated surface and monomers are contacted within less than about 30, 15, 10, 5, 1, or 0.5 minutes or less than about 10, 5, or 1 second after the activated surface is formed.
84. The method of any one of the preceding paragraphs, wherein the activated metal surface is or comprises an anodised surface, for example an anodised surface comprising titanium, aluminium, and magnesium.
85. The method of any one of paragraphs 4 to 84, wherein the substrate comprising the metal surface is a substrate comprising a galvanised surface.
86. A polymer prepared by the method of any one of the preceding paragraphs.
87. The polymer of paragraph 86, wherein the polymer is a block co-polymer.

88. A metal-polymer composite prepared by the method of any one of paragraphs 1 to 85.

89. The metal-polymer composite of paragraph 88, wherein the polymer of the metal-polymer composite is a block co-polymer.

90. A polymer formed by polymerising monomers of any one of paragraphs 1 to 85.

91. A metal-polymer composite comprising a polymer directly attached to a metallic surface of a substrate.

92. A metal-polymer composite having a pull off strength of about 1.5 to about 5 MPa, preferably about 2.5 to about 5 MPa.

93. The polymer or metal-polymer composite of any one of paragraphs 85 to 92, wherein the polymer has a number average molecular weight in the range of at least about 2,000 to 1,200,000 g/mol.

94. The polymer or metal-polymer composite of any one of paragraphs 85 to 93, wherein the polymer has a polydispersity index of at least about 1 to about 5, preferably at least about 1.05 to about 2.5, preferably at least about 1.05 to about 1.5, more preferably at least about 1.05 to about 1.2.

95. The metal-polymer composite of any one of paragraphs 88, 89, or 91 to 94, wherein the direct attachment comprises, consists of or consists essentially of non-covalent bonding.

96. The metal-polymer composite of paragraph 95, wherein the non-covalent bonding comprises, consists of or consists essentially of hydrogen bonding.

97. The metal-polymer composite of any one of paragraphs 88, 89, or 91 to 96, wherein the substrate is a unitary body, the unitary body having at least one dimension greater than 100 nanometer.

98. The metal-polymer composite of any one of paragraphs 88, 89, or 91 to 97, wherein the metal surface and/or substrate comprises, consists of or consists essentially of galvanised steel, electrogalvanized steel, galfan steel, zinc metal, aluminium metal, titanium metal, zinc-aluminium alloy coated steel, zinc-magnesium coated steel or zinc-aluminium-magnesium coated steel, or a combination of any two or more thereof.

99. The metal-polymer composite of any one of paragraphs 88, 89, or 91 to 98, wherein the metal surface and/or substrate comprises, consists of or consists essentially of galvanised steel.

100. The metal-polymer composite of any one of paragraphs 88, 89, or 91 to 99, wherein the metal surface and/or substrate comprises, consists of or consists essentially of hot-dip galvanised steel.

101. The metal-polymer composite of any one of paragraphs 88, 89, or 91 to 100, wherein the substrate is selected from the group consisting of a particle, fibre, sheet, block, wire, mesh, panel, slab, plate, pole, pillar, bar, rod, beam, foil, joist, laminate, guard rail, pipe, chain, fabric, roofing, coating or any combination of two or more thereof.

102. The polymer or metal-polymer composite of any one of the preceding paragraphs, wherein the polymer is a block co-polymer.

The invention claimed is:

1. A method for producing a polymer, the method comprising:
   providing one or more polymerisable monomers;
   providing a substrate comprising an activated metal surface,
   the activated metal surface comprising one or more compounds for generating a hydroxyl radical capable of initiating polymerisation of the one or more polymerisable monomers; and
   directly contacting the activated metal surface and the one or more polymerisable monomers to radically polymerise the one or more polymerisable monomers, thereby producing the polymer directly attached to the activated metal surface in an oxygen containing atmosphere and in the absence of an external initiator.

2. The method of claim 1, wherein the activated metal surface when contacted with an aqueous solution of 30.096 µM terephthalic acid and 0.001 mol/L NaOH and irradiated at 365 nm with a light source at 15 W for 1 hour at room temperature is capable of producing 2-hydroxyterephthalic acid at a concentration of between 0.0001 and 0.013 µM/mm2 geometric area of activated surface, as determined by fluorescence spectroscopy at 425 nm.

3. The method of claim 1, wherein the activated metal surface is provided by treating a metal surface of the substrate.

4. The method of claim 1, wherein the method is for producing a metal-polymer composite, and the one or more polymerisable monomers polymerise onto and/or at the activated metal surface, thereby producing the metal-polymer composite.

5. The method of claim 1, wherein the activated metal surface comprises one or more metal oxides capable of generating hydroxyl radicals.

6. The method of claim 3, wherein the activated metal surface comprises magnesium, zinc, titanium, aluminium, lead, copper, titanium, silver, tin, cadmium, iron or nickel, or a combination of any two or more thereof.

7. The method of claim 1, wherein the method comprises contacting and irradiating the activated metal surface and one or more polymerisable monomers with light.

8. The method of claim 3, wherein the treating the metal surface to provide the activated metal surface comprises one or more steps selected from:
   i. heating the metal surface at an elevated temperature,
   ii. applying a current to the metal surface,
   iii. subjecting the metal surface to a chemical treatment,
   iv. subjecting the metal surface to a plasma treatment, or
   v. exposing the metal surface to UV light irradiation.

9. The method of claim 8, where the heating the metal surface comprises heating at a temperature of between 100° C. to about 600° C.

10. The method of claim 1, wherein the activated metal surface is contacted with the one or more polymerisable monomers within less than 72 hours after being produced.

11. The method of claim 1, wherein the one or more polymerisable monomers are selected from at least one of:
   i. monoolefinically unsaturated monomers;
   ii. monoethylenically unsaturated monomers;
   iii. polyolefinically unsaturated monomers;
   iv. polyethylenically unsaturated monomers; or
   v. diethyleneically unsaturated monomers.

12. The method of claim 1, wherein the method comprises contacting and irradiating the activated metal surface and the one or more polymerisable monomers with light having a wavelength of between 10 nanometers (nm) to 1250 nm.

13. The method of claim 7, wherein the light comprises light of a wavelength that optimises the generation of hydroxyl radicals and/or electrons by the one or more compounds for generating the hydroxyl radical capable of initiating polymerisation in the activated metal surface.

14. The method of claim 7, wherein the light has an intensity of between 1 to 10 W per m² of the activated metal surface that is irradiated.

15. The method of claim 1, wherein the activated metal surface is contacted with the one or more polymerisable monomers for a first period of time followed by a second period of time, characterised by a difference in temperature and/or irradiation.

16. The method of claim 1, wherein the polymer has a number average molecular weight of between 500,000 and 5,000,000 g/mol.

17. The method of claim 1, wherein the polymer has a polydispersity index of between 1 and 5.

18. The method of claim 1, wherein the direct attachment comprises non-covalent bonding between the polymer and the activated metal surface.

19. The method of claim 1, wherein the one or more polymerisable monomers are polymerised in a liquid medium comprising less than 90% solvent by volume.

20. The method of claim 1, wherein the polymer is removed from the activated metal surface.

* * * * *